US010891366B1

(12) United States Patent
Wu et al.

(10) Patent No.: US 10,891,366 B1
(45) Date of Patent: Jan. 12, 2021

(54) SECURE HARDWARE SIGNATURE AND RELATED METHODS AND APPLICATIONS

(71) Applicant: Jonetix Corporation, Cupertino, CA (US)

(72) Inventors: Paul Ying-Fung Wu, Saratoga, CA (US); Richard J. Nathan, Gilroy, CA (US); Harry Leslie Tredennick, Los Gatos, CA (US)

(73) Assignee: JONETIX CORPORATION, Cupertino, CA (US)

( * ) Notice: Subject to any disclaimer, the term of this patent is extended or adjusted under 35 U.S.C. 154(b) by 201 days.

(21) Appl. No.: 16/101,400

(22) Filed: Aug. 11, 2018

Related U.S. Application Data

(60) Provisional application No. 62/547,669, filed on Aug. 18, 2017, provisional application No. 62/579,775, filed on Oct. 31, 2017, provisional application No. 62/622,515, filed on Jan. 26, 2018, provisional application No. 62/656,852, filed on Apr. 12, 2018, provisional application No. 62/669,906, filed on May 10, 2018.

(51) Int. Cl.
*G06F 21/44* (2013.01)
*G06F 21/73* (2013.01)
*H04L 29/06* (2006.01)
*H04L 9/32* (2006.01)
*H04L 9/08* (2006.01)

(52) U.S. Cl.
CPC .............. *G06F 21/44* (2013.01); *G06F 21/73* (2013.01); *H04L 9/0866* (2013.01); *H04L 9/3278* (2013.01); *H04L 63/06* (2013.01)

(58) Field of Classification Search
CPC ....... G06F 21/44; G06F 21/73; H04L 9/0866; H04L 9/3278; H04L 63/06
USPC ........................................................ 713/189
See application file for complete search history.

(56) References Cited

U.S. PATENT DOCUMENTS

| 4,092,732 | A | * | 5/1978 | Ouchi | G06F 11/1076 714/5.11 |
|---|---|---|---|---|---|
| 5,872,517 | A | | 2/1999 | Hellman | |
| 6,738,294 | B2 | | 5/2004 | Layman et al. | |
| 6,914,637 | B1 | * | 7/2005 | Wolf | H04N 21/2383 348/473 |
| 7,213,191 | B2 | * | 5/2007 | Chao | G06F 11/1004 714/758 |

(Continued)

OTHER PUBLICATIONS

PCT/US2018/046475, ISR-WO, 12 pages, mailed Nov. 6, 2018 [International counterpart case to this application.].

(Continued)

*Primary Examiner* — Abu S Sholeman
(74) *Attorney, Agent, or Firm* — Marc P. Schuyler

(57) ABSTRACT

This disclosure provides techniques for recovering a root key from measurement of a circuit function. In some embodiments, a checkpointing feature is used to periodically mark measurements of this function and thereby track drift in the value of the root key over the life of a digital device; the checkpointing feature permits rollback of any measurement of the function in a manner that negates incremental drift and permits recovery of the root key for the life of a device (e.g., an IC circuit or product in which the IC is embedded). This disclosure also provides novel PUF designs and applications.

19 Claims, 12 Drawing Sheets

(56) References Cited

U.S. PATENT DOCUMENTS

| | | | |
|---|---|---|---|
| 7,475,255 B1 | 1/2009 | Guthery | |
| 7,552,467 B2 | 6/2009 | Lindsay | |
| 8,499,172 B2* | 7/2013 | Nelson | G06F 21/73 |
| | | | 713/193 |
| 8,627,084 B1 | 1/2014 | Pauker et al. | |
| 8,767,445 B2 | 7/2014 | Chellappa et al. | |
| 8,880,954 B2 | 11/2014 | Gebara et al. | |
| 9,178,701 B2 | 11/2015 | Roth et al. | |
| 9,208,491 B2 | 12/2015 | Spies et al. | |
| 9,419,796 B2* | 8/2016 | Konig | G06F 12/14 |
| 9,489,521 B2 | 11/2016 | Martin et al. | |
| 9,635,011 B1 | 4/2017 | Wu | |
| 10,021,085 B1 | 7/2018 | Wu et al. | |
| 2002/0123972 A1 | 9/2002 | Hodgson et al. | |
| 2003/0085734 A1 | 5/2003 | Nguyen | |
| 2003/0182552 A1 | 9/2003 | Tanimoto et al. | |
| 2003/0225540 A1* | 12/2003 | Minke | G06F 8/60 |
| | | | 702/123 |
| 2005/0091569 A1* | 4/2005 | Chao | G06F 11/1004 |
| | | | 714/758 |
| 2005/0147244 A1 | 7/2005 | Molovyan et al. | |
| 2006/0034456 A1 | 2/2006 | McGough | |
| 2007/0016779 A1* | 1/2007 | Lyle | H04L 9/3271 |
| | | | 713/169 |
| 2007/0233540 A1 | 10/2007 | Sirota | |
| 2007/0234410 A1 | 10/2007 | Geller | |
| 2009/0132813 A1 | 5/2009 | Schibuk | |
| 2010/0220859 A1* | 9/2010 | Lu | H04L 1/0057 |
| | | | 380/255 |
| 2010/0293384 A1* | 11/2010 | Potkonjak | H04L 9/3278 |
| | | | 713/176 |
| 2011/0067095 A1* | 3/2011 | Leicher | H04L 63/062 |
| | | | 726/10 |
| 2011/0093210 A1* | 4/2011 | Matsuzaki | A61B 5/021 |
| | | | 702/19 |
| 2011/0131635 A1 | 6/2011 | Schneider | |
| 2013/0103685 A1 | 4/2013 | Preneel et al. | |
| 2013/0251150 A1 | 9/2013 | Chassagne | |
| 2013/0287210 A1 | 10/2013 | Matsuda et al. | |
| 2014/0143292 A1 | 5/2014 | Kabushiki | |
| 2014/0192809 A1 | 7/2014 | Park | |
| 2014/0304825 A1 | 10/2014 | Gianniotis et al. | |
| 2014/0327468 A1* | 11/2014 | Pfeiffer | H03K 19/003 |
| | | | 326/8 |
| 2014/0344164 A1 | 11/2014 | Pauker et al. | |
| 2015/0178143 A1 | 6/2015 | Mathew et al. | |
| 2015/0199684 A1 | 7/2015 | Maus et al. | |
| 2016/0028549 A1* | 1/2016 | Yuji | G06F 21/31 |
| | | | 713/176 |
| 2016/0378949 A1 | 12/2016 | Fu et al. | |
| 2017/0310475 A1 | 10/2017 | Hu et al. | |
| 2018/0375653 A1* | 12/2018 | Setty | H04L 63/062 |

OTHER PUBLICATIONS

PCT/US2018/046475, Informal comments by Applicant/Response to Written Opinion dated Nov. 6, 2018, filed Nov. 14, 2018, 3 pages [International counterpart case to this application.].
Yahya et al., "A Shuffle Image-Encryption Algorithm," Journal of Computer Science 4 (12): 999-1002, 2008 ISSN 1549-3636, 2008 Science Publications, 4 pages.
"Streamlining Information Protection Through a Data-centric Security Approach," Hewlett-Packard Company White Paper, www.voltage.com, 2015 Hewlett-Packard Development Company, L.P., 16 pages.
Notice of Allowance, U.S. Appl. No. 15/461,384, dated Apr. 10, 2018, 20 pages.
Notice of Allowance and interview summary, U.S. Appl. No. 14/831,070, dated Mar. 15, 2017, 23 pages.
Non Final Office Action, U.S. Appl. No. 15/063,487, dated Jul. 9, 2018, 12 pages.
Mudit Bhargava, "Reliable, Secure, Efficient Physical Unclonable Functions," May 2003 PhD thesis, Carnegie Mellon University, 156 pages.
Shahin Tajik et al., "Physical Characterization of Arbiter PUFs," from book Cryptographic Hardware and Embedded Systems—CHES 2014: 16th International Workshop, Busan, South Korea, Sep. 23-26, 2014. Proceedings 10.1007/978-3-662-44709-3_27.
Stefan Katzenbeisser et al., "PUFs: Myth, Fact or Busted? A Security Evaluation of Physically Unclonable Functions (PUFs) Cast in Silicon," E Prouff and P. Schaumont (Eds.): CHES 2012, LNCS 7428, pp. 283-301, 2012.
Unal Kocaba et al, "Converse PUF-Based Authentication," S. Katzenbeisser et al. (Eds.): Trust 2012, LNCS 7344, pp. 142-158, 2012.
Anthony van Herrewege et al., "Reverse Fuzzy Extractors: Enabling Lightweight Mutual Authentication for PUF-enabled RFIDs," from book Financial Cryptography and Data Security—16th International Conference, FC 2012, Kralendijk, Bonaire, Feb. 27-Mar. 2, 2012, Revised Selected Papers (pp. 374-389).
Frederik Armknecht et al., "A Formal Foundation for the Security Features of Physical Functions," 2011 IEEE Symposium on Security and Privacy, 16 pages.
Roel Maes, Ingrid Verbauwhede, "Physically Unclonable Functions: a Study on the State of the Art and Future Research Directions," (2010) Physically Unclonable Functions: A Study on the State of the Art and Future Research Directions. In: Sadeghi AR., Naccache D. (eds) Towards Hardware-Intrinsic Security. Information Security and Cryptography. Springer, Berlin, Heidelberg, 36 pages.
Ulrich Ruhrmair et al., "Security based on Physical Unclonability and Disorder," from Introduction to Hardware Security and Trust pp. 65-102, Aug. 8, 2011.
Roel Maes, "Physically Unclonable Functions: Constructions, Properties and Applications," dissertation, Arenberg Doctoral School of Science, Engineering & Technology Faculty of Engineering Department of Electrical Engineering (ESAT), 260 pages, Aug. 2012.
Jorge Guajardo et al., "Anti-counterfeiting, Key Distribution, and Key Storage in an Ambient World via Physical Unclonable Functions?" Information Systems Frontiers, Special Issue on Ambient Intelligence, Online Publication: Oct. 23, 2008 (31 pages).
Jorge Guajardo et al., "Physical Unclonable Functions, FPGAS and Public-Key Crypto for IP Protection," Sep. 2007 DOI: 10.1109/FPL.2007, 8 pages.
Daniel E. Holcomb et al.,"Initial SRAM State as a Fingerprint and Source of True Random Numbers for RFID Tags," IEEE Transactions on Computers2009, 12 pages.
"Types of physical unclonable function," Wikipedia, Jul. 30, 2018, 4 pages.
Daniel Holcomb, "Randomness in Integrated Circuits with Applications in Device Identification and Random Number Generation," University of Massachussetts Amherts, Masters Thesis, Jan. 2007, 58 pages.
Daniel E. Holcomb et al., "Power-up SRAM State as an Identifying Fingerprint and Source of True Random Numbers," IEEE Transactions on Computers, vol. 57, No. 11, Nov. 2008, 14 pages.
Sandeep Kumar et al., "Extended Abstract: The Butterfly PUF Protecting IP on every FPGA," Published in: 2008 IEEE International Workshop on Hardware-Oriented Security and Trust, Jun. 9, 2008, Print ISBN: 978-1-4244-2401-6 INSPEC Accession No. 10074445, 4 pages.
Pappu Srinivsa Ravikanth, "Physical One Way Functions," MIT PhD Thesis, 154 pages, Mar. 2001.
Arunkumar Vijayakumar et al., "On Improving Reliability of SRAM-Based Physically Unclonable Functions," J. Low Power Electron. Appl. 2017, 7, 2; doi:10.3390/jlpea7010002, 15 pages.
Wikipedia entry, "Zen (microarchitecture)," Aug. 14, 2018, 9 pages.
Joonho Kong et al., "Processor-Based Strong Physical Unclonable Functions With Aging-Based Response Tuning" IEEE Transactions on Emerging Topics in Computing, vol. 2, No. 1, Mar. 2014, 14 pages.
Jiliang Zhang, "CMOS: Dynamic Multi-key Obfuscation Structure for Strong PUFs," Jul. 20, 2018, 18 pages.

(56) References Cited

OTHER PUBLICATIONS

Wikipedia entry, "Kerberos (procotol)," Aug. 15, 2018, 7 pages.
Wikipedia entry, "Transport Layer Security," Aug. 15, 2018, 33 pages.

* cited by examiner

SECURE HARDWARE SIGNATURE AND RELATED METHODS AND APPLICATIONS

REFERENCE TO RELATED APPLICATIONS

This patent application claims priority to the following patent applications: U.S. Provisional Patent Application No. 62/547,669, filed on Aug. 18, 2017 on behalf of first-named inventor Paul Ying-Fung Wu for "Secure Transactions With Chip Level Identity;" U.S. Provisional Patent Application No. 62/579,775, filed on Oct. 31, 2017 on behalf of first-named inventor Paul Ying-Fung Wu for "Techniques For Secure Key Storage In Nonvolatile Memory;" U.S. Provisional Patent Application No. 62/622,515, filed on Jan. 26, 2018 on behalf of first-named inventor Paul Ying-Fung Wu for "Real-Time CPU-Knowledge-Only Keyed Encryption;" U.S. Provisional Patent Application No. 62/656,852, filed on Apr. 12, 2018 on behalf of first-named inventor Paul Ying-Fung Wu for "Secure Embedded Shadow NVRAM & Volatile RAM, Encryption By Zero-Error PUF;" and U.S. Provisional Application No. 62/669,906, filed on May 10, 2018 on behalf of first-named inventor Paul Ying-Fung Wu for "Nanosecond-Latency, Shallow Datapath Secured Embedded Shadow Memory With Zero-Error PUF (Physically Unclonable Function)." Each of the aforementioned utility and provisional patent applications is hereby incorporated by reference. This patent application also incorporates by reference the following documents: U.S. Pat. No. 9,635,011, issued on Apr. 25, 2017 for "Encryption And Decryption Techniques Using Shuffle Function;" and U.S. patent application Ser. No. 15/063,487, filed on Mar. 7, 2016 on behalf of first-named inventor Paul Ying-Fung Wu for "Secure Communications Using Loop-Based Authentication Flow," issued as U.S. patent Ser. No. 10/263,779.

BACKGROUND

There exist many applications where it is desired to have an incorruptible, unique, secret device identify (ID). As examples of this, copy protection schemes typically rely on a unique device ID to provide copy protection and tracking for software and content (e.g., where each copy is separately tracked and/or authorized), and a unique digital ID is typically used in encryption techniques where digital payment is exchanged (e.g., where a token is encrypted using a digital ID, with the token then being exchanged as surrogate for cash). Unique device IDs can also be used to provide secure processes and/or identification for credit cards, cell phones, computers, web-enabled devices, and many, many other applications.

Typically, the device ID relies on some type of secure secret key. This key is typically complex (e.g., 128 bits or more in length) and is used to generate encrypted sequences that can be used to uniquely authenticate the device in question; in most cases, the key is not shared externally, even with other chips (integrated circuits, or IC's") on the same device. That is, to guard against key compromise, it is common for the key to be embedded in and used within only a single IC, with all processing involving that key performed on-chip; this architecture helps provide schemes that can uniquely authenticate a digital device, even discriminating it from other devices belonging to the same user. Conventionally, the key is stored in some type of internal nonvolatile memory ("NVM") on-board the chip, such that it cannot be easily hacked or compromised.

However, as technology has progressed, a number of problems have arisen. First, hackers have become more sophisticated, and attacks have been mounted which attempt to read or discover stored keys. Second, as the semiconductor industry continues to benefit from process size reduction, enabling ever-smaller and more capable processors (and consequently, smart devices), the pace of innovation has tended to outstrip the capabilities of memory, in a manner that renders it difficult to store a secure ID on-chip. As an example, the leading CMOS technologies can now achieve component feature sizes of 7 nanometers ("7 nm process" technology), while NVM such as flash memory for example is currently practical (and affordable) only using the much larger 65 nm or 55 nm process technology. This discrepancy inhibits the capabilities of the newer process technologies; for example, as a practical matter, one cannot provide for on-chip embedded nonvolatile memory using 7 nm process technology, and this in turn means that processing space (e.g., memory for purposes of processing operands, performing encryption and so forth) must typically be stored as clear-text (i.e., unencrypted), off-chip. Thus, the secret keys are at risk from external attack, and for newer process technologies, this problem is exacerbated by the need to use external memory for processing (including for cryptographic operations). For certain applications of the newer process technologies (e.g., FPGAs and other processors), the requirement of off-chip storage implies that a programming bitstream is also subject to interception and exploitation, i.e., as it is infeasible to perform decryption of an encrypted programming stream on-chip because a nonvolatile decryption key cannot practically be stored on-chip.

A technology that has shown promise in addressing these issues involves the use of physically unclonable functions ("PUF"). A secret key is typically not stored on-chip, but rather, this technology generally relies on, and measures, unique hardware process corners, i.e., minor design variations that vary from chip-to-chip, and that cannot be easily measured or detected off-chip; the secret key is volatile and must be retested or remeasured, internally, to obtain a unique hardware "signature," which can then be used to uniquely identify or fingerprint the device, at least in theory. As one example of this, many electronic circuit designs (including memory cell designs) rely on some type of a bistable circuit that has an unpredictable state upon power-up, e.g., such as fostered by a circuitry "race condition;" when a large group of these circuits are viewed in parallel, the individual circuits, despite the seemingly unpredictable result of an initial state fostered by their general design, will in fact tend to repeatably assume a consistent output state that can be measured to provide the unique device signature (i.e., if the number of bistable circuits is sufficiently large and the state measurement processes sufficiently robust). As an example, a volatile memory array having thousands of memory cells, each predicated on a bistable circuit, in theory should feature an unpredictable state for each of its memory cells at power-up; however, in practice, due to chip-to-chip process variations that cannot be easily externally detected, the entire memory array at power-up can have the states of its memory cells measured and used as the basis for a unique hardware signature. Because this signature can only be read at a time dictated by chip firmware (i.e., such as by a system BIOS at power up), and is not predictable from external examination of the circuit, this signature cannot be easily discovered by an attacker. Unfortunately, while the use of PUFs is promising, especially for newer FPGAs and other processors, these designs are also susceptible to corruption over time (e.g., individual bistable cell operation can slowly change in their predictability over time as a device ages, or due to other factors), leading to drift of the device signature;

if this signature was applied for encryption and authentication purposes, this would be a problem, i.e., corruption of a root key used for encryption implies that a device can no longer be authenticated and that encryption/decryption processes will no longer work. Additionally, the PUF function typically cannot be used on a dynamic basis (i.e., with most designs, the PUF can only be measured at power-up, and it is difficult therefore to take frequent, repeated, or dynamic measurements). Furthermore, conventional PUFs typically rely on error-correcting-codes (ECCs) such as BCH Codes or Reed-Solomon Codes that reduce the probability of errors, but they can never affirm the total elimination of errors, which renders them unsuitable for the purpose of generating and upkeeping a perpetual secret key or secure device ID.

Techniques are therefore needed for overcoming the aforementioned issues. More specifically, techniques are needed for obtaining a secure key that can be used for authentication and/or encryption functions, as referenced above; ideally, these techniques would provide a "corruption-proof" scheme that would always permit recovery of the same, original hardware key ("root key"), irrespective of device age, temperature excursions and/or other factors. Ideally still, such techniques and associated cryptographic operations would ideally be compatible with decreasing feature size (e.g., 7 nm and smaller process technologies) and would be usable within a single chip and usable on a dynamic basis (i.e., at any time). Finally, such techniques would ideally facilitate effective encryption and decryption of a programming or data bitstream usable by processors built using newer, smaller process technologies, and provide for effective, secure device ID management. The techniques presented herein address the aforementioned needs and provide further, related advantages.

Figure 1A:
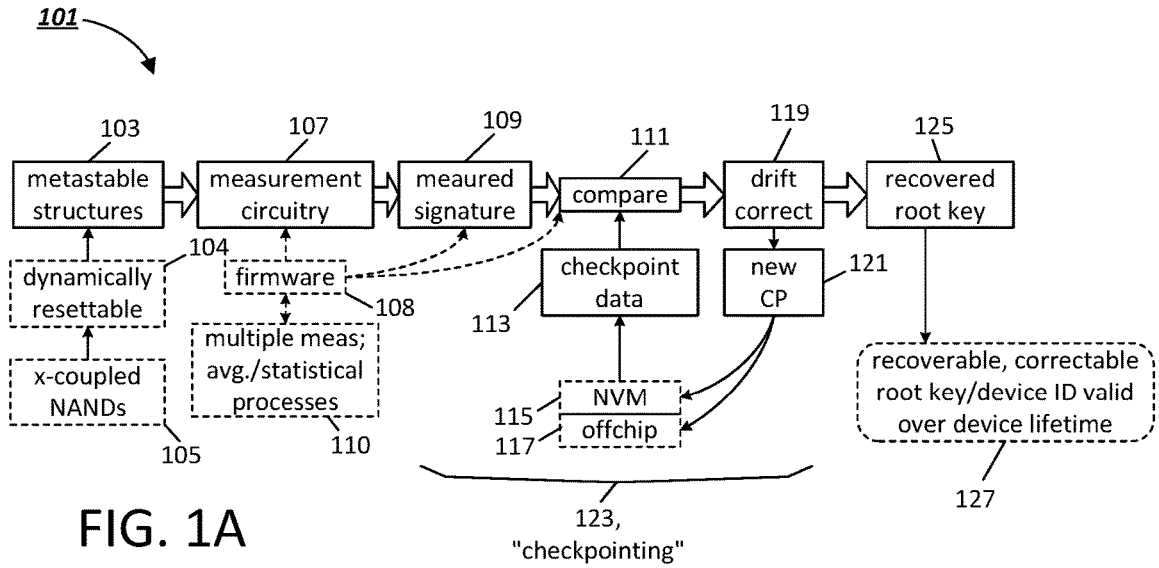
FIG. 1A is a block diagram of one embodiment of a device that produces a unique root key that is robust to corruption (e.g., through drift and/or device aging).

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to obtain, manage and/or use a hardware signature. In some embodiments, these techniques can be embodied as an integrated circuit or other apparatus, as related methods, in the form of software (e.g., firmware) stored on non-transitory machine readable media and adapted to control circuitry and/or as instructions stored on non-transitory machine readable media for fabricating a chip of specific design, where the design is such that the chip can perform methods as disclosed herein. While specific examples are presented, the principles described herein may also be applied to other methods, devices and systems as well.

DETAILED DESCRIPTION

This disclosure provides techniques for recovering a volatile secret key in a manner resilient to drift or other forms of error over device lifetime, and for techniques for generating a secure device identity based on, and for using encryption/decryption processes based on, such a key.

In a first set of optional embodiments, a digital device provides a secret key, called a "root key" herein, which is stored within or measured within an integrated circuit ("IC"). However, the reading of this root key can be subject to error over time, including by way of non-limiting example, drift. Additionally, dynamic errors can occur at any instant of such reading process due to noise and/or inherent instability of the underlying circuits. To provide for recovery of the root key notwithstanding possible error, this value of this key is read. This reading will be referred to herein as a "hardware signature," indicating that it may or may not have the same value as the root key. The hardware signature is then processed in a manner so as to always recover to the same original root key. Optionally, each hardware signature (and the original root key) can be a measured value, for example, a measured response to a physically unclonable function (or "PUF"), though this is not required for all of these embodiments. The associated signature (e.g., and root key associated with a device) is optionally large, e.g., 512 bits, 1024 bits, 2048 bits, or indeed, any desired length (whether or not corresponding to a power of two); in one optional embodiment, discussed below, a key length of 768 bits is used. In some embodiments, it is desired to always be able to recover the original root key while not having any external data from which the root key can be intercepted or recovered. To obtain these ends, a "checkpointing" process can be used to periodically generate data for measured hardware signatures, where that data can later be used to verify new signature measurements and to permit rollback of the newly-measured hardware signatures to an earlier state. In some embodiments, when there is drift or other error, a process is used which permits circuit logic to "guess" the correct state of a prior measured hardware signature (and, ultimately, the root key) by processing a current hardware signature until a verification process identifies correspondence with an earlier checkpointed hardware signature (or the root key); this process can be performed on an incremental basis checkpoint-by-checkpoint in a manner that eventually migrates the current hardware signature back to be identical to the original root key. Note that even this also is not required for all implementations, e.g., in one embodiment, the nature of the checkpointing process is such that the rollback can be electively performed to directly recover the original root key; the checkpoint-by-checkpoint process however can be faster, and is therefore is optionally preferred in some implementations.

In one implementation, checkpointing is simply an error correction process. However, in other implementations, the data stored by the checkpointing process is produced by an encryption function such that the checkpoint data cannot by itself be used by an attacker to recover any measured hardware signature or the original root key; in one version, the checkpoint data represents an encryption of the root key itself, while in another version, the checkpoint data comprises a value and an encryption of a random obfuscating function (e.g., that links the value to the root key). These encryption processes permit the checkpoint data to optionally be be stored externally relative to a device or integrated circuit ("IC") associated with the root key. As a brief non-limiting example of the utility of these processes, an IC can have circuitry which provides an embedded root key; this key is not externally shared outside of this IC. This IC is optionally a processor IC. Checkpoint data (in one optional embodiment referred to as "attestation curve" data) is stored in external nonvolatile memory (or "NVM"); this can optionally be a second, different IC in a common system (e.g., such as a computer, smart phone or other digital device). The first IC is optionally made using a newer process technology, such as 7 nm process technology or smaller, or otherwise might be of a nature such that when it is powered down, all internal data is lost. When it is repowered, to ensure the proper, original root key is obtained, the checkpoint data is read from the second IC. Because the checkpoint data does not by itself permit recovery of any of the prior checkpointed hardware signatures or the original root key, the secret key (i.e., the root key) is safe from an attacker. The processor IC compares the retrieved checkpoint data with new checkpoint data, corresponding to a newly-read or measured hardware signature, and via iterative modification of the newly-read or measured hardware signature and re-computation of checkpoint data for each iterative modification, derives a hardware signature corresponding to the immediately prior checkpoint. This process continues until the very first checkpoint is confirmed (corresponding to the original root key). Note that this is repeated, checkpoint-by-checkpoint process is optional; in alternative embodiments, the original root key can be recovered directly from any checkpoint among all accumulated checkpoints by way of direct encryption of the said original root key by the "checkpointed key," via any subset of the total accumulated checkpoints. In other optional embodiments, the root key is then used as a secret key to permit decryption of an externally-stored but encrypted private or other secret key that will be directly used for encryption/decryption processes (such as by way of non-limiting example, external transactions involving a digital device, based on a device ID). Note that this is not required for all embodiments. In some implementations, the root key can be also used for encryption/decryption of other externally stored data, such as (by way of non-limiting example) a programming bitstream or a software/firmware revision upgrade or for two-way mutual authentication; as an example, the root key can be used for encryption/authentication between and the device possessing the root key. In an optional embodiment, the checkpointing process (and associated storage of checkpoint data, such as attestation curve data) is performed on a calendared or ad hoc basis but frequently enough such that worse case drift between adjacent checkpoints is nine bits or less; in other embodiments, this value can be much lower, such as five bits or less, three bits or less, one bit or less, etc.

In a second set of optional embodiments, a group of circuit structures is used to facilitate a measurable physically unclonable function ("PUF"). These circuit structures can be based on a metastable circuit design that can be dynamically reset during operation of an integrated circuit ("IC") without need to cycle power to an entire chip or array of circuitry (e.g., such as an entire memory array). In one non-limiting example, such a metastable circuit can be implemented as a pair of cross-coupled NAND gates where, for each NAND gate, a first input is coupled to an output of the other NAND gate, and where the second inputs for each of the two NAND gates are tied together and used to dynamically-reset (i.e., to "excite") the circuit; in an alternative embodiment, a pair of cross-coupled NOR gates can also be used. Such a design creates a bistable circuit where a seemingly random state can be measured, dynamically reset and remeasured, at any desired instant. The cross-coupled NAND gates exhibit seemingly random characteristics in output state over multiple excitation instances on the same device, as well as over multiple device instances even on the same manufactured wafer, because the IC fabrication process naturally imparts varying parasitic and intrinsic behaviors of the circuit (such for example transistor drive strengths and gains, parasitic resistances and capacitances, threshold voltages, resistive/capacitive attributes of the wiring, and noise coupling from adjacent circuits. Furthermore, during operating life of the device, operational excursions such as negative bias temperature instability ("NBTI") and positive bias temperature instability ("PBTI") can drive further divergence of individualized 'aging' behaviors of this circuit. The measurement tasks can be performed under the control of hardware or firmware, without removing circuit power, optionally on an individual basis for each metastable cell or a group of metastable cells. This specific metastable circuit design is optional for many embodiments and, in other embodiments, other metastable circuit designs can instead be used (e.g., based on cross-coupled latches, inverters and/or other circuit elements). In a specific group of embodiments, the group of circuit structures is optionally configured as an array, such that a subset of the circuit structures in the array can be individually read at-once. Optionally, a group of circuit structures in these second embodiments can be used to provide a hardware signature, as referenced above; the hardware signature can be measured repeatably, as desired, all without cycling power, with resultant measurements averaged or otherwise subjected to statistical processes that enhance the reliability and/or security of the associated hardware signature. In further (optional) embodiments, such a group of circuit structures can be used for random number generation, and/or to provide a root key. In still more detailed implementations embodiments, these structures can optionally be combined with the first set of embodiments discussed above and used as the basis of the root key and associated hardware signature measurements and checkpoint recovery processes, as introduced earlier.

In a third set of optional embodiments, a unique device ID can be generated and applied based upon a hardware signature and/or associated root key (i.e., whether or not using or based on the other elective features discussed above in connection with the first two sets of embodiments). For example, a root key (optionally such as described above) can be used to generate a device ID or other data which can be shared or externally stored, but from which the hardware signature or key cannot be deduced. In one embodiment, the device ID can be in the form of a secret key or a private key (i.e., corresponding to an associated public key, the latter of which can then be an optionally published part of the device ID). The device ID can optionally be used in software processes, such as for example, content copy tracking and protection, token generation, authentication and encryption. The root key can be used to generate and/or encrypt the private key, which is then stored externally in NVM (either locally or remotely); if supported by semiconductor design, it can also be embedded in the device (i.e., the IC) and made available in the form of a one-time programmable or multiple-time programmable non-volatile memory. Combined with a process which permits dynamic retrieval of, or dynamic measurement of the correct root key (as just exemplified), the externally-stored, encrypted secret or private key can always be securely stored, recovered and decrypted by hardware, and applied when needed; the hardware can externally store the private key in a manner that is safe from interception, and can always decrypt the remotely-stored key using an internal secret key which is never externally seen (e.g., a root key). Optional applications for a unique device ID can further include facilitation of a secure external memory (including without limitation shadow RAM or shadow-NVRAM and/or external storage of encrypted processor operands, data and programming bitstream, and on-demand in-the-field software/firmware updates). That is, some conventional processes (including but not limited to cryptographic operations) sometimes call for a processor to have on-board RAM or NVRAM which is used to dynamically store data used in computations, but for which it is desired to maintain that data in secure, protected memory where it cannot be discovered outside of the processor/IC (or even for those memories residing inside the processor/IC that are shared by multiple contemporaneously running Virtual-Machines or processes that could potentially pilfer data from one another); as noted earlier, for smaller size process technologies, it is quite difficult to do this especially for NVM since the technologies which might be used to provide for on-chip protected memory are sometimes incompatible with the process technology for the particular processor or other IC. Principles associated with the third set of embodiments can be used to address this difficulty by providing for on-chip encryption and decryption of this protected data, which then can be safely stored off-chip in unprotected memory (but in encrypted form). Elaborating, instead of storing data in protected, secure, on-chip memory, newer process technologies which leverage the novel techniques presented herein can optionally use a secure, unique key (e.g., based on elective checkpointed hardware signature measurement or measurements as described herein) to encrypt such data on-chip (e.g., in a processor IC), and then store that data off-chip (by way of non-limiting example, in conventional, 65 nm process NVM); this process can be optionally applied to permit external, encrypted storage of a programming bitstream (e.g., where firmware or other instructions are externally stored), or of dynamic memory contents (e.g., to create a "shadow" of internal memory which is then stored off-chip and retrieved and decrypted as necessary).

Other groups of embodiments will further be introduced below or otherwise apparent from the description below. These various embodiments and their various features can optionally be employed together, individually, or in any desired permutation or combination. For example, in one optional implementation, the various embodiments described herein can be combined to provide for a secure identity processor chip, where that chip includes circuitry to recover a secure, volatile or nonvolatile key and provide for a wide array of secure processing functions.

Specifically contemplated implementations can include "hardware logic," "circuits" or "circuitry" (each meaning one or more electronic circuits). Generally speaking, these terms can include analog and/or digital circuitry, and can be special purpose in nature or general purpose. For example, as used herein, the term "circuitry" for performing a particular function can include one or more electronic circuits that are either "hard-wired" (or "dedicated") to performing the stated function (i.e., in some cases without assistance of instructional logic), and the term can instead include a microcontroller, microprocessor, FPGA or other form of processor which is general in design but which runs software or firmware (e.g., instructional logic) that causes or configures general circuitry (e.g., configures or directs a circuit processor) to perform the stated function. Note that as this definition implies, "circuits" and "circuitry" for one purpose are not necessarily mutually-exclusive to "circuits" or "circuitry" for another purpose, e.g., such terms indicate that one or more circuits are configured to perform a function, and one, two, or even all circuits can be shared with "circuitry" to perform another function (indeed, such is often the case where the "circuitry" includes a processor). As implied above, "logic" can include hardware logic, instructional logic, or both. Instructional logic can be code written or designed in a manner that has certain structure (architectural features) such that, when the code is ultimately executed, the code causes the one or more general purpose machines (e.g., a processor, computer or other machine) each to behave as a special purpose machine, having structure that necessarily performs described tasks on input operands in dependence on the code to take specific actions or otherwise produce specific outputs. Throughout this disclosure, various processes will be described, any of which can generally be implemented as instructional logic (e.g., as instructions stored on non-transitory machine-readable media or other software logic), as hardware logic, or as a combination of these things, depending on embodiment or specific design. "Non-transitory" machine-readable or processor-accessible "media" or "storage" as used herein means any tangible (i.e., physical) storage medium, irrespective of the technology used to store data on that medium or the format of data storage, e.g., including without limitation, random access memory, hard disk memory, optical memory, a floppy disk, a CD, a solid state drive (SSD), server storage, volatile memory, nonvolatile memory, and other tangible mechanisms where instructions may subsequently be retrieved by a machine. The media or storage can be in standalone form (e.g., a program disk or solid state device) or embodied as part of a larger mechanism, for example, resident memory that is part of a laptop computer, portable device, server, network, printer, or other set of one or more devices; for example, such media can comprise a network-accessible device or something that is selectively connected to a computing device and then read. The instructions can be implemented in different formats, for example, as metadata that when called is effective to invoke a certain action, as Java code or web scripting, as code written in a specific programming language (e.g., as C++ code), as a processor-specific instruction set, or in some other form; the instructions can also be executed by the same processor, different processors or processor cores, FPGAs or other configurable circuits, depending on embodiment. Throughout this disclosure, various processes will be described, any of which can generally be implemented as instructions stored on non-transitory machine-readable media. Also depending on implementation, the instructions can be executed by a single computer and, in other cases, can be stored and/or executed on a distributed basis, e.g., using one or more servers, web clients, or application-specific devices.

Each function mentioned in reference to the various FIGS. herein can also be implemented as part of a combined program or as a standalone module, either stored together on a single media expression (e.g., single floppy disk) or on multiple, separate storage devices. "Module" as used herein refers to a structure dedicated to a specific function; for example, a "first module" to perform a first specific function and a "second module" to perform a second specific function, when used in the context of instructions (e.g., computer code) refer to mutually-exclusive code sets. When used in the context of mechanical or electromechanical structures (e.g., an "encryption module") the term "module" refers to a dedicated set of components which might include hardware and/or software. In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder, "nonce" or "means" for "any structure whatsoever" (e.g., "a team of oxen") for performing a recited function. "Hardwired" as used herein refers to implementation of a function as part of an inherent hardware design, i.e., such can be "built into the architecture;" this term encompasses situation where special purpose circuitry is necessarily designed to operate a certain way, as opposed to receiving some type of variable configuration. "Hash" as used herein refers to any one-way function, i.e., irrespective of whether such conforms to any conventional cryptographic operation. "Multistable" as used herein refers to an object (e.g., a circuit) having two or more stable states; "bistable" as used herein refers to an object (e.g., a circuit) having two stable states, i.e., a bistable circuit is one type of multistable circuit. "Metastable" as used herein refers to a circuit or condition that is unstable for a period of time and that then resolves to one of several stable states. The "multistable" and "bistable" circuits described herein are also "metastable circuits." Generally speaking, these circuits will have an unstable state or condition, where that state or condition at some point decays and necessarily assumes an (at least in theory) an unpredictable one of its stable states following a period of time of uncertainty in which 'stable' decay or damped oscillations take place; generally speaking, in some (but not necessary all) cases, these circuits involve some type of a race condition, the output of which is hard to predict or replicate based on knowledge of the circuit's general design. For example, a bistable (metastable) circuit as disclosed herein might have an output ("Q") that in theory is unpredictable when the circuit is excited, but which will assume a "0" or "1" logic state. In theory, upon excitation, such a circuit should assume a logic "1" output sometimes and a logic "0" output at other times, but in practice, due to manufacturing process corners, specific instances of such a bistable circuit may tend to produce a logic "1" output more often than not, or conversely, a logic "0" output more often than not. Note that while bistable circuits are discussed in various embodiments below as a special case of multistable circuits, it is contemplated that the techniques herein are generally applicable to multistable circuits having more than two stable output states (e.g., three, four, five, or indeed, any number of stable output states as long as an excited condition yields a theoretically unpredictable output given a general circuit cell design). In connection with various embodiments herein, the term "device" refers to an electronic product (e.g., based in a chip, system or board) with circuitry and possibly resident software or firmware; the term integrated circuit ("IC") typically refers to a die, packaged or otherwise; an IC can also be a device. A "hardware signature" as used herein refers to a measured or derived value (i.e., expressible as a number of bits) that ostensibly represents a piece of hardware; typically (according to the optional techniques discussed herein) a hardware signature is read from a device or otherwise produced as a result of measurements made of a device, and is progressively modified in an attempt to recover a "root key." A "root key" refers to a key, typically a secret key, that is obtained or derived from hardware and is intended as an anchoring point, i.e., that is intended to be fixed over time during a device's operational life. In some but not all embodiments, a hardware signature represents a measurement of a root key, i.e., where the measurement may or may not have error relative to the root key. A "device ID," or secure digital identity as use herein, refers to data that will be directly used to identify or to serve as a proxy for a specific device; typically but not always, the device ID is a secret key or a component of a private/public asymmetric key pair. In some embodiments, the device ID can be generated from (or be made dependent on) a hardware root key (i.e., the device ID is generated dependent on the root key, but the root key is not directly itself used as or derivable from the device ID). In other embodiments, the hardware root key is used to encrypt the secret key or private key (or other part of a device ID) such that it can be securely stored, i.e., portions of the device ID can be encrypted and stored off-chip (that is, in a manner that persists when power is removed); when the device is repowered, the device recovers its hardware root key without needing to expose that root key off-chip, and it then uses that root key to retrieve and decrypt the private key, thereby enhancing use of a unique device ID on an IC (e.g., an IC fabricated using new process technologies).

This disclosure will roughly be organized as follows: FIGS. 1A-1D will be used to discuss some optional, general principles pertinent to the first set of embodiments introduced above (i.e., relating to root key generation and checkpointing). FIGS. 2A-2C will be used to discuss some optional, general principles pertinent to the second set of embodiments introduced above, i.e., relating to metastable circuits and the measurement of physically unclonable functions. FIGS. 3A-3E, 4A-4C and 5-6 will be used to discuss more detailed embodiments, which exemplify specific attestation curve processes as described herein and which mix and match optional features from the first two sets of embodiments. Finally, FIGS. 7, 8A-9B and 9A-9B will be used to discuss some more specific applications.

Figure 2A:
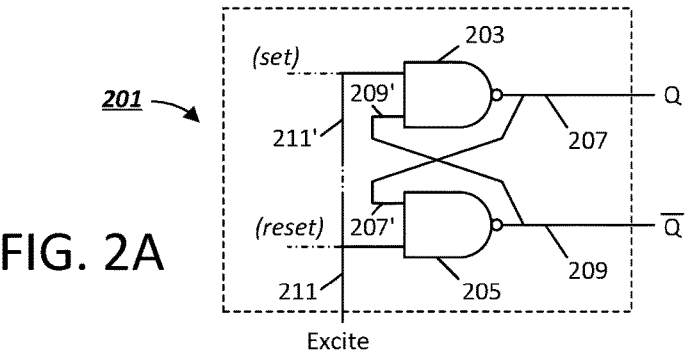
FIG. 2A is a circuit diagram showing a bistable circuit design that can be used as the basis for a PUF measurement.
Figure 2B:
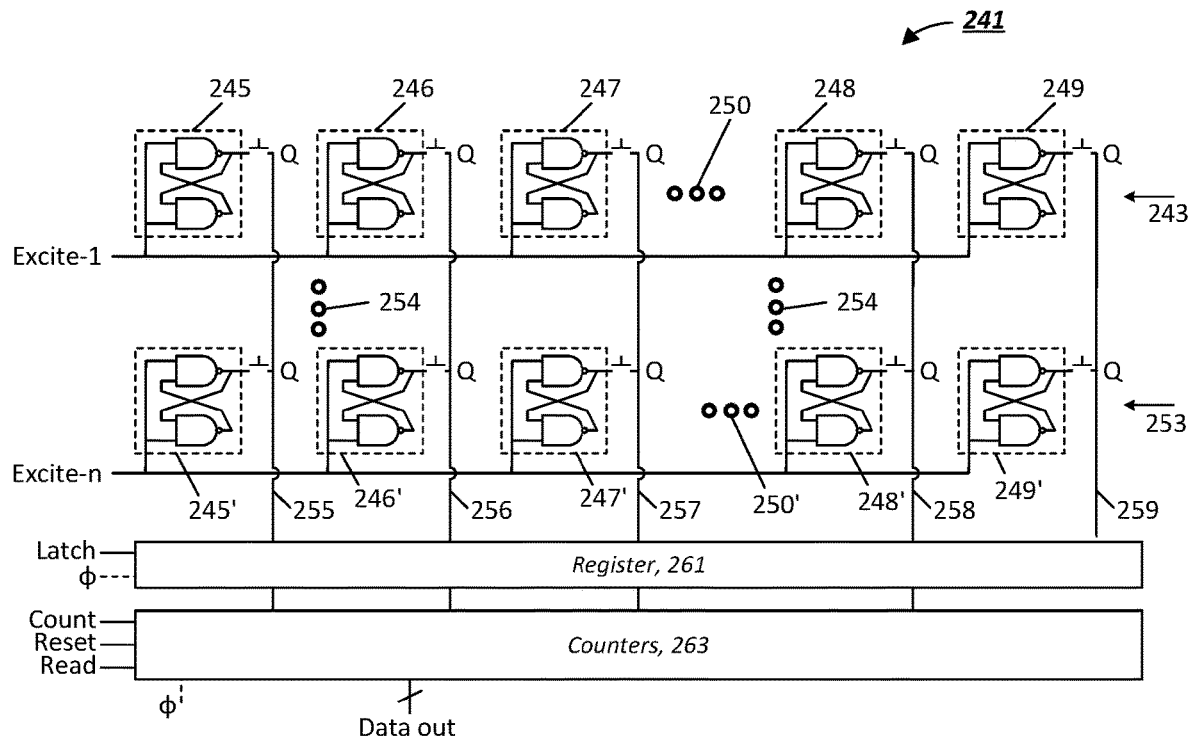
FIG. 2B is a circuit diagram showing one or more groups of bistable circuits that can be measured at the same time, e.g., as an entire row or array.
Figure 2C:
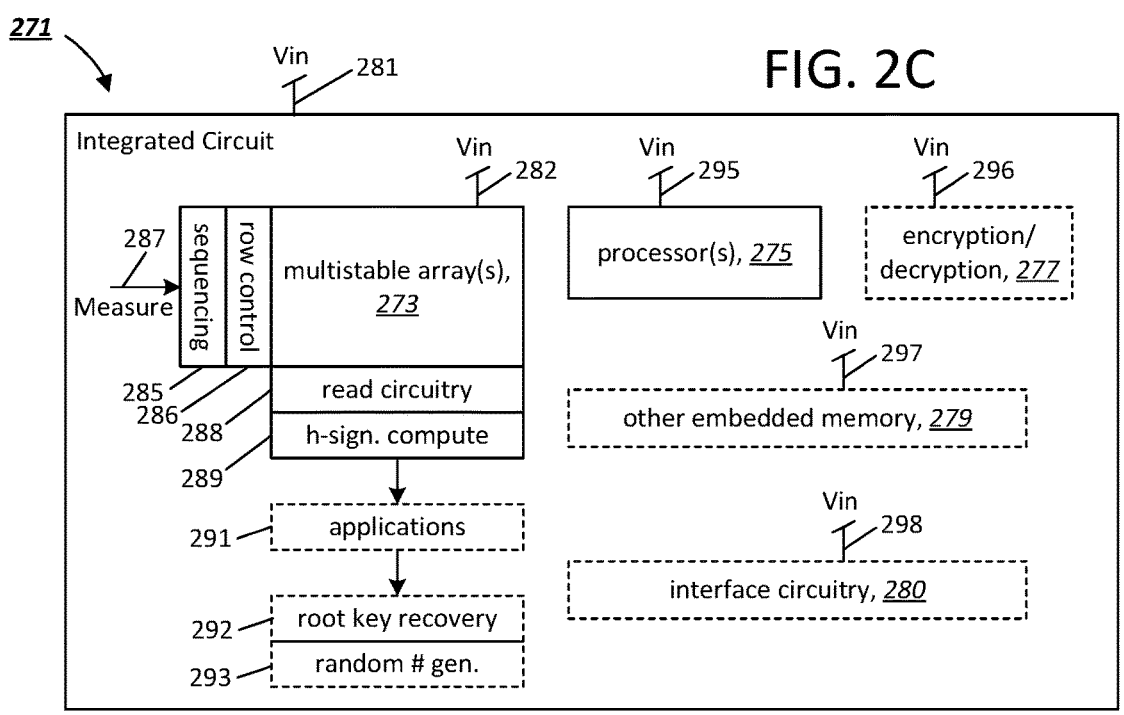
FIG. 2C is a diagram showing an IC having a bistable array that provides a dynamically measureable PUF.

FIG. 1A is an illustrative diagram of one embodiment of a device 101 (e.g., comprising hardware, or hardware with firmware) that produces a recoverable root key. The 101 device is predicated on the use of a group of metastable structures 103. These structures can be optionally resettable as a group, individually (circuit by circuit), or in subsets, as denoted by reference numeral 104, and can optionally be based on cross-coupled NAND gate design 105 (such as shown in FIGS. 2A-2C) or otherwise implemented as metastable circuits.

The depicted metastable structures 103 in one embodiment facilitates measurement of a PUF, that is, of an operation or result that is unclonable but that can be measured only from internally within the circuitry. Unlike many conventional structures, the depicted array is one where a PUF can be measured at a desired interval (whether at system, chip or array power-up or otherwise). For example, each metastable structure is a circuit that has an initially unstable condition where the unstable condition resolves and the circuit behaves in a manner that is not predictable or inherent based on its general design. For the cross-coupled NAND gates seen in FIG. 2A for example, at initial power-up or when the depicted "excite" signal is applied, the value "Q" should be unstable or indeterminate; when the "excite" signal is removed (or after a race condition is otherwise resolved), the value "Q" assumes a particular one of two stable output states. While this value is generally speaking, unpredictable in theory, for large arrays of such multistable circuits on an IC, due to IC-to-IC process variations, some subset of these multistable circuits will tend to predictably produce the same behavior on a repeated basis notwithstanding this supposed-unpredictability (e.g., for the group of multistable structures, some metastable circuit "cells" will tend to produce a logic "1" on a consistent basis once excited, some will tend to produce a logic "0" on a consistent basis when excited, and some will be truly unpredictable, sometimes assuming one state or another with mixed probabilities, i.e., notwithstanding that the general cell design is such that the resulting state should always be unpredictable); these tendencies or probabilities might be caused by subtle circuit variations, by design or by manufacture, which cause one pathway to be larger than another, or some type of applied bias to influence circuit operation, such as noise, capacitance or other parasitic or inherent parametric factors, in a manner that is unique and unpredictable for every multistable circuit "cell" on an independent basis for every produced IC. It is noted that an IC manufacturer typically tries to design the IC such that every metastable cell is perfectly identical or unpredictable, and it is the unintended (e.g., manufacturing-based) process corners that lead to variation and uniqueness that is random and that provides in theory a unique signature (if the number of circuit cells is sufficiently large). While propensity for this tendency cannot be physically detected based on observing the circuit as a practical matter (i.e., it is extremely difficult to externally measure pathway differences or these biases), a value and/or a statistical tendency of this circuit operation when exited (i.e., of the physically unclonable function or PUF) can be measured for the group of structures as a whole; in some embodiments, this is referred to as a "performance characteristic," e.g., the performance of the individual circuit relative to process corners is what is typically being measured. To this effect, a measurement circuit 107 reads the outputs of the group of multistable structures (e.g., of an entire array of metastable circuits) at a suitable measurement time, under the control of suitable hardware or instructional logic (e.g., firmware 108), to derive a measured hardware signature, per numeral 109. For embodiments where the metastable structures are dynamically-resettable (that is, they can be dynamically measured at any time), this hardware/instructional logic can optionally take multiple measurements, and average those measurements or otherwise subject them to statistical processes in deriving a stabilized version of such measured hardware signature, per numeral 110. Exemplary, optional implementations where this is done will be presented below.

As referenced earlier, circuitry over time can age, resulting in changing characteristics, and potential drift and unrecognizability of a device's hardware signature. To mitigate this, some embodiments disclosed herein provide a fault tolerant mechanism of recovering and continuing to use an originally marked or measured hardware signature (i.e., root key) notwithstanding such drift. Note that passage of time and circuit aging in a typical embodiment can be a cause of drift, as can potentially other factors, but note also that operating temperature and frequency are typically not a significant source of variation in circuit operation for the metastable structures and the resulting PUF; this is typically a beneficial and desirable quality for many hardware implementations, i.e., this implies that a hardware signature based on measurement of a PUF will be stable for an IC notwithstanding short term variation in operating conditions, and that IC operation will be stable over a wide temperature range (e.g., 0-to-70° C., −40-to-85° C., or over some other range), and over a wide operating frequency range (e.g., a few kilohertz to many gigahertz). As referenced by numeral 111 in FIG. 1A, hardware and/or instructional logic compares a measured hardware signature with data for sets of checkpoint data "CP" 113 (configured for some embodiments as attestation curve or "AC" data), to determine whether the measured hardware signature corresponds to the prior, checkpointed hardware signatures; if it does, then the measured hardware signature is deemed to be identical to an earlier, checkpointed signature (or the original root key). If the comparison does not result in a match, then it is inferred that there is some type of error (e.g., drift or instant random noise) in the measured hardware signature that should be corrected/removed. The checkpoint data (e.g., attestation curve data) can be stored in some implementations on-board the same chip or IC (e.g., in memory that is collocated with a processor), although it is possible in other implementations to store this data off-chip 117. Whether on-chip or off-chip, these codes will typically be stored in some type of NVM 115. In one embodiment, checkpoint data is retrieved and used for comparison on a last-in, first-out ("LIFO") basis, for purposes that will be explained further below, though again, this need not be the case for all embodiments. Note that, as referenced by numeral 121, the newly measured hardware signature (i.e., whether or not there is any drift represented) can be used to generate new checkpoint data which is then added to the already-stored data for prior checkpoints (i.e., the new checkpoint data can be used in future signature-measurement and checkpoint rollback processes). As noted earlier, in one embodiment, the checkpoint data and storage process can represent an architecture where none of (a) any current or previously-measured hardware signature, or (b) the original root key, can be derived from the checkpoint data alone (whether singly or collectively). That is, in one embodiment, the checkpoint data optionally is, or can be thought of, a one-way hashing function. In another embodiment, the checkpoint data can be thought of as corresponding to an "attestation curve," similar to the concept of an elliptic curve used in many modern cryptography processes, and it optionally presents a reversible process where different curves can be defined, each representing non-correlated (i.e., seemingly unrelated) checkpoint data. These options and capabilities will be discussed further below. In the event of error, circuitry 119 "rolls back" or modifies/corrects the current, measured hardware signature until comparison circuitry 111 detects a match with prior, stored checkpoints in a manner that confirms that the current hardware signature has been rolled-back (i.e., modified) so as to match a prior, checkpointed state. As indicated, this process provides a form of total error correction, where drift is removed and where the original (recovered) root key 125 is ultimately obtained as part of an iterative process. The result is a recoverable, correctable root key/device ID that can always be recovered during lifetime of a digital device, per numeral 127. Such key recovery process exhibits a demonstrably high degree of 'confidence' in its error-free behavior by means of a statistically-derived error-rate goal of $2^{-1280}$ (approximately equivalent to $10^{-350}$).

Note that with the described checkpointing process 123, it would be possible in theory to simply compare the most recently measured hardware signature with a checkpoint corresponding to the original root key, and simply directly recover the original root key via a single process that modifies the most recently measured hardware signature until process verifies that the current (e.g., as-modified) signature matches the original root key. While this is contemplated for some implementations, in other embodiments discussed below, an iterative, rollback process is presented which migrates each measured hardware signature back to the immediately previous checkpoint state, then the immediately-previous checkpoint before that, and so on, in a manner potentially entailing many iterations, until the earliest checkpoint state (i.e., representing the original root key) is encountered. The reason this iterative approach is used in some embodiments is based on a presumption that checkpointing is performed frequently enough so that drift is at most slight between different checkpoints, e.g., no drift at all, or 0-3 bits of drift only, and so forth. In a typical implementation, time consumed by iterative modification process is very short for slight drift (e.g., microseconds), and potentially much larger where many more bits of iterative drift are encountered and have to be resolved or guessed at once. More simply stated, for these embodiments, it is typically much faster to iteratively correct 20 bits of drift, one bit at a time as part of respective checkpoints, such that 20 checkpoints are used to remove e.g., 1 bit of drift each, than to try to recover 20 bits of drift at once via comparison with a single checkpoint only. In one implementation, for a given chip design (e.g., a particular FPGA design or other processor design), the manufacturer repeatedly tests the design before product release to identify worst-case drift, and ideally implements the checkpointing process so that checkpointing is performed frequently enough such that a worst-case marginal drift scenario will never be encountered. For example, as a result of simulation or characterization performed in connection with specific embodiments herein, it is believed that as a practical matter drift of no more than 2-3 bits per year of a hardware signature will ever be encountered for most hardware designs; note that these parameters may vary as a function of product design, manufacturing process reliability and quality and other factors. A particular hardware manufacturer can test its specific design for expected worst case drift, and can implement checkpointing so that no more than 1-5 bits of drift (or less) are ever encountered for any checkpointing iteration (i.e., relative to the previous checkpoint). For example, if 2-3 bits of drift per year are expected as a worst-case for a given design, a manufacturer might schedule checkpointing (and storage of new attestation codes) e.g., every 3 months or more frequently, with the result that no more than 2-3 bits (and typically 0-1 bits) of drift will be encountered checkpoint-to-checkpoint. As can be inferred from this discussion, frequency of checkpointing and specific checkpointing algorithm will to a large extent be an implementation choice. In some embodiments for example, checkpoint data management can employ a rolling-window approach whereby up to a predetermined number of checkpoints are retained, such as the thirty most-recent checkpoints (and an "epoch" checkpoint corresponding to the original root key), while older CPs are purged; such an embodiment may help contain the storage space required for checkpoint management. Naturally, other modifications are also possible; for example, another scheme might keep the most recent thirty checkpoints, while retaining one checkpoint per year as the result of a purge of older checkpoints.

Figure 1B:
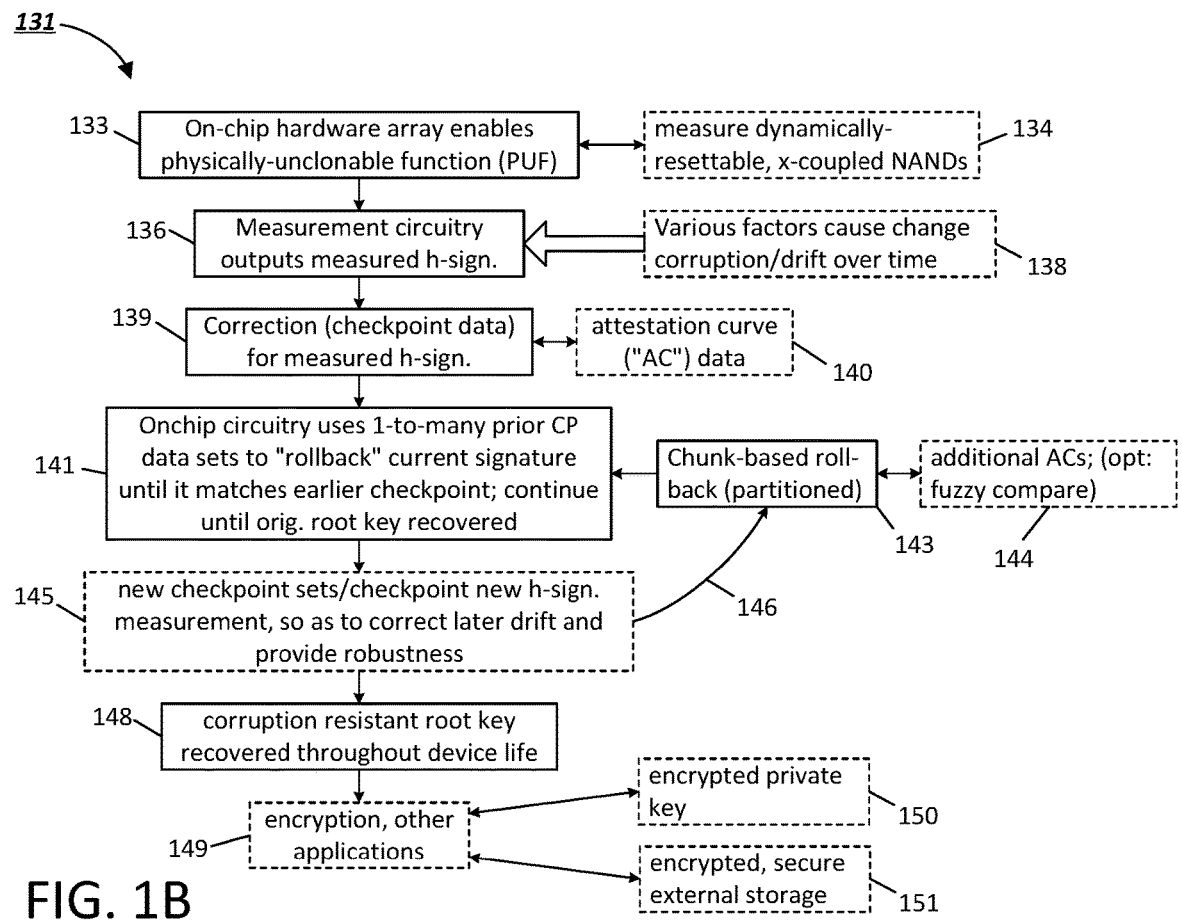
FIG. 1B is a flow-chart depicting one embodiment of techniques for recovering a root key notwithstanding drift (or other types of error).

FIG. 1B provides a flow-chart depicting another embodiment of techniques for recovering a root key notwithstanding drift (or other types of error). Techniques represented by FIG. 1B are generally designated using reference numeral 131. As noted by numeral 133, an on-chip hardware array enables measurement of a PUF to recover a volatile or nonvolatile key; as indicated by an optional feature box, 134, such a hardware array optionally can be comprised of individual metastable or bistable cells which, for example, can include cross-coupled NANDs such as illustrated in FIG. 2A, and which can be dynamically measured (e.g., excited to trigger the PUF) without needing to cycle power on and off to an entire chip or array (or otherwise dump needed memory contents internal to the chip or device). Per numeral 136, once the PUF is triggered, measurement circuitry then measures the resulting logic states of the various cells in the multistable array and outputs a measured hardware signature based on these states. This measured hardware signature can be the result of a single measurement of the metastable array, or the result of multiple measurements (e.g., averaged measurements, or measurements which otherwise result from or use statistical processes—as a non-limiting example, and as further described below, it is possible for example to measure each cell multiple times, and to "discard" a number of measurements which are believed to represent statistical aberrations, and to then average remaining measurements). In some embodiments, many measurements are taken with the dominant state represented by many measurements being output. Many variations of these processes and algorithms will occur to those having ordinary skill in the art.

As noted by numeral 138, it is generally assumed that one or more sources of error will corrupt a measured hardware signature (relative to an original root key), given the passage of time and the aging of a hardware device. In some embodiments, this error is assumed to be random, progressive drift, on top of random instant errors, manifested as a change over time in the measureable behavior (tendency) of a metastable circuit to adopt one state versus another when excited. Taking a simplified example, if a specific bit ("bit 4") of a measured signature (corresponding to a particular metastable cell, e.g., the "fourth" of the array) tends to produce a logic "1" when the PUF is measured, over time, drift might slowly change this tendency to a logic "0;" it is expected that this tendency will then persist for some period of time (i.e., further measurements will tend to yield a logic "0" for this bit). As still further time passes, drift might corrupt another random bit of a measured signature (for example, "bit 7," corresponding to the seventh cell of the array) and/or it might again further corrupt "bit 4" so that the measured signature for that bit tends once again toward a logic "0." The measured hardware signature can therefore represent some unknown amount of drift relative to a previous measured hardware signature; this drift can change over time, generally a period of months or years, affecting different bits of the signature.

The depicted set of techniques 131 therefore attempt to determine whether the measured hardware signature is the same as, or is different, than a prior "checkpointed" hardware signature and the original root key of the hardware device in question. Per numeral 139, checkpoint data is computed for the newly measured hardware signature. This data for example can optionally be a one-way or two-way encryption function that produces a data set that will provide a future checkpoint as to the just-measured hardware signature. Per numeral 140, in an optional implementation, this checkpoint data is attestation curve ("AC") data (further discussed below). In one embodiment, multiple sets of data are produced, each representing different encryption, with at least one of these sets being broken up into small data sets to facilitate fragmented analysis of whether a (large) measured signature corresponds to prior checkpointed value. For example, in some embodiments (discussed below) a signature can comprise many bits (e.g., 256, 512, 768, 798, 1024, 2048 or some other number of bits) and for one set of checkpoint data, the verification/comparison process can be broken up such that the-relatively large signature length (e.g., 768 bits) is broken up into smaller partitions or "chunks" (e.g., 24, 32, 42, 64 or a different number of bits, as non-limiting examples), and a drift mitigation process performed only on a chunk-wise basis. As an example, where a 768-bit signature is used, and where 42-bit chunks are used to localize drift, 18 codes or encryption products might be produced and stored for each checkpoint (i.e., 18*42=756, ~768). When a newly measured signature (e.g., a current hardware signature) is compared with a checkpoint, the new signature is divided into similar chunks (i.e., 42-bit subsets) and the checkpoint data is used, chunk-by-chunk to isolate which chunk might represent drift and which candidate solutions might exist for the correct, prior, checkpointed signature. Note that the particular values given here are illustrative, e.g., a different key lengths/signature lengths/chunk sizes and/or numbers of checkpoint codes can be optionally used in other embodiments; for example, one could use twenty-four chunks each representing thirty-two bit signature subsets (e.g., 32*24=768). This variation is an implementation decision, i.e., the fewer bits (chunk size) used, the greater the number of false positives (i.e., candidates), but the faster the run-time process for each chunk. Having many false positives may require longer downstream run-time processing, to weed out the false positives, and selection of a suitable chunk size will generally require balancing between run-time processing for the individual chunks and run-time processing associated with pruning, false positives. As noted earlier, a set of checkpoint data can comprise data to provide multiple checks, with at least a first one of these checks optimized for chunk-specific comparison, and at least a second one of these checks representing the un-fragmented hardware signature. That is, the chunk-based process can ostensibly increase the likelihood of aliasing (e.g., multiple different signature values matching chunk-based checkpoint data); providing additional full-length checks helps avoid this issue, and provides a means of discriminating (i.e., pruning) false positives produced from the partition-based process. Furthermore, progressive addition of full-length checks can mathematically trim the probability of aliasing to any desired target goal such as $10^{-300}$ which is a minuscule number that mimics a −6,000 dB 'single-point-pass' digital filter (conceptually similar to a 'band-pass' digital filter, whereby only a narrow band of data points can remain standing with all the rest of data points pruned). In one embodiment, for example, first encryption data for a checkpoint permits chunk-wise drift analysis to identify one or more "candidates" for a prior checkpointed signature (e.g., likely states of the prior checkpointed signature), while second encryption data for that checkpoint can used to discriminate between alternative candidate solutions, i.e., to identify the true signature checkpoint.

In one embodiment, data marking a checkpoint is hashed, or otherwise compressed or encrypted, in a manner that does not permit derivation of the measurement which produced that data, but in a manner that does help determine whether a later, similarly processed signature measurement, is the same. More specifically, this checkpoint data can optionally be "attestation curve" data; as used herein, an "attestation curve" or "AC" is a function where a group of bits is divided into a first subset of bits and a second subset of bits, and the first subset is used to reversibly encrypt the second subset. This form of checkpoint data is slightly different than a true hash, in the sense that the original data can be recovered from the encrypted data if certain assumptions are correct (e.g., one has knowledge of the encryption function and the first subset of bits, which are effectively used to provide an encryption key). The two subsets of bits can be of any desired size, e.g., in one implementation, the first subset is larger than the second subset, in a different implementation, the reverse is true, and in a third implementation, these subsets are of the same size. In a still more detailed embodiment, multiple ACs are computed for each checkpoint, at least one of these ACs specific to chunk-based comparison, and at least one that is a full-length AC; the first and second subsets of bits for each AC are differently selected, such that each AC therefore effectively presents a completely different non-polynomial curve which passes through a point corresponding to the checkpointed signature. The partitioning of one or more ACs facilitates localization and isolation of any detected drift, thereby permitting hardware (or hardware/firmware) to perform run time optimization and, practically speaking, correct drift in real time and roll back a given (current) signature to match a prior checkpoint. For embodiments for which this partitioning can produce multiple possible solutions, each full-length (unpartitioned) AC provides a means of discrimination among candidates and identifying the true solution for the prior, checkpointed signature from amongst the candidates. In one specific embodiment, the AC generation process is based on a function c=H(x,y), where x and y represent the different subsets of the bits of the hardware signature and where c is treated as a constant for a particular curve instance. An example of such an embodiment will be discussed further below. In a more specific version of this implementation, the "x" subset of bits provides an encryption key used to encrypt the "y" subset of bits using a format-preserving encryption ("FPE") process, such that the output (c) also has the same number of bits as in the "y" bits and is encrypted, such that the original xy bits of the signature cannot be recovered from the encrypted output (c) without more information. Because each AC presents different x bit subsets, each curve represents a different encryption process such that only one unique intersection point of these curves corresponds to the correct value of a checkpointed signature. Expanding on a specific example of the AC process, if chunk-wise analysis for a signature were to present 18 chunks, and analysis of those chunks with stored checkpoint AC data produced chunk-wise solution candidate sets of (1,1,2,1,1,1,3,1,1,1,1, 2,1,1,1,1,1), what this would indicate is that drift analysis for chunk 1 for the signature has produced one match of respective bits of the checkpointed signature under analysis, whereas chunk 3 has produced three candidate solutions for respective bits of the checkpointed signature under analysis. Further, considering all chunks together, there are 12 identified-possible solutions for the full signature (i.e., 1×1×2× 1×1×1×3×1×1×1×1×2×1×1×1×1×1×1=12). If the bits of these possible solutions (candidates) are scrambled in a manner corresponding to the different other attestation curves (i.e., ACs2-5), only one of the twelve possible solutions will produce an exact match with all four corresponding curves of the prior checkpoint, and this particular candidate will necessarily match the prior checkpointed signature. Naturally, this exemplary process represents one optional checkpointing algorithm only, but it is cited here as an introductory example of a specific embodiment that will be further discussed below. As noted, each AC presents a unique mathematical function, and the use of multiple curves generates a strong statistical likelihood that all curves will intersect at one point only for a hardware signature that exactly matches the signature used for the prior checkpoint.

In one embodiment, therefore new (corresponding) checkpoint data is computed for the newly-measured hardware signature and compared to the previously-stored data 143 for a prior checkpointed signature—multiple data sets for that prior checkpoint, such as data for multiple attestation curves for the same checkpoint, 144, can be used to uniquely mark the prior checkpointed signature. If the newly computed checkpoint data for the current hardware signature under analysis matches the checkpoint data for the prior checkpointed signature (e.g., for all of differently-encrypted sets of checkpoint data for that checkpoint), then the two signatures are identical. If not, then some type of additional, uncompensated error (e.g., some type of drift) is assumed to exist relative to the prior checkpoint under analysis; additional bit-wise modifications or tweaks are made to the current hardware signature and that signature is reexamined, with this process continuing until the correct prior checkpointed signature is identified. The result is effectively that the current hardware signature under analysis is modified as necessary to effectively roll it back to match the signature that served as the basis for previous checkpoint. In one embodiment, this rollback process can be iteratively performed, checkpoint-by-checkpoint, until the original root key is recovered, per numeral 141. In an alternative implementation, the newly-measured hardware signature can be directly compared to the attestation codes for the original root key (or some other, much earlier checkpoint, i.e., instead of the immediately previous one), with the algorithm taking fewer iterations to revert a current signature to match the original root key (but potentially with increased run-time per iteration, i.e., with increased processing time required in any given iteration to compensate for drift of more than a few bits). In yet another optional implementation, any checkpoint can be used to encrypt (and to externally store an encrypted version of) the root key, and thus, in such an embodiment, it may suffice to simply revert to one prior checkpoint, and then simply retrieve and decrypt the externally stored (encrypted key). Once again, many variations will occur to those having skill in the art, variations which are contemplated by and encompassed by this disclosure. Note that the checkpoint-by-checkpoint rollback process offers some advantages, e.g., drift/error can be broken up into multiple checkpoint recovery sessions (potentially minimizing run-time) and all external encrypted "clues" do not provide a full version of the root key or signature (e.g., encrypted or otherwise).

An exemplary, hypothetical comparison process illustrating these specific, optional techniques at this point will be useful: A July 1-measured 768-bit hardware signature is compared to, and deemed to exactly match, a prior hardware signature checkpointed on June 13. The current hardware signature is then compared to a prior checkpoint of June 2, and mismatch is detected; comparison then proceeds on a chunk-wise basis, such that the mismatch can be isolated to exist within a much smaller group of bits (e.g., within some subset of 42 bits representing a specific signature chunk in this example). Via a process that tests different tweaks or modifications of these 42 bits, candidate solutions to the correct 42 bits are identified and tested against the stored, prior checkpoint data; eventually, the correct value is deduced for these bits, thereby producing a comparison match, and the entire 768-bit hardware signature is thereby correspondingly corrected (i.e., it is "rolled-back" to match that prior signature). This current signature, as modified, is then compared (using the same underlying checkpointing/ encryption technique) to a still prior checkpoint of May 16, and again mismatch is detected in this hypothetical. The current signature is therefore once again modified, this time detecting and correcting three further bits of mismatch to thereby "rollback" the current signature to match the signature for the May 16 checkpoint. The current, once-again-modified signature is then subsequently compared to the first checkpoint, representing the original root key, and this comparison process indicates the current signature is identical to the original (volatile) root key; the original root key has thereby been recovered and the twice-modified-version of the current signature may be immediately applied in cryptographic applications (i.e., as the checkpointing process has verified that it matches the original root key).

Note that the comparison process can be performed in various manners depending on the form of the checkpoint data. For example, if attestation curves are used, each candidate solution can be divided into corresponding x and y subsets as discussed above—the x bits can then be used as a reverse encryption key, to revert (decrypt) from the checkpointed data ("c") of the attestation curve data to bits y', to determine if they match the y bits of the true solution. For a 42-bit chunk of the signature, where the bits are divided into 14 x bits and 28 y bits for example, a decrypted set of 28 bits ("y'," or "y-prime") can be compared to 28 bits of the candidate solution to determine if they exactly or closely correspond. Note this is not required for all solutions, e.g., where checkpointing simply hashes the candidates, each new candidate can be similarly hashed and compared to a corresponding hash for the stored checkpoint to determine if they match (i.e., to identify a candidate solution); aliasing amongst candidate solutions can similarly be resolved by using multiple different encryption processes and verifying a hash of the full candidate signature for each different encryption process.

As noted earlier, optionally, checkpointing is performed frequently enough so that checkpoint-to-checkpoint drift is small, facilitating fast on-chip processing. Per numeral 145, therefore, checkpoint data for a newly-measured hardware signature (i.e., identifying a pre-modified version of the hardware signature, optionally based directly on PUF measurement and/or based on processing or modification thereof) is stored to provide a checkpoint of this signature measurement for future use; this checkpoint data can be stored along with data representing prior checkpoints, per numeral 146, on a cumulative basis. This storage then provides a mechanism for any measurement of the PUF (hardware signature) which occurs in the future to be always rolled back to this new checkpoint, and subsequently, to the original root key, notwithstanding drift in the measurement of hardware signature. This provides, per numeral 148, a corruption-resistant root key recoverable throughout the life of a hardware device; the recovered root key can be immediately applied for encryption/decryption and other applications once the root key is recovered (per numeral 149). In one embodiment, this ability then permits further decryption of an externally-stored private key (or another key or other data), 150, which is then used in cryptographic operations (i.e., while safeguarding the root key from dictionary attack). In other embodiments, this permits encrypted, secure external storage of operands, instructions or other data (e.g., encryption of a programming bitstream or otherwise of external memory contents), per numeral 150. Various examples of these techniques will be provided further below.

Figure 1C:
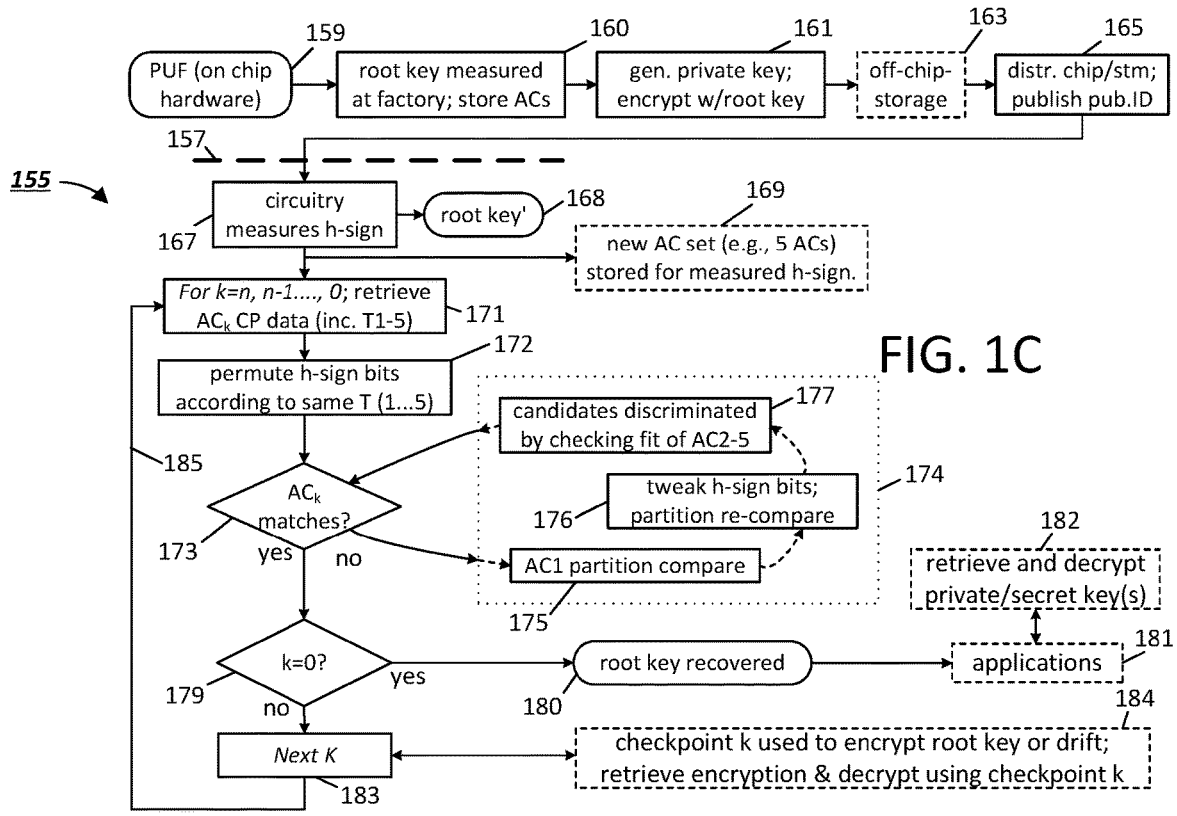
FIG. 1C is a flow-chart introducing the use of "attestation curves," which permit tracking of drift (or other types of error) and rollback of a measured hardware signature in a manner that incrementally or wholesale removes drift until the original hardware signature (i.e., the "root key") is recovered.

FIG. 1C is a flowchart showing an embodiment of techniques for using attestation curves to permit tracking of drift (or other types of error) and rollback of a measured hardware in a manner that progressively removes incremental drift until the original root key is recovered. These techniques are generally designated using reference numeral 155. The techniques rely on some source of an on-chip hardware signature, in the case of this embodiment, obtained from a physically unclonable function (PUF) 159. It is generally assumed that a given hardware design, for example, a given integrated circuit (IC), will include an array of metastable circuits (such as cross-coupled inverters, latches, NOR gates, NAND gates, multiplexers, and any myriad of other structures that implement a race condition or unpredictable but multistable output). The manufacturer of the IC typically structures the array design such that each metastable circuit corresponds to a "cell" that will be replicated many times; although in theory each cell as implemented on the IC is intended to operate identically in function, each metastable circuit in the array reflects different fabrication process corners (e.g., including cell site, per wafer, and per process-lot variations), which will result in a unique hardware fingerprint when the metastable circuits are measured together. Generally speaking, to provide sufficient uniqueness, the number of metastable cells can be selected to be at least 256-2048, or more, in number. For some embodiments referenced below, an array of 768 cells is used to provide a 768-bit hardware signature, as introduced previously. The IC design also advantageously supports some or all of the circuitry elements introduced above (i.e., either in dedicated hardware, or hardware that will be configured and/or controlled by firmware) to provide for future, on-chip hardware signature measurement and checkpoint recovery, as referenced previously.

Depending on implementation, either the IC systems manufacturer or a downstream systems integrator measures the PUF to identify and checkpoint a root key, 160. As indicated by the FIG., for the represented embodiment, this is done by identifying a hardware signature and by computing and storing attestation curve data corresponding to that signature. In one embodiment, this can be done by the IC manufacturer who measures the root key and stores attestation data for download via the web (i.e., such that the attestation data provides a published benchmark recoverable only by the party having the IC); in one embodiment, firmware can perform this function automatically on first power up or during a configuration step (e.g., assuming a network connection). In this embodiment, the IC manufacturer or a systems integrator (or even a user) can also establish a unique device ID, for example, by generating a private and public key pair unique to the device and encrypting the private key with the root key (i.e. per numeral 161). As indicated by numeral 163, this encrypted private key can be optionally stored off-chip, such as in a NVM chip that is in a separate IC from the PUF array. In one possible implementation, the IC manufacturer sells a first IC (e.g., having at least one processor and an embedded PUF array), and a systems integrator installs this IC on a board or module having other circuitry, such as the NVM implemented in a separate chip, and then measures and checkpoints the root key (e.g., with checkpoint data being stored in the NVM chip or, once again, remotely, e.g., in a web-accessible manner. In still another embodiment, the IC manufacturer can elect to firmly commit the root key that it had measured/harvested before shipping to its first-customer by recording some form of a check-sum (or hash signature) of the initial checkpoint data into an embedded OTP memory element (such as storing a 128-bit or 64-bit hash signature into the IC-embedded eFuse OTP) within the IC, so as to lock it firmly in not allowing any further modification of the root key in the field or by the OEM (or anyone else). In yet another variation, multiple different root keys can be established by respective processes, e.g., one specific to the IC manufacturer and another specific to a systems integrator. Many such examples will occur to those having ordinary skill in the art. To provide one non-limiting example of capabilities provided by these options, the IC manufacturer can be the entity that establishes and checkpoints the root key during IC qualification, and that makes the associated attestation data available by web download; during systems assembly, a systems integrator then provides firmware that recovers the root key using this attestation data, and that generates and stores a new checkpoint in local NVM that is part of the new system. Such a systems integrator can then also generate a private key and use the recovered root key to encrypt the private key which is then also stored in the NVM. The root key and private key are then ready for immediate use and/or application when the system is sold to and first run by a consumer (or other user). Many further examples and variations of these techniques will occur to those having ordinary skill in the art. Whichever version of this process is used, in some embodiments, when a device ID is established, and in association with chip and/or product distribution, a corresponding public ID can then be published 165 so as to provide for later authentication and/or identification of the chip and/or product in question (e.g., using a PKI process and associated certificate).

Line 157 demarks offline processes performed prior to first configuration and use, e.g., by the manufacturer or chip vendor (i.e., above line 157); steps below this line represent root key retrieval and anticorruption processes which are performed by a device post-distribution. The functions below line 157 can be performed at any point during the life of the IC, generally when it is desired to identify the root key (e.g., after the device has been de-powered, and when it is desired to turn it back on—note that this can vary depending on embodiment, e.g., in other embodiments, the process can be reperformed dynamically even when a product has not been switched off). As noted previously, each distributed IC (and its associated array of metastable circuits and PUF) appear identical in design and even the inspection of inner workings of such circuits likely requires decapping and destruction of the specific circuit in question. Art in tamper-resistant or tamper-evident techniques can be electively applied to protect the raw internal-only hardware signature measurements and signals from being actively probed or discovered. For any given IC, the hardware signature cannot be read as a practical matter until the PUF array internal to the IC array is "excited," with the ensuing "race condition" settlement then being measured to identify the propensity of the metastable cells in the array. For certain embodiments herein, as referenced previously, the array design can be made such that the PUF is dynamically readable, i.e., it can be measured at any time and does not require emptying an actively-used memory array or powering off-and-on a memory array or an entire IC. In connection with the remainder of the discussion of FIG. 1C, it is assumed that it is desired to measure a hardware signature of a specific integrated circuit; depending on design, this measurement, represented by numeral 167, can be triggered by hardware circuitry or instructional logic controlling hardware circuitry. The measurement is processed using any desired algorithm, which yields a signature value "h-sign." Data box 168 identifies this signature as "root key''" (root key "prime") to indicate that it corresponds to but may or may not be identical to the root key, i.e., there may be some drift.

As noted previously, processing logic (hardware and/or instructional logic) attempts to match this measured hardware signature against data marking a prior checkpoint (up to, and including, the original root key identified at the factory or when the IC was otherwise first configured, installed or integrated). To do this, the circuitry accesses (retrieves) one or more sets of checkpoint data 171 from on-chip or off-chip memory; in the FIG., a particular set of prior checkpoint data is denoted by the reference k, i.e., it is assumed that there are n prior checkpoints, where n can be anything from "0" (i.e., the prior checkpoint marks the root key) to a large number. In one embodiment, as previously noted, the checkpoint data by itself does not permit derivation of any hardware signature or the root key, but rather, provides clues as to whether a later, newly-measured hardware signature (or a modified version thereof) is correct. Note that this root key retrieval operation can only be performed by the IC, as the IC is the only party that has access to the measured hardware signature, while any attacker external to the IC is highly disadvantaged in not having such knowledge and can only resort to brute-force full-enumeration attacks upon the stored checkpoint data. As also noted by numeral 169, a newly measured hardware signature can itself be checkpointed, with encrypted data (e.g., attestation curve data) being generated and stored in the manner described—such data would provide a new checkpoint ("k+1") that can be used in the future.

The key matching logic then performs a loop process having one-to-many iterations, i.e., n . . . 0, as indicated by box 171, one iteration for each prior checkpoint to be used in recovering the root key. For each iteration, the logic takes the hardware signature under analysis (the "current" hardware signature) and sorts bits into x and y subsets, just as was done to create the earlier checkpoints, AC set$_{0, 1 \ldots n}$); this process can be performed using a common selection criteria that was used to create the prior checkpoint data. For example, if the checkpoint under analysis, for attestation curve "AC1" sorted bit nos. 8, 344, 67, . . . etc. into the x subset that was used as a key to encrypt y bits (and thereby form the attestation curve "AC1"), then this same sorting is used for the current hardware signature. Note that the sorting criteria is stored in clear text along with the checkpoint data (in some embodiments, this criteria is expressed as a transposition vector "T", as will be discussed below, one specific to each attestation curve used, e.g., T1 for AC1, T2 for AC2 and so on). In the first iteration, the checkpoint data (and sorting criteria) used for the matching/comparison process can optionally be the most recent checkpoint ($AC_n$), and as additional rollback iterations are processed to recover prior checkpoints, eventually the last checkpoint ($AC_0$) will be reached, corresponding to the original root key. As indicated by the decision box 173, the key matching logic then attempts to determine the proper x and y subsets of bits which correspond to the encryption of the counterpart bits of the prior checkpointed signature; in some embodiments, as noted earlier, this is performed by generating reverse encryption information and recreating the y bits which produced the attestation curve data, i.e., by calculating the function $y'=H^{-1}(x,c)$ using the x bits of the current hardware signature (i.e., to retrieve y' by decryption using these x bits and the prior encrypted output c). Recall that the x bits of each attestation curve were used to form encryption keys for the corresponding curve; for a curve under analysis, if there is any mismatch in the x bits selected bits and the counterpart x bits of the prior signature, owing to the use of bit diffusion/avalanche effect as part of the encryption process, the results will typically be quite different (i.e., there will be many bits of mismatch). By contrast, If the results match exactly, the bits of the current hardware signature under analysis are deemed a match candidate for the corresponding bits of the prior checkpoint (both for the x and y bits as mapped back to their positions in the current hardware signature. Finally, if there is only slight variation (e.g., less than a third of the bits are different following decryption), the drift can be assumed to reside in the operand (i.e., in the y bit subset). Naturally, it is of course possible to have both types of error (x and y bit error) present at once, and the described methodology resolves any x bit mismatch first, and then identifies any error remaining in the y bits. Numeral 174 denotes a dashed line box elaborating on some of the processes performed in such a detailed embodiment, i.e., the first (chunk-wise) set of attestation data, corresponding to AC1, can first be checked chunk-by-chunk, per numeral 175; it should be recalled that each chunk represents a partition of bits, such as 24, 32, 42, 64, or some other subset of bits of the original hardware signature. The chunks are originally selected simply by sorting the bits of the hardware signature (e.g., using a transposition vector) and then taking segments of the sorted bits (e.g., bits 1-42, 43-84, 85-126, and so on, for each respective chunk). By performing chunk-wise analysis, the logic is able to isolate any drift to a specific chunk or chunks to help minimize run-time processing. For example, if it is assumed that there is exactly 1 bit of drift in a current hardware signature, relative to a checkpoint under analysis, it might be computationally daunting to identify which of, e.g., the 768 bits of the signature, corresponds to the drift. By dividing the signature into partitions (e.g., 24 partitions each of 32 bits, or 18 partitions each of 42 bits, and so on), this permits the key matching logic to focus in on a small set of bits for analysis and radically minimize run-time processing requirements. In a contemplated variation, these bit set partitions can overlap in bits, though this is not required for all embodiments (e.g., they can be mutually-exclusive to partition, as exemplified here). As indicated by process block 176, the key matching logic tweaks the current hardware signature as appropriate, until it matches the encryption data for the corresponding bits, to identify one or more candidate solutions. Per block 177, it then identifies the correct candidate by looking to the other data for the same checkpoint (e.g., other, full length-attestation curves), as only one candidate solution should satisfy all of these functions, statistically-speaking. The likelihood of allowing 'aliasing points to pass the checking afforded by these full-length attestation curves is low, and is reduced by each incremental AC-test by the divider=MIN $(2^{|x|},2^{|y|})$ where $|x|$ is the bit-size of x and $|y|$ is the bit-size of y. For example, if $|x|$ is 256 and $|y|$ is 512, then the divider is $2^{256}$, which is roughly equal to $10^{70}$; Each additional attestation curve contributes to further cumulative reduction of aliasing likelihood; for a hardware signature of 768-bit size, with $|x|=256$ and $|y|=512$, the accumulation of checks by five additional full-sized ACs amounts to a net aliasing probability of $10^{-350}$, a truly miniscule number. The correct solution is then taken as the current hardware signature and is deemed equal to the prior checkpoint under consideration (k); per numeral 179, it is determined whether this corresponds to the root key (i.e., whether k=0). As per the path marked "yes" which exits decision block 179, if k=0, the root key is indeed deemed recovered (i.e., per data block 180) and the method proceeds to applications based on the root key (per numeral 181); as introduced previously, the decrypted root key can optionally be used to retrieve and decrypt (182) an externally-stored, encrypted private key (or other secret key). If the current checkpoint is something other than the root key (per the path marked "no" exiting decision block 179), the logic then decrements k and loops back for the next checkpoint iteration, as represented by numerals 183 and 185. The result of this progression is that the logic will "rollback" a measured hardware signature, in one or more iterations, to obtain he original root key. Note that in one embodiment, the described method operates checkpoint-by-checkpoint for every checkpoint, in order; however, this is optional, and it is also possible for the method to skip checkpoints, or to check the root key first, or to use other steps to reaching the original root key. For example, as indicated by numeral 184, and as referenced earlier, in one embodiment, a checkpointed hardware signature can be itself used as an encryption key, and used to externally-store an encrypted version of the root key; in such an embodiment, therefore, one can potentially simply recover the prior checkpoint, and then use the corresponding signature to retrieve and decrypt the externally-stored root key (or a vector of values that, when combined with or used to modify the existing signature, permits immediate recovery of the root key).

Reflecting back on some of the principles just discussed, the checkpointing process can be an attestation curve process. The checkpoint computation process and matching process can be structured in a manner that permits intelligent, deterministic derivation of drift, and its mitigation; for example, some embodiments employ an avalanche effect in generating attestation curve data, such that one bit of difference (e.g., in an input to the encryption process) cascades to many bits of difference in an output. The described attestation curve generation process can be structured such that a single bit or a small number of bits of difference in the high order bits of each segment (e.g., the "x" bits used as an encryption key) effects a high number of bits of difference in encryption or decryption of the low order bits (e.g., in the "c" bits output as the result of encrypting the encryption operand "y" or in the "y" bits output as the result of decrypting the decryption operand "c"); such a structure permits the key matching logic to further isolate and deterministically analyze mismatch between a current hardware signature and checkpoint. Such avalanche effect advantageously causes the chunk analysis (in AC1 for example) to produce very few false-positives, thus lightening the workload and run-time for subsequently exercising the full-size ACs. It also helps enhance the alias-rejection power for the full-size ACs to approach the ideal statistical model of the "aliasing likelihood divider" (i.e., MIN$(2^{|x|},2^{|y|})$, discussed above). Such a structure permits rapid (e.g., microsecond order) derivation of drift and rapid modification of the current hardware signature until it matches the checkpoint data (i.e., attestation curve data).

Note that many variations to the optional rollback and checkpointing processes described above will occur to those having ordinary skill in the art. Such variations are contemplated by this disclosure although not expressly set forth herein. As one non-limiting example, foreshadowing an embodiment that will be discussed further below, in one implementation, an "exact match" of attestation curve data is not required, and the described technique is effective to identify candidates that produce attestation curve data that is within a predetermined Hamming distance from attestation curve data for the prior checkpoint (k). Such a solution can be tolerated, because ultimately, given the number of attestation curves for a prior checkpoint (e.g., 5-6, or more), and the complexity of the hardware signature (e.g., at least 512 bits, preferably more), the comparison process will still as a practical matter yield only one solution that matches all data sets. In fact, in one optional embodiment further discussed below, this capability can be leveraged to further improve security and resistance of stored checkpoint data to attack; new checkpoint data can deliberately have random noise added (e.g., specific bits masked and/or flipped in value) up to the Hamming distance tolerance of the checkpointing algorithm. For example, in one specific embodiment discussed below, up to thirty-six bits of error can be deliberately injected into attestation curve data for each backup non-partitioned attestation curve (i.e., ACs 2-5) for a checkpoint being stored, as the described rollback process will still recover the correct prior checkpoint (i.e., there will still be only one solution that falls within the Hamming distance of all five of the attestation curves for the prior checkpoint); as mentioned, the likelihood of error is still so low that as a practical matter it will not occur in practice (e.g., even with this deliberate error, the likelihood of more than one solution will still be infinitesimally low). For example, the aforementioned incremental divider onto the probability of aliasing may be moderated slightly from $2^{256}$ down to $2^{220}$. Note that the errors injected are not stored anywhere, i.e., the stored checkpoint data "c'" (i.e., "c-prime," with c'≉c) encapsulates some error but is unrecognizably encrypted by the key x. Injecting error in this manner will make it even more difficult for an attacker (e.g., an attacker armed with a functioning quantum computer carrying an array of q-bits that can 'settle' into a unique solution) to identify the correct prior checkpointed signature, even with perfect knowledge of all externally stored attestation curve data representing the prior checkpoint. In an optional implementation, such deliberately injected error can be randomly varied, e.g., via a function that randomly adds 0-36 bits of error, to random bit positions in the encryption operand or encryption output (e.g., fn{y} or fn{c}→c'}. For embodiments where such error is injected into the scrambled "y" operand (c), the number of bits will carry over to the decryption of c' (y") provided that the decryption process relies only on transposition and selective bit flipping (e.g., the number of bits of error will still be within a predefined Hamming distance of the corresponding full-signature-length attestation curves when decryption is performed).

Figure 1D:
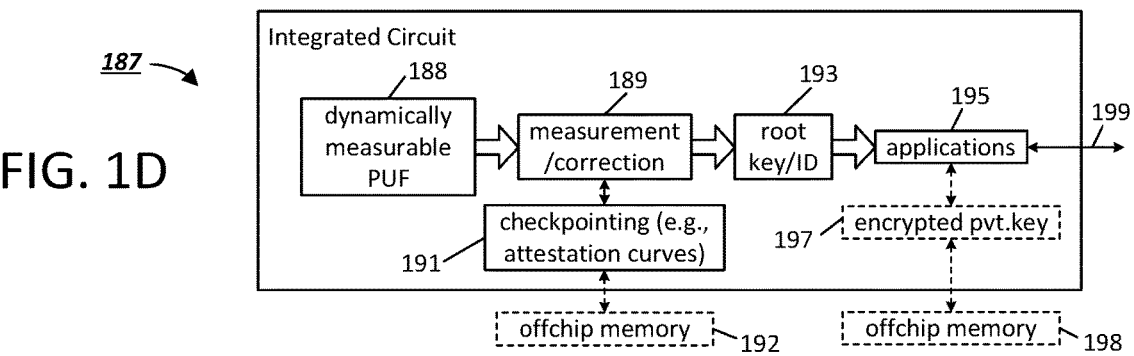
FIG. 1D is a block diagram of an integrated circuit ("IC") that relies on measurement of a physically unclonable function ("PUF") to obtain a hardware signature representing a root key.

FIG. 1D is a block diagram of an integrated circuit ("IC") 187 which provides a volatile root key or hardware-derived key. The IC includes an on-board array or other circuit 188 that supports a physically unclonable function (PUF). When it is desired to measure the PUF, on-board circuitry 189 performs this measurement to obtain a hardware signature. As indicated by numeral 191, the IC also has circuitry to provide for an on-board checkpointing function, which provides for recovery of an original root key notwithstanding presumed error in reading the hardware key. This checkpointing function can optionally rely on off-chip memory 192 to store error recovery information, such as by way of non-limiting example, error codes, hashes and/or attestation curve data, as exemplified earlier. The result of the measurement/correction process is a recovered root key and/or unique device ID 193, which can then be applied to various applications 195. In one embodiment, these applications can optionally include cryptography (e.g., encryption and/or decryption of inbound or output information 199). In another embodiment, the recovered root key can be used to decrypt an externally-stored encrypted secret or private key 197, as reference earlier. Optionally, these applications can include encrypting data that will be stored in external memory 198 or decrypting data from external memory 198. In another non-limiting example, the applications 195 can include hardware random number generation, e.g., a PUF can also be used to provide a random number generation seed, as will be described further below. Note that embodiments will be described below which use two PUF arrays per IC, processor or core; for example, one can be used for root key derivation, while the other can be dedicated to random number generation. As this statement implies, the IC 187 can include a single or multicore processor, or another form of processor, such as (without limitation) an FPGA or a GPU (graphics processing unit), and either the IC as a whole or each such processor or core can have an associated root key and checkpoint generation and recovery logic (e.g., in a manner dedicated to each core). The IC can be in the form of a standalone die, either packaged or unpackaged, a die mounted to a printed circuit board, or a die combined (stacked) with other dies, and it optionally can include any of the other techniques described herein (e.g., specific checkpointing processes and/or NAND based bistable cells), in any permutation or combination.

FIGS. 2A-2C are used to describe exemplary embodiments that permit dynamic measurement of a PUF, for example, rooted in an array of circuit elements in a processor or on an integrated circuit (IC). It is noted that use of the earlier-mentioned hardware signature, root key and other processes described above are optional in these embodiments, i.e., the circuitry and related structures in techniques described with reference to FIGS. 2A-2C provide a unique set of circuits and related techniques that can be practiced by themselves or optionally with one or more of the other features described herein.

FIG. 2A is a diagram showing a bistable circuit design 201 that can be used as the basis for a dynamic PUF measurement. This design refers to a single cell (indicated as a dashed box) that can be replicated many times, with each cell providing one bit of information. The depicted design relies on two NAND gates 203 and 205, with their respective outputs 207 and 209 being cross-coupled. This is to say, the output 207 of the first NAND gate 203 forms an input 207' to the second NAND gate 205, and the output 209 of the second NAND gate 205 forms an input 209' to the first NAND gate 203. One NAND gate (e.g., 203) has a second input that can be looked at as a 'set' input to the measurement cell, while the other NAND gate (e.g., 205) has a second input that can be looked at as a 'reset' input to the measurement cell. Noting that a NAND gate is inherently a negative-logic device, when the "set" input is activated to logic "0" and the "reset" input is deactivated, at logic "1," the primary output ("Q") of the measurement cell assume a state of logic "1," and when the "reset" input is activated to logic "0" and the "set" input is held high, the Q output will assume a state of logic "0". While the "set" and "reset" signals can be separated and used independently if desired (i.e., depending on design), in one embodiment, both of these inputs are tied together (i.e., are not separately used) and are instead used together as a single "excite" input 211. When the "excite" input is taken out of a floating or high-Z state or logic "1," i.e., held to logic "0," it causes the measurement cell to jump to an 'illegal' state, i.e., both of outputs Q and Q-bar assume a state of logic "1" and, when this signal is released (such as again left to float, or held at logic "1"), a race condition ensues; each output then assumes either a logic "0" or a logic "1" on a reciprocal basis. This happens a very short period of time after the "excite" signal is released, e.g., within about a nanosecond or less. In the ensuing time period before settling to a steady-state for both outputs, either a stable-decay or some form of a damped-oscillation could take place. While the reciprocal states assumed by outputs Q/Q-bar for example should in theory be unpredictable, as noted earlier, due to fabrication process corners, site variations, design bias or other sources of unpredictability, each measurement cell's output will tend to adopt the same logic state (either logic "0" or logic "1") with mixed probabilities when the "excite" input is deactivated (that is, held to logic "1" or high-Z). This then provides a PUF that can be measured to provide a potentially unique result (i.e., logic state and/or frequency or other statistical tendency to adopt the same state) for each measurement cell. Note that unlike other designs (e.g., such as based on a built-in SRAM array that is sensed just at power-up and then is used to store data), the design depicted in FIG. 2A can be dynamically excited and measured. That is, when it is desired to measure multi-stable cell 201, power to the IC, and/or PUF array (or memory array) is left "on," and the "excite" signal is simply pulsed (e.g., either individually for a given measurement cell, or for a group of cells, such as a row, column, other group, or even the entire array at once; to cite an example, in an array configuration, row access circuitry, sampling latches and other components can remain under power while any measurement cell is "excited" and its state or tendency remeasured. There are also no clocked elements in the measurement cell of FIG. 2A itself, and the depicted circuit is extremely fast, i.e., offering nanosecond-order response for each measurement iteration. To provide for a dynamic PUF function, the manufacture simply builds a group of multistable cells having the desired functional characteristics into the design of the pertinent IC at-issue and that manufacturer also provides circuitry to sample and/or process the measurement cell response after a period of time sufficient for the output state to settle following the deactivation of the "excite" signal. While many designs are possible, FIG. 2B introduces a specific array design (seen in FIG. 2B) having rows and columns of bistable PUF cells where rows of such cells are measured at once (i.e., at the same time). As alluded to earlier, other metastable circuit designs can also be used to create race condition in the depicted metastable circuit including by way of example NOR gates, latches, inverters and/or other elements or circuits.

FIG. 2B is a circuit diagram showing one or more groups of metastable circuits that can be measured at the same time, e.g., as an entire row or array depending on design. FIG. 2B shows an array 241 having a first row 243 of bistable cells and a second row 253 of bistable cells. The bistable cells optionally can be of the same design as introduced by FIG. 2A (e.g., a cross-coupled NAND gate design). The first row 243 of cells is seen to have a number of cells 245, 246, 257 . . . 248, 249 (e.g., sixteen, thirty-two, or some other number), and the second row 253 of cells is seen to also have this same number of bistable cells 245', 246', 247' . . . 248', 249' and so on. Each of the metastable cells depicted in the FIG. has a "Q" output as introduced above, and each of these cells is coupled to an "excite" signal common to the particular row, i.e., one excite signal shared for row 243 (i.e., "Excite-1") and one excite signal shared for row 253 (i.e., "Excite-n"); each excite signal can be (and typically is) separately driven, that is at a different time, to measure outputs of the corresponding row of cells, on a discrete basis. Again, while each row in the FIG. depicts only five cells, ellipses 250 and 250' denote that any number of cells can be included as a design choice. In one embodiment, e.g., in which 768 metastable cells are used in the array, each row can have thirty-two cells in the row, but this will vary again depending on design implementation. Each bistable cell is connected to a multiplexed bitline in a manner that is unique for each row but that is joined across rows; thus, cells 245 and 245' are effectively multiplexed onto bitline 255, cells 246 and 246' are effectively multiplexed onto bitline 256, cells 247 and 247' are effectively multiplexed into bitline 257, cells 248 and 248' are effectively multiplexed onto bitline 258, and cells 249 and 249' are effectively multiplexed into bitline 259. Where each row has thirty-two metastable cells, there will therefore typically be thirty-two such multiplexed-bitline connections (note that there can be more than this, e.g., in a design where Q and Q-bar outputs are both measured, e.g., to provide a differential reading or otherwise, there can be sixty-four multiplexed-bitline connections, one for each of Q and Q-bar, for each column of cells in the array). Also, while only two rows are depicted to simplify the discussion, there can be any number of rows, as denoted by ellipses 254. Thus, in one optional embodiment, there can be twenty-four such rows (and consequently twenty-four different "excite" signal lines, one for each row). For the depicted array, each "excite" signal line is pulsed at a different time, and the output of the pertinent bistable cells are then gated onto the corresponding bitlines, with all bitlines being then read to read bits for an entire row at once (i.e., thirty-two bits), and then when it is time to read the next row, the "excite" signal for the first row is held inactive (and for all other rows by the second) and the "excite" signal for the second row is then pulsed, and so on. The result of reading all rows in this manner will be to read all bits of the depicted array to take a reading of the hardware signature of the depicted array. Note again that such an array can be configured to be of any desired dimensions or configuration, e.g., it is possible to have a single, very long row of cells only (i.e., the entire array is sensed using a single, common "excite" signal), or to have individually sensed cells (i.e., each cell has a different, dedicated "excite" signal, or it shares an "excite" signal with other rows, but has a individually controlled input, e.g., which is selectively switched using a transistor, etc.), or any combination or permutation of the foregoing. An array having sixty-four cells per row and sixty-four rows would produce 4,096 bits that could be measured and typically used to derive a hardware signature having a similar number of bits, as one non-limiting example. Note that while this statement implies that in a typical design, each bit of a hardware signature is a function of one or more outputs or measurements of output of a corresponding single metastable cell of the array only, this is not required for all embodiments, e.g., it is in theory possible to have a signature structured in such a manner where a bit is dependent on the outputs of two or more cells, or is otherwise a function of two or more cells.

In the depicted array, just after each "excite" signal is pulsed (for any given row), a register 261 samples and holds the state of each of the bitlines (e.g., thirty-two or sixty-four bitlines if there are thirty-two bistable cells per row), and the sampled-and-held output is then provided to a set of column counters 263. As indicated by a signal labeled "ϕ," both of the register and column counters can optionally be operated on a clocked basis (alternatively, this clock "ϕ" can be factored into the depicted latch signal or enable signal for each of these circuits, or it can be omitted entirely, depending on design). The column counters are used to aggregate a number of PUF measurements, such as for example by counting the number of occurrences of when each bit's Q-output value is of logic "1" with each Q-output having reasonably stabilized after each independent pulsing of corresponding "excite" signal for the cells in a given row, and the count values can then be averaged or otherwise statistically processed per cell if desired. This is to say, for any given metastable cell, whether due to voltage or capacitive effects or other factors, there is no guarantee that the same output (logic "1" or logic "0") will be produced every time the corresponding row is excited. In one embodiment, each cell is measured a number of times, e.g., twenty or more times, such that the measured output for each row will be a corresponding array of numbers (e.g., 0 to 20); in one contemplated design (further discussed below), this number is 120 or more. In practice, what is typically observed is that the effect of process corners (and other sources of variation) are influential enough that most all metastable cells will tend to produce either "zeros" (e.g., a count of twenty measurements is close to "zero") all "ones" (a count of twenty measurements is close to "twenty"), while a small subset of the bistable cells will produce an intermediate value (e.g., a count twenty measurements is in the middle of these two values (e.g., close to "ten"). These counts can vary from one set of measurements to another, e.g., a given cell might produce a count of "twelve" one time and "fourteen"

another. Note that the cells or some subset of them in the depicted design can also be used as the basis of a random number generator, as will be described below. The depicted column register 261 and column counters 263 are seen to have further inputs and outputs of "latch" (the operation of the column register is driven so as to sample the various bitlines), "count" (strobing this signal causes the column counters 263 to load an output of the register 261 and add it to existing counted contents, column-by-column), "reset" (the counters are zeroed for each column), and "read" (output of a total number held by the column counters is enabled); the depicted column counters 263 also feeds a data output to provide an aggregated count for each column, i.e., with data being output either in parallel or sequentially, depending on design.

In one embodiment, therefore, the depicted array circuitry measures each row of metastable cells in sequence, but one row at a time, to collectively measure states of all cells in that row at once. For row 243 for example, row control circuitry (not depicted in FIG. 2B) repeatedly pulses the associated "excite" signal for that row. Following each pulse, but before the next pulse, the latch input of the register 261 is enabled or pulsed, such that a latch or other sample and hold circuit for each bitline adopts the state of the corresponding bitline, i.e., the bit output by the corresponding metastable cell of row 243, and the column counters 263 are controlled so as to add that held value, either a logic "0" or a logic "1" to an accumulated count for that bitline. Following a set of measurements (e.g., twenty in the example above, and 120 in one embodiment as referenced), with the column counters 263 for each column of cells aggregating a count of the logic states for that column, the aggregated count is read out and stored, the column counters 263 are reset, and the array control circuitry proceeds to the next row (e.g., the row control circuitry is controlled so that the next row and the next "excite" signal is used, to similarly obtain a set of measurements for the next row, and so on).

Data output using the exemplary scheme discussed above (i.e., multiple, aggregated measurements of each of 768 metastable cells), and an example process of how a hardware signature value is derived from the aggregated output count for each cell will be discussed further below. Relative to FIG. 2B, it should be noted that one embodiment provides a hardware array that supports a PUF that can be measured, dynamically (i.e., at any desired time, optionally including at power-up), that such measurements can be taken without needing to turn off power for the depicted array, and that either a single measurement or multiple measurements of each cell can be taken, depending on design. Each cell in the array is a multistable cell as discussed generally herein and is optionally a bistable cell based on a cross-coupled NAND design, i.e., as illustrated in FIG. 2A.

FIG. 2C shows an embodiment of an integrated circuit (IC) 271 having such an array 273. This IC is typically a packaged or unpackaged die as introduced previously, and also has on-board one or more other circuit structures, for example, one or more processors or processor cores 275, encryption/decryption circuitry 277, embedded memory (e.g., volatile or nonvolatile) 279, and interface circuitry 280 for communicating externally via one or more conductive signal lines (e.g., optionally separated address and data busses, or one or more serial links). A number of power supply inputs are also shown, each labeled "V-in," e.g., one or more external pins 281 to supply power to the die generally, one or more paths 282 to distribute power to the metastable array 273 (and associated array control circuitry and PUF measurement circuitry), one or more paths 295 to distribute power to the one or more processors or processor cores, one or more paths 296 to distribute power to the encryption/decryption circuitry, one or more paths 297 to distribute power to embedded memory 279 (e.g., in one embodiment, SRAM), and one or more paths 298 to distribute power to interface circuitry 280. In one embodiment, circuitry on-board the IC 271 can separately turn off the supply of power to subsets of the IC circuitry, for example, selectively removing power from the interface circuitry or encryption/decryption circuitry. Note however that because of the design of the metastable array, an associated PUF can be measured at any time, dynamically, without needing to power cycle the IC or the metastable array, or any set of its control circuitry; that is, for example, power supplied to the optional embedded memory 279 can be left "on" while the multistable array 273 is excited and measured, and similarly, support circuitry for the multistable array 273 can be powered while one or more cells of the multistable array are measured. Conversely, the multistable array can be selectively read at a time when power is turned off to other components, such as to the optional interface 280 or embedded memory 279. As but one example of this, it is possible read a PUF even while an associated processor or IC is in an inactive, standby, or other power saving state. The depicted IC also does not need to dump or shift contents of embedded memory 279 in order to perform PUF measurement.

To perform a PUF measurement in the depicted design, one of the processors or processor cores 275 issues a "measure" signal 287 to array control circuitry for the metastable array. Sequencing circuitry 285 then orchestrates timing of various measurement functions, including the sequential activation (i.e., "excitation" or pulsing) of each row of the metastable array and associated timing of that signal and ensuing measurements. Row control circuitry 286 is responsively controlled to pulse each row-specific "excite" signal in the manner desired, for the number of measurements desired, and read circuitry 288 is controlled so as to aggregate measurements for each metastable cell (e.g., a result of one, twenty, one-hundred twenty, or some other number of measurements per cell if desired, as exemplified above). These readings are provided to hardware signature derivation circuitry 289, which computes the hardware signature on the basis of the PUF readings (as noted earlier, in some embodiments, statistical processes are used to compute a signature, e.g., based on a designated-set or series of measurements, such as more than one iteration of the taking the one-hundred twenty or more readings/measurements for each metastable cell, and ensuing statistical processing). A measured hardware signature is then output for use in various applications 291, such as root key recovery 292, random number generation 293, cryptographic applications using encryption/decryption circuitry 277, and so on.

FIGS. 2A-2C have been used to describe circuitry that can be applied to PUF measurement. The depicted circuitry can optionally be used in conjunction with root key computation and hardware signature rollback, as was introduced in reference FIGS. 1A-1D; however, these circuits can also be applied to other applications. Similarly, the root key computation and rollback processes introduced with respect to FIGS. 1A-1D can optionally be used with the circuits introduced by FIGS. 2A-2C, but other circuits/hardware can optionally be used instead.

Note that again, a PUF array, such as the one described above in FIGS. 2A-2C, can be used in hardware random number generation as well as to measure a hardware signature. In one embodiment, a common PUF array (e.g., based on a relatively large number of cells, such as 768-element array as introduced above) can also be used for both random number generation and volatile (or nonvolatile) key recovery (i.e., hardware signature measurement and output). In some designs, a first PUF is dedicated to hardware signature measurement while a separate (i.e., independent) PUF array (e.g., having a similar number of cells or some other number, such as 256), is use for random number generation. Particulars of random number generation will also be discussed in reference to FIG. 7, further below.

FIGS. 3A-3E will be used to discuss specific embodiments associated with the use of a PUF to provide a hardware signature and the use of attestation curves to permit root key recovery over the life of a device.

Figure 3A:
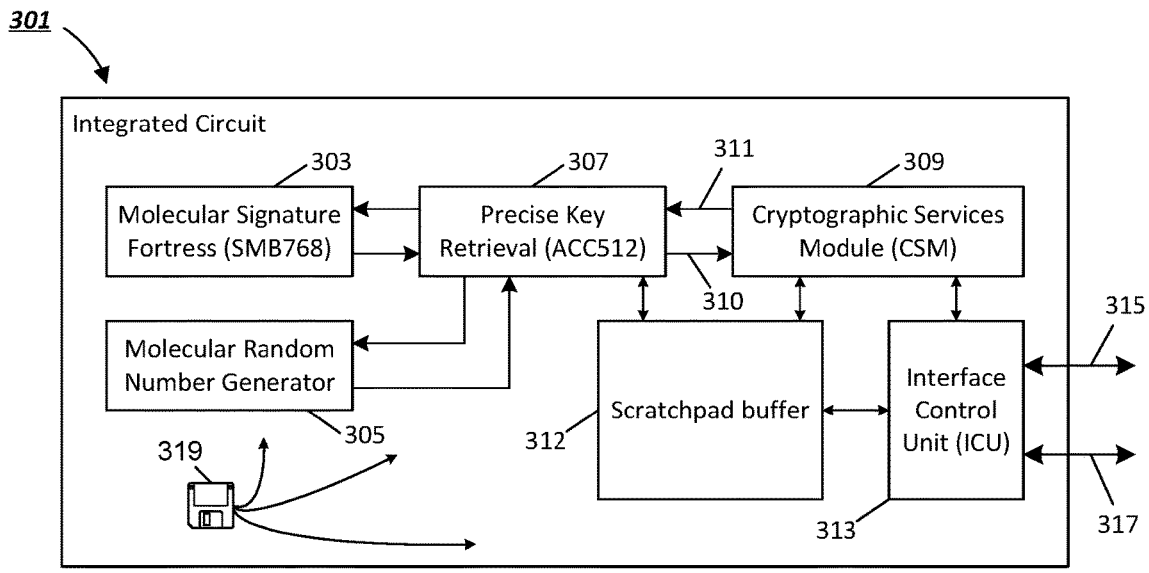
FIG. 3A shows an IC having a processor which implements some of the techniques discussed herein.

FIG. 3A shows an integrated circuit ("IC") 301 having built-in circuitry to measure a PUF and recover a volatile (or nonvolatile) root key. The IC includes a circuitry block 303 labeled "molecular signature fortress (SMB768)" which is a 768-cell PUF array (e.g., based on cross-coupled NAND gates and supporting circuitry as introduced with respect to FIGS. 2A-2C). The acronym "SMB" stands for "smart memory block." In the depicted embodiment, this circuitry block has twenty-four rows of cells, with each row having thirty-two metastable cells, as exemplified above. Naturally, other configurations can also be used depending on embodiment—by way of non-limiting example, some other number of cells can be used per row and/or a different column organization can be used (e.g., forty-eight rows of sixteen cells, twelve rows of sixty-four cells, etc.), and/or an aggregate number of cells other than 768 can be used. A 768-bit hardware signature is used in some embodiments to enable a 256-bit security strength, which provides resistance to brute-force full-enumeration attacks. The security strength can grow beyond 256-bits, if desired, e.g., in a manner proportional to the total bit-count in the implementation of the metastable cell array. As the various examples above indicate, the particulars of PUF array construction and organization will largely be a matter of design choice and will typically be dependent on factors such as the number of signature bits required, underlying IC architecture, fabrication process technology, the level of security required and other factors. In the depicted embodiment, circuitry 303 provides a 768-bit hardware signature value that is the result of multiple measurements, with output of each cell processed to identify a tendency to provide a logic "1" or logic "0." As noted earlier, the tendencies of these cells, and thus the bits of the signature associated with each cell, may vary over time.

The depicted IC 301 also includes a circuitry block 305 labeled "molecular random number generator" which is another PUF array, in this case having 256 cells. This circuitry block 305 in the depicted embodiment is also based on the same cross-coupled NAND cell design introduced above as introduced above in FIG. 2A. This circuitry 305 produces a 256-bit value (or an array or string of 256-words, each word having unpredictably varying contents in the range 0-120, for example) which is independent from the 768-bit signature produced by circuitry 303. However, as will further be discussed below, the circuitry block 305 also includes processing circuitry which produces a random number of desired length from this circuitry. For example, this circuitry can hash, encrypt, or otherwise apply a function to a measured 256-bit or 256-word value, in a manner which produces an avalanche or bit diffusion effect (e.g., the random number output by the circuitry changes radically, with many bits changing state, if even only a single bit of the 256-bit signature changes from measurement to measurement). For example, this circuitry can apply a function where a value (e.g., of desired length, e.g., one or more 256-bit signature measurements are combined and/or concatenated and/or chained together), optionally with one or more other front-end or back-end padding values, and are then subjected to a CRC32 division, AES or SHA-256 process to produce an output of desired length; as but one non-limiting examples of this, a 256-bit measurement could be chained (e.g., to form a 512 bit length value) which is then subjected to a CRC32 division process in a manner that produces a 256 bit remainder. See, generally, the techniques associated with avalanche effect generation described in commonly-owned U.S. Pat. No. 9,635,011, which has been incorporated by reference. The CRC32 division, AES and/or SHA-256 process create an output that changes radically with even slight entropy provided by different input strings—as a consequence, even if it is assumed that a 256-bit PUF array will tend to produce output strings 256 which are abstractly similar, enough bits will change state or have varied outputs that these hashing processes will generate seemingly completely independent numbers from respective measurements. In some embodiments, the circuitry 305 is used to produce a word value (e.g., 0-120) the provides a high order of entropy, or unpredictability; for example even if a bit-cell statistically outputs a logic-"1" most of the time, and consequently tends to produce a "120" count when measured 120 times, this aggregate measurement may vary with each measurement (e.g., 119 sometimes, 120 other times). Many variations for random number processing and production will occur to those having ordinary skill in the art, e.g., in some embodiments, other types of random number generators can also be used, and the use of a PUF array (or a second PUF array) for random number generation is optional. As one non-limiting example, described elsewhere herein, the PUF array functionalities needed by block 305 could be supplied by the 768-bit PUF array also used for circuit block 303, provided that such dual-use practice does not interfere with the nominal functioning of the circuit block 303. In the case of the depicted IC, the random number produced by circuitry 305 can be used to generate a series of vectors used for attestation curve generation, private or secret key generation for the processing and/or transactional needs of the IC, and/or encryption of certain memory operands, as will be further described below.

The depicted IC also includes a circuitry block 307 labeled "precise key retrieval (ACC512)." This circuitry 307 generates attestation curve cryptography data for each one of multiple attestation curves (e.g., 512 bit data for a 768-bit signature, where x=256 and y=512, and encryption data for partitions), and it also then uses retrieved checkpoints and associated attestation curve data to perform precise recovery of an original hardware root key linked to the IC 301. A recovered root key, or one of its derived descendants, or a decrypted secret key having been prior-encrypted by it, is then supplied via a path 310 (e.g., an internal bus) to a circuitry block 309 labeled "cryptographic services module (CSM)" which performs encryption and decryption services, optionally encrypting a private key or secret key for external storage and decrypting the same using the recovered root key; the decrypted private/secret key can then be used it in cryptographic operations of the IC 301. Alternatively or in addition, in some embodiments, the recovered root key can be directly used in cryptographic operations and processing of operands and/or instructions and/or other data that will be exchanged externally by IC 301; note that in such an embodiment, it may be desired to obfuscate or modify the root key in some deterministic or indeterministic manner so as to be unrecognizable (e.g., such that it appears as though a different key is used for encryption of data that will be transmitted externally)—in such an embodiment, a "mask" key or "obfuscation" key (e.g., element 621 in FIG. 6) can be encrypted and stored externally to permit key recovery for this purpose. The cryptographic services module can, as indicated by communication arrow 311, command root key recovery as desired, for example, in the event of a detected cryptography error, upon power-up of the IC, or otherwise; in one embodiment, the cryptographic service module is also responsible for triggering the checkpointing function. As a non-limiting example, in one possible design, a 768-bit hardware signature can be measured and directly applied when the IC 301 is turned "on," with rollback/checkpoint recovery triggers only in the event of that a cryptography error is detected (e.g., a decrypted private key, secret key or programming bitstream sources an error); alternatively or in addition, such an error can be used to trigger, on an ad hoc basis, identification and storage of a new checkpoint, i.e., an error is detected, used to infer at least one bit of drift, and this causes a new checkpoint to be stored. Many examples and variations will occur to those having ordinary skill in the art. In some embodiments also, the cryptographic services module 309 can generate new private or secret keys based on an output of the random number generator 305; for example, if an application on the IC requires a temporary secret key, a random number of specified length can be produced for this purpose and encrypted and exchanged using a device ID or private key (e.g., using a Diffie-Hellman key-exchange technique, whether with the classical version or with the elliptic-curve-based variety). The cryptographic services module, in one embodiment, can generate and maintain any number of private/secret keys or associated device IDs, e.g., generating them, receiving them from externally, and/or encrypting private or secret key elements for external non-volatile storage.

Circuitry 312 labeled "scratchpad buffer" is used to provide volatile memory processing/storage space for 'caching' arbitrary quantities of protected volatile or nonvolatile memories/keys, as well as for each of the key recovery, checkpointing and/or cryptography functions. In one embodiment, this circuitry can comprise an array of SRAM cells which provide internal volatile memory storage for operands and values. In one embodiment, when the root key is recovered, it is stored in this circuitry for use by the cryptographic services module 309. When power is removed from the IC 301 or the circuitry 312, contents of the circuitry 312 are lost. After power is restored, the root key can be recovered and against stored in this circuitry 309 for use in supporting cryptographic operations.

FIG. 3A also shows a circuitry block 313 labeled "interface control unit (ICU)." This circuitry orchestrates operations for some or all the circuit sub-blocks within the IC, and sends communications to and receives communications from destinations outside of the IC 301. In one optional embodiment, one or more conductive paths are used to directly couple these communications with these destinations. The one or more conductive paths can optionally include a separated command/address bus 315 and a data bus 317, or these functions can alternatively be combined into a single bus (e.g., 315) such as a serial communications link, which sends and receives packetized communications. For example, in various embodiments, one or both of depicted busses 315 and 317 can be compliant with communication standards such as ATA, SATA, USB, SPI, Display Port, PCIE and/or other published standards and their various versions (e.g., SATA, USB, PCIE versions 2.0, 3.0, etc.).

Finally, note that as often referenced herein, the depicted IC can also optionally include instructions that cause circuitry to perform some or all of the described functions, or any part of them. That is to say, in one embodiment, the various components of IC 301 and their associated functions are comprised purely of hardware logic; in other embodiments, one or more of the described circuitry and/or associated functions can be partially or completely provided by general purpose circuitry which is configured or controlled via instructional logic such as firmware in order to perform a described function, operation or process. The option to use instructional logic in combination with general purpose or configurable circuitry is denoted figuratively by a "floppy-disk" icon 319 in FIG. 3A, i.e., denoting the use of instructions (i.e., rather than mandating any specific format of non-transitory media).

Figure 3B:
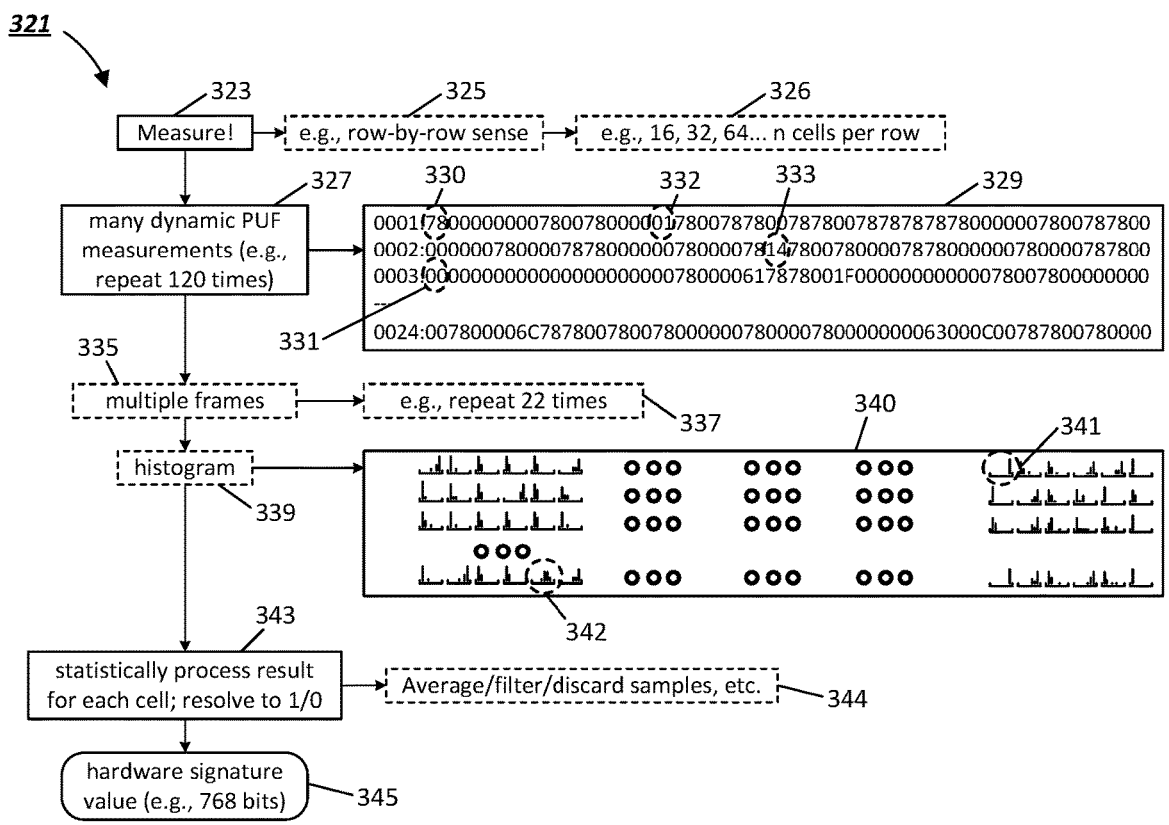
FIG. 3B is a flow chart showing one embodiment of techniques for measuring and processing a PUF to obtain a device hardware signature.

FIG. 3B is a flow diagram that illustrates one embodiment of functions for deriving a hardware signature, e.g., based on measurement of a PUF. Techniques represented by FIG. 3B are generally designated using numeral 321. Instructional or hardware logic issues a "measure!" command 323 to cause the read of an array of metastable cells. As indicated by process boxes 325 and 326, this reading can be performed row-by-row, with a number of cells per row dictated by array configuration, e.g., with thirty-two bistable cells being measured at the same time (as represented by embodiments discussed above). The measurement can be performed many times, for example, repeated one-hundred and twenty times per cell, as denoted by numeral 327. As indicated by a text box 329, the aggregated measurement can then be represented as an aggregate count per cell, for example a value between 00 (hex) and 78 (hex). For example, text box 329 shows a listing for each of twenty-four rows (0001:-0024:), where each row has 32 two-character values. For the first row (0001:), for example, the first cell is seen to have a hypothetical count of 78 hex, highlighted within a first dashed-line ellipse 330, corresponding to the aggregate count value of 120; this count indicates that for 120 measurements, the first cell of the first row (0001:) produced a logic "1" output every single time. By contrast, the first cell of the third row (0003:) is seen to have an aggregate count value of zero, highlighted within a second dashed-line ellipse 331; this count indicates that for 120 measurements, the first cell of the third row (0003:) produced a logic "0" output every single time. Not all bistable cells behave in so predicable a fashion, e.g., in the FIG. third and fourth dashed-line ellipses (332/333) highlight other values, respectively, the value "01" (hex) marked by ellipse 332, representing that for 120 measurements, the eleventh cell of the first row produced a logic "0" output nearly always, but produced a logic "1" output once, and the value "14" hex (decimal 20), marked by ellipse 333, representing that for 120 measurements, the sixteenth cell of the second row produced a logic "0" output most of the time, but produced a logic "1" output twenty times out of 120 measurements. Such results are typical, in that many of the cells will tend to produce results that are "all 1" or "all zero," while some subset of the cells will produce other values. As indicated by numeral 335, each such "frame" of 120 measurements per-cell can be repeated if desired, to produce additional signature values or for purposes of a statistical processing function to measure hardware properties. In one embodiment, represented by numeral 227, the signature is remeasured in 22 frames, each time taking 120 measurements per cell, resulting in 2640 measurements of each cell each time the array is to be measured. It should be noted that the number of measurements, and whether measurements are conducted in multiple "frames," are implementation choices. Generally speaking, one reason to perform multiple measurements is to statistically average tendencies, but whether based on straight averages or otherwise, any type of desired statistical processing can be performed. For example, with multiple measurements of each cell, per-cell statistical properties such as mean, average, weighted average, standard deviation, outlier population, other spread measures (e.g., 2a, 3a, etc.) and so on can, be calculated and used to enhance signature derivation. In one embodiment, for each frame, a histogram is optionally produced (per numeral 339), with hypothetical results as graphically illustrated in a box 340. Measurements of each individual cell are binned according to the value produced (e.g., values from 00-78hex can be divided into ranges of twelve to develop a rough probability measure, with a weighted mean computed based on upon bins' contents. For example, one highlighted cell (enclosed by dashed-line circle 341) is seen to have all values in the right most bin, associated with a logic "1". A second highlighted cell (enclosed by dashed-line circle 342) is seen to have intermediate results, with values binned in between logic "1" and "logic 0" with a slight bias toward logic "1." In one embodiment, a histogram is computed for each of 22 frames, and a spread measure (or 'outlier' measure) is computed and used to discard the worst 3 of the 22 measurements on each of the low-end and the high-end, with a mean (either the straight value or the bin-occurrence counts) of remaining frames then being computed and used to determine whether the signature value tends more toward logic "1" or logic "0." In one embodiment, even for results that are clearly intermediate, a decision is made as to whether corresponding metastable cell tends to produce a logic "1" or logic "0," i.e., a signature bit is identified and resolved on this basis, as indicated by numeral 343. Naturally, many different algorithms can be used, and can be based on averages, filtering, discard of sample, weighted probabilities, standard deviation and/or other statistical processes 344. This type of processing helps minimize random statistical aberration which might not represent drift of the root key or pervasive error in the measured hardware signature. The result of the illustrated processing is a measured hardware signature having a number of bits (in this embodiment, 768 bits), ostensibly providing a fingerprint for a specific IC in question.

Figure 3C:
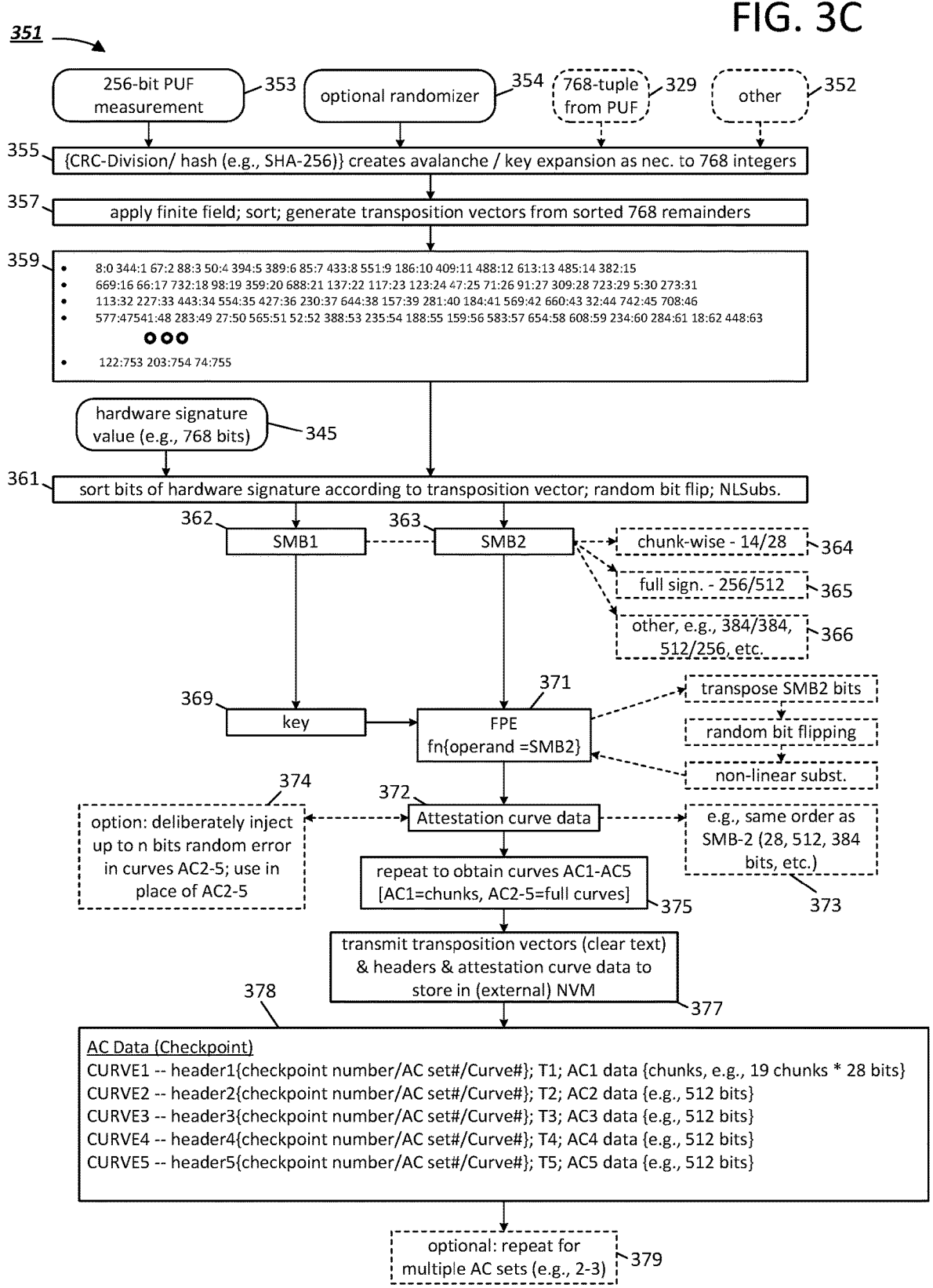
FIG. 3C is a flow chart showing one embodiment of techniques for creating a checkpoint for a measured hardware signature.

FIG. 3C shows one embodiment of processes that can be used to generate a checkpoint and associated attestation curves to mark a hardware signature. Techniques represented by FIG. 3C are generally represented by numeral 351.

More particularly, the process represented by FIG. 3C is triggered when logic decides that it is time to create a checkpoint to mark the state of a particular hardware signature (represented by box 345 in the middle of the FIG.). Various criteria by which the logic can make or base this decision are discussed in connection with FIG. 5; for purposes of FIG. 3C it should be assumed that a checkpoint is to be generated based on the measured hardware signature. Such a signature can be the product of the signature measurement process just discussed, e.g., with repeated, dynamic measurements of cells performed a number of times and statistical-processing performed to identify a set of bits which ostensibly correspond to the root key; the measured output is represented by box 345.

Note that it was earlier-mentioned that, in one embodiment, disclosed techniques can generate five attestation curves for each checkpoint, each representing different encryption parameters (e.g., each effectively representing a different encryption process, i.e., with different curve parameters). In one embodiment, a first task of the checkpoint generation logic (e.g., hardware and/or instructional logic) is to generate five corresponding transposition (or sort) vectors, i.e., to provide different criteria for sorting bits of the measured 768-bit signature for each attestation curve; each one of these will be used to shuffle bits of the hardware signature into a sort order specific to the attestation curve, thereby providing five different shuffling permutations which effectively create five different non-polynomial curves as a function of the encryption process described below. The reordered bits of the hardware signature are then processed to obtain encryption data for each corresponding curve. Such individualized bit reordering (or transposition) per curve provides advantages beyond simply allowing creation of multiple different curves, namely, 1) it actively disperses bits away from their originating positions such that clustered errors will not concentrate in a single chunk of a chunk-partitioned curve, statistically, and 2) it removes the possibility of correlation-attacks that attempt to analyze and correlate multiple checkpoint curve data, e.g., by trying to locate similarities and deviations.

Each transposition vector is of a general form analogous to an exemplary transposition vector represented by box 359 of FIG. 3C (i.e., it has a number of entries corresponding to the bits or positions of an operand that are to be permuted or transposed). For example, this hypothetical transposition vector indicates that one attestation curve's data is to be obtained by mapping the $8^{th}$ bit of the measured hardware signature to the first bit of the attestation curve input (i.e., "bit 0"), the $344^{th}$ bit of the measured hardware signature to the next bit (i.e., "bit 1"), the $67^{th}$ bit of the hardware signature to the next bit (i.e., "bit 2"), and so on. Foreshadowing the encryption process and associated curve generation process, of the 768-bits which have been reordered in this manner, the highest $\frac{1}{3}^{rd}$ of these bits form the value x (represented by SMB-1 contents, element 362 in the FIG.), and the lowest $\frac{2}{3}^{rd}$ of these bits form the value y (represented by SMB-2 contents, element 363 in the FIG. The x-bits form a key value which is used to encrypt the y-bits according to an attestation curve process. By doing this for multiple curves (e.g., AC2, AC3, AC4, AC5, etc., for each checkpoint, the data and encryption process for each curve represents a unique non-polynomial curve, with all curves intersecting at one common point, i.e., defined by the measured hardware signature. This will be discussed further in connection with FIGS. 4A-C. Note that this statement does not imply that a subset of these AC curves do not intersect at another point or points.

In order to generate each transposition vector, an input 768-tuple is first obtained. The 768-tuple is a vector having 768 integers or words of certain defined size. For other embodiments having different-length signatures, i.e., n-bits, an n-tuple can be obtained. In one embodiment, these integers are obtained by receiving a measurement from a PUF array, generating a random number from that measurement, and then processing the random number using some function to generate large random integers (e.g., a concatenation with 96 iterations); a modulo operation in a finite field is then employed to generate variable transposition, and the values are then sorted. For example, in one embodiment as noted earlier, a second PUF array can generate a 256-word PUF measurement value, represented by data input 353. This 256-word value is then provided to a process 355 which provides bit diffusion (i.e., avalanche) and key/value expansion as necessary; even though repeated 256-word PUF measurements will be correlated as to many of their bit values, there will exist sufficient entropy caused by cells which change or are unpredictable in state that such a 'hashed' value from the 256-word PUF measurement will provide sufficient entropy to obtain a truly random numerical output. Optionally, the state of such a hashed-value can be preserved for next invocation, to be used as a prefix to be concatenated with a new 256-word measurement, to generate a new hash-value. Such maneuvering offers the advantage of inheriting historical entropy while replenishing it with new entropy. For example, as indicated by box 355, the 256-word measurement can be provided to a hashing process that provides a 256 bit output (e.g., a CRC division, AES or SHA-256 process) which diffuses entropy represented by the 256-word measurement throughout the 256 bit hashed output. In some embodiments, the output from the PUF array is concatenated with itself or padded, e.g., to provide a 512 bit (or 512-word) or larger value, with the CRC32/AES/SHA-256 process then operating on this value and producing a remainder which is a random number. It should be assumed in this example that it is desired to obtain 768 relatively large integers. This can be obtained by obtaining multiple (e.g., 96) different 256-bit random numbers from the CRC32/AES/SHA-256 random number generation process, i.e., in this example, each random number provides 32 bytes of information, and 96 random number therefore provides a total 3072 bytes, or a four-byte integer for each of 768 values (i.e., each integer is $0$-$2^{32}$-$1$ in value). Per process 357, a prime number chosen in advance and of size of the approximate length of the signature in bits or larger is then used as a finite field operator to apply a modulo operation and to compute a remainder for each integer value, with sorting of the corresponding remainders then being used to determine the transposition vector. For example, if the measured signature has 768 bit positions, then a prime number preferably larger than 500-1000 can be chosen. An example here might be helpful—if it is supposed that the chosen prime number (and finite field operator) is 2423, and that the first three of the 4-byte 768 integers are 3633287885, 1504121945 and 1072682973 (i.e., in decimal), then the remainder for each of these numbers would be 1808, 1081 and 2135. The 768 remainders obtained in this manner (i.e., from the random number generation, concatenation, and modulo operations), are then sorted in numerically ascending order to generate a transposition order. Again using the example just given (1808, 1081 and 2135), the first three numbers of the signature might be sorted according to ascending order of these values (e.g., second, first and third) by application of the resulting sort vector. All 768 remainders are sorted, and used to generate a transposition vector, such that the transposition called for is typically much more complex than this simple example of three numbers only—for example, sample transposition vector 359 generated using this basic process indicates that the eighth bit of the measured signature should become the first bit of the transposition output, the $344^{th}$ bit of the measured signature should become the second bit of the transposition output, the $67^{th}$ bit of the measured signature should become the third bit, and so on. Such a process creates a truly random transposition vector each time based on the use of a random number generator. Note that the above description of transposition vector generation is exemplary only, and that many processes can be used to generate a transposition vector. As an example, the same PUF array that sources the hardware signature can be used to generate a transposition vector— this option is represented by data input 329 in FIG. 3C, e.g., 768 numbers (e.g., each 0-120 as per the example of FIG. 3B, from a single measurement frame) can be directly input into a CRC32/AES/SHA256 process, with 768 integers generated. Alternatively, a seed can be obtained from another source, as represented by data input 352. In other embodiments, as noted above, an optional randomizer (354), or a previously-generated and preserved random number, can be introduced and used to pad inputs to the CRC32/AES/SHA-256 process, i.e., to further increase entropy of the input and produce differing results; for example, a firmware developer could choose to provide an arbitrary, fixed front end pad (e.g., a time stamp) to prepend an input from the PUF, with a CRC32/AES/SHA-256 process then generating a remainder from this input. Many such variations will occur to those having ordinary skill in the art. See, generally, U.S. Pat. No. 9,635,011 which has been incorporated by reference, especially the discussion beginning at column 10 thereof, regarding the generation of transposition vectors. Again, to create multiple (very different) transposition vectors from the same input, prior to hashing/CRC division, the 768-tuple can be prepended with a different randomizer value, or a previous-step retained random number or string, for each transposition vector to be generated (e.g., the ASCII version of "transposition vector1," "transposition vector2," "transposition vector3," "transposition vector4" and "transposition vector5" can be used for this purpose, in the place of the secondary or auxiliary key depicted in FIG. 4 of the aforementioned patent). Owing to bit diffusion provided by process 355 and the fact that a remainder is produced from the CRC division/AES/SHA process, the result will be a radically different transposition vector even for the subtle input variations represented by this variation in the auxiliary key.

For each transposition vector, the values of the 768-valued output from process 357 therefore provide a mapping that will shuffle each bit of the hardware signature to a different bit position in a sorted or transposed output (i.e., as represented by box 361). Note that, per numeral 377, each transposition vector will be stored in clear text form along with the encrypted data for the corresponding attestation curve. Thus, to generate a checkpoint, five unique transposition vectors are generated and data for five attestation curves is generated, each according to a respective one of these vectors. Each sorted set of data (i.e., data for each attestation curve) is used one at a time in an encryption process to create the attestation curve data.

For each attestation curve, the resulting transposed data is first divided into high order and low order groups of bits. The higher order group of the transposed bits is placed in bit order a first smart memory block 362 (i.e., a first buffer, SMB1), while the lower order group of transpose bits is placed in a second smart memory block 363 (i.e., a second buffer, SMB2). As denoted by optional process boxes 365 and 366, nearly any desired division methodology can be used as a matter of implementation choice; for example, given an assumed signature length of 768 bits, the first third of these bits (i.e., the first 256 bits of the transposed 768 bits) can be placed in block 362 while the lower two thirds of these bits (i.e., the last 512 of the transposed 768 signature bits) can be placed in block 363; this allocation is as represented by box 365. If desired, a different division can be used, for example, half-and-half (e.g., 384 of the transposed bits in each of blocks 362 and 363), as indicated by box 366. Other divisions are also possible including divisions where SMB1 has more bits than SMB2. In connection with the encryption process of FIG. 3C, the bits in SMB1 (362) will form an encryption key (as per numeral 369)

while the bits in SMB2 (363) will form an encryption operand (i.e., as per numeral 371). As indicated by numeral 371, the encryption process in this embodiment is a format preserving encryption (FPE) process which uses a similar process to that discussed in connection with FIG. 6C, steps 625, 629, 631 and 633 of U.S. Pat. No. 9,635,011; that is to say, the bits from SMB1 (362) are used as a primary key to generate another transposition vector, which is then used to encrypt (shuffle) the contents of SMB2, to obtain an output also having the same number of bits (e.g., 512) as are in SMB2. The transposition vector can be generated by repeating or concatenating the primary key as necessary and then once again performing a CRC32 division and/or AES and/or SHA-256 operation, and using key expansion techniques to generate a set of integers (e.g., 512), and then performing a modulo operation in a finite field, just as described above. Thus, for example, in this embodiment, if SMB2 (363) has 512 bits, a 512-valued transposition vector is generated to uniquely shuffle the bits in SMB2. An ensuing step in this FPE process then creates a random bit flipping vector—this vector can be derived from the primary key or independently from it (depending on implementation). For example, in one embodiment, the 512 integers just referred to are converted to a binary vector having a bit value of logic "1" for each of the 512 integers which is odd and a logic "0" for each of the 512 integers which is even; applied to the transposed 512 bits from SMB2, each transposed bit in a position matching a logic "1" of the corresponding bit position of the 512 bit flipping vector is then inverted in state, to produce further modified data. Finally, in a third step of the FPE process, a nonlinear substitution can be performed to substitute subsets of bits for this modified data; the further modified bits from the bit flipping operation are provided in sets to a lookup table which outputs a similar number of bits (but potentially with wildly differing values)—as long as the lookup table maps a unique set of bits to a unique input, such an operation produces an encrypted output from which the original SMB2 contents can be recovered. For example, the 512-valued transposition vector can be used to create a nine bit nonlinear substitution table which maps every permutation of a nine bit input into a potentially very different nine bit output with 1-1 correspondence (e.g., the sort position is used to map a binary input to a binary output, such that for example if the first 2 of the 512 integers were the $289^{th}$ and $11^{th}$ largest values, respectively, a nonlinear substitution might map the binary inputs of 0 0000 0000 and 0 0000 0001 (i.e., the first 2 of 512 numbers in binary) to the binary values of 1 0010 0001 and 0 0000 1011 (289 and 11, respectively). One of the utilities of the nonlinear substitution step of the FPE is to deter differential cryptanalysis, which is sometimes used to attack cryptographic processes that are at least partially linear in nature. The result of the FPE process (e.g., transposition and/or selective bit flipping and/or nonlinear substation operations) is an encrypted version of the contents of SMB2, having the same number of bits as were in SMB2, as indicated by optional process block 373. Knowledge of the encrypted output alone does not permit an attacker to derive the full hardware signature (or a portion of it), i.e., the original hardware signature of 768 bits (represented by numeral 345) and even the contents of SMB2 have been transposed so as to be unrecognizable, but if the contents of SMB1 are known, then the encrypted output can be decrypted to recover the contents of SMB2. In one embodiment, this characteristic of the described encryption function is leverage to isolate and correct drift, i.e., a transposition vector to create the curve (e.g., a 768-valued transposition vector stored in clear text) is used in checkpoint recovery to create a same-transposition of a newly-measured hardware signature, and if the similarly sorted x-bits (SMB1) match, then a decryption process can be identified which will be the reverse of the encryption process—the newly-measured hardware signature and SMB1 contents, however, are only held within the chip associated with a volatile (or nonvolatile) root key, and therefore only this chip can be used to recover the volatile root key from the externally stored, encrypted attestation data. In cryptographic-speak, the chip has an unfair advantage over an attacker external to the chip, as the chip is the only party having knowledge of an approximate-copy of SMB1 and SMB2 as supplied from a new hardware measurement. In one sense, the encrypted output (e.g., 512 bits for a curve) is akin to a hash in that it represents a condensed, encrypted derivation of the full 768 bit hardware signature; however, unlike a typical hash, the described encryption operation is a completely reversible process given knowledge of the bits of SMB1, the transposition vector (i.e., used to populate SMB1/SMB2) and any unique information used to generate the bit flipping and nonlinear substitution operations. Also note that, as will be described further below, this function is of a general type where $c=H(x,y)$, where x are the contents of SMB1 (362) and y are the contents of SMB2 (363) and c is the encryption output (e.g., stored in NVM); the processing just described produces an output of the form $c=Fn\{x,y\}$ where x are the bits of SMB1 and y are the bits of SMB2, and c is the attestation curve data 372 (and can be stored externally). As indicated earlier, this "encrypted" data (e.g., 512 bits for AC2-5) is stored together with the clear text transposition vector for the pertinent curve (i.e., per block 377), with any pertinent headers, e.g. so as to identify the specific encryption particulars, and so as to permit a root key recovery process to match the specific checkpoint and specific attestation curve to candidates for purposes of later checkpoint matching.

As noted by process block 375, the basic process just described is repeated in one embodiment for a number (e.g., 5) of different attestation curves to mark a single checkpoint, and these curves together can be said to be a single attestation curve set. One of the attestation curves however is processed slightly differently in the depicted scheme, namely, the one curve (AC1) that will be used for chunkwise comparison. That is, as represented by process box 364, in one embodiment, following transposition (e.g., per block 361), the signature is divided into chunks or partitions, and each of these is then individually encrypted. For example, if the chunk size is 42 bits, the first fourteen bits can be used as a primary key to generate a 28-valued transposition vector, bit flipping vector and nonlinear substitution table in exactly the manner just described, in a manner where these vectors are separately identified for each chunk. This size (i.e., 42 bits) represents a design choice, chosen for several run-time related advantages; note further that this process does not have to encompass all bits of the measured hardware signature, e.g., all 768 bits in the current example. For example, while the first attestation curve AC1 uses a dedicated transposition vector to permute the 768 bits of the measured hardware signature in a manner unique to that curve, in one implementation, only the first 756 bits of the ensuing transposed value are used to generate curve data; the method divide these 756 bits into eighteen chunks of 42 bits each, e.g., chunk 1=bits 1-42, chunk 2=bits 42-84, chunk 3=bits 85-126, and so on. Each of these chunks represents any possible subset of the bits of the measured hardware signature, i.e., continuing with the hypothetical introduced earlier, the first chunk may have as its first three bits the $8^{th}$, $344^{th}$ and $67^{th}$ bits of the measured hardware signature, i.e., as sorted by the transposition vector, as per the example above. The method then proceeds in the general manner described above for each chunk, e.g., the first third (14 bits) can be loaded to SMB1 (362) while the lower 28 bits of this chunk are loaded into SMB2 (363); this demarcation is represented by optional process block 364. Again, this division is not required for all embodiments and represents a design choice, e.g., it is possible to instead divide the 768 bits into twenty-four chunks of 32 bits each (24*32=768), or some other allocation. The output of this process is encrypted attestation data having 28 bits for each chunk, which will later be used in chunk wise comparison as part of hardware signature roll back, as described above.

Dashed line block 374 indicates that the SMB2-input (and/or in some embodiments, the output) for certain curves (e.g., ACs 2-5) can be selectively and randomly masked. That is, in one embodiment, before applying the encryption function, a number of bits in SMB2 can be selectively masked and/or flipped (changed in value). As noted earlier, in one embodiment, a number of bits of error can be tolerated in the (later) comparison process in matching checkpoints, e.g., a "fuzzy compare" process can be used which deems any attestation curve a match if p bits or less can be further flipped (changed) to produce an the same value as the SMB2 contents; as noted below, even with this error and multiple candidates considered, the probabilities are such, given a reasonably long hardware signature length (e.g., 512 bits or more) that it is extremely unlikely (i.e., as a practical matter impossible) that two solutions will match all five attestation curves for a given checkpoint (i.e., even with such deliberately injected error). In one embodiment, therefore, up to p bits of random error is deliberately injected into the encryption operand. Note that such random error can also potentially be injected into the output (e.g., for processes which do not use non-linear substitution, but which rely only on bit flipping and transposition, such deliberately injected errors of m bits will likewise carry over to exactly m bits in the later decryption process). Whichever, process is used, the data output (i.e., attestation curve data 372) can then be externally stored. In experimental usage, it has been found that p can be as large as 36 for 512-bits of attestation data and five curves; this is to say, with five attestation curves, even if 36 bits of error are still added as noise to each curve, it is still computationally unlikely (i.e., practically impossible) that more than one candidate solution will fit all five curves. That is, informal statistical modeling indicates that the aliasing-rejection power of the exemplary attestation curves provides an aliasing-likelihood reduction divider of $2^{256}$ without deliberate error injection, and a reduction divider of no less than $2^{220}$ for up to 36-bit error injection. This process helps further mask attestation data from a would be attacker, i.e., rendering it practically speaking impossible that an attacker unable to read (measure) the PUF can reverse the attestation data to thereby identify the root key.

As this process is completed, a checkpoint is marked in storage by a complete set of attestation curves, five (AC1-AC5) in the case of the embodiment represented by FIG. 3C. Box 378 shows an exemplary format for the storage of these curves, e.g., each curve can comprise a header, which identifies checkpoint number (or another checkpoint designator, e.g., date), an attestation curve set designator (where multiple sets of curves are used to provide redundancy for a given checkpoint), and an identifier for the particular curve (e.g., AC1-5); each curve is also accompanied by a clear text version of the corresponding transposition vector used to bit-shuffle the original hardware signature (i.e., T1-T5); finally, each curve is accompanied by the encrypted output, i.e., that version of SMB2 that was produced using the FPE techniques as described above. As just referenced, multiple sets of these attestation curves (i.e., multiple sets of five curves each) can optionally be produced for a single checkpoint, for example, to provide redundancy or to increase the number of bits of random error that can be deliberately injected (e.g., to increase the error that can be tolerated by the fuzzy compare process).

Note that many variations are contemplated in connection with the techniques exemplified above, variations which will readily occur to those having ordinary skill in the art. For example, any number of attestation curves can be used to form a set, depending on embodiment. In one implementation, a true hash is used for different permutations of the measure hardware signature, instead of attestation curves. In yet another embodiment, a different signature length is used, and/or different encryption process is used. In still another embodiment, attestation curves are again used, but a different mechanism is used to differently permute versions of the measured hardware signature, or to create subsets or other products of that signature for use as process operands, or to perform encryption. In yet another variation, as represented by dashed-line (optional) processes in FIG. 3C, a subset or permutation the described encryption operations are performed, for example, nonlinear substitution only, or bit permutation only or random bit flipping only, or some combination of these operations.

Each checkpoint provides a mechanism to roll back a later, prospectively measured hardware signature to have the same (or similar) state to the checkpoint. The checkpoint data can be stored in-chip, in-system, in NVM (e.g., on a different chip on the same board or in the same system) or in a manner that is remotely accessible (e.g., via local area network "LAN" or wide area network "WAN"). For an in-chip solution, one-time-programmable ("OTP") memory elements can be advantageously employed to store a succinct check-sum or hash-signature, as a basis for later time authenticity verification, of some or all the early-stage checkpoint data, such that sub-sequent users or operators cannot wipe-out the established and 'locked' checkpoint data or attempt to replace the checkpoint data for any unauthorized or illicit purpose. For example, as noted earlier, in one embodiment, an IC manufacturer measures a hardware signature and checkpoint data in a manner accessible via the Internet (i.e., for download). When a systems' user or integrator runs a configuration process, the IC recovers its root key by downloading and using the posted attestation data, via WAN (e.g., via a wireless network) and using that retrieved data to recover the root key. Further checkpoints can then be established and stored locally on the system (e.g., in a NVM chip) or they can also be stored remotely (e.g., in a manner remotely accessible by LAN or WAN). Once again, many example implementations and capabilities will occur to those having ordinary skill in the art including have two or more root keys and associated checkpoint systems, as introduced previously.

Figure 3D:
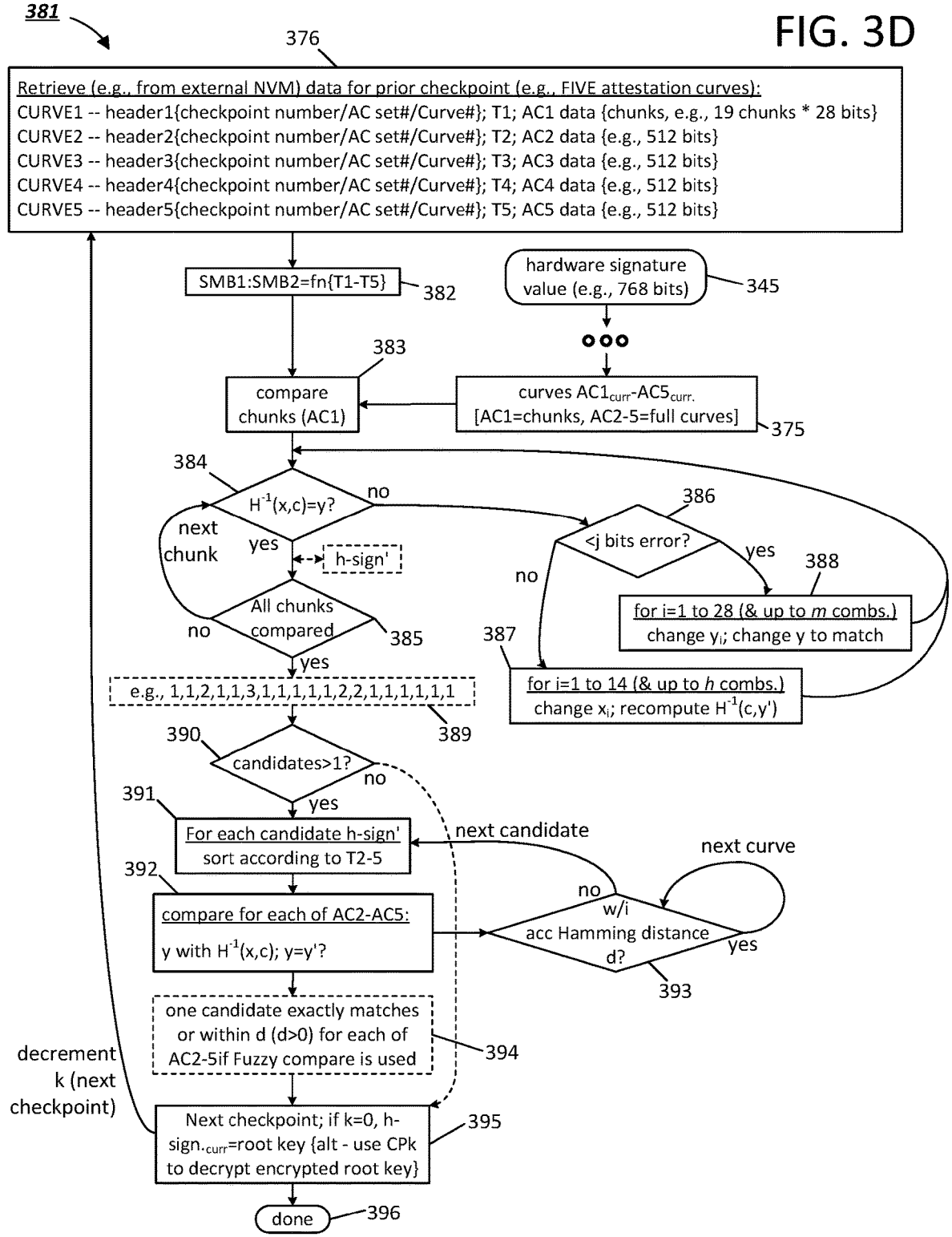
FIG. 3D is a flow chart showing one embodiment of techniques for comparing a hardware signature to one or more prior checkpoints.

FIG. 3D is used to describe one embodiment of techniques for rolling back a hardware signature to match a current checkpoint. Techniques are generally denoted by reference numeral 381. As noted earlier, it is generally desired to be able to recover a root key that cannot be locally stored and that might be lost when power is removed from a device or IC, and which must then be recovered. The recovery process can either be initiated automatically (i.e., as part of a power-up configuration step), or in response to application of a measured hardware signature which does not work, i.e., some type of error has been detected. Generally speaking, the hardware signature is first read or measured (e.g., a PUF array is measured) to produce a value. For example, this can be the process referenced by FIG. 3A, and the resultant value can be a 768-bit value such as represented by reference 345. To perform rollback, a prior checkpoint to be used for comparison is identified and the checkpoint data for this checkpoint is then retrieved by the IC from externally, for example, from a NVM chip in the same system or from a remote location, via a LAN or WAN. In this case, the retrieved data 376 is assumed to be the checkpoint data which was stored at the end of the process described in FIG. 3C, and includes attestation data for five curves and clear text transposition vectors T1-T5, i.e., one dedicated to each curve, as represented by numeral 375.

The newly measured hardware signature (345) is first transposed according to each of the retrieved transposition vectors for the checkpoint being used for comparison, to create five separate outputs, one corresponding to each of the attestation curves of the prior checkpoint. This is represented by function block 382 in FIG. 3D. In theory, each of these transpositions should produce exactly the same contents of SMB1 and SMB2 from FIG. 3C for the corresponding curve, but for any drift that may be reflected by the newly measured hardware signature relative to the checkpoint under consideration. The sortings provided by each transposition vector, and the different sortings provided by the set of transposition vectors, should be effective to disperse and mitigate any cluster errors that affect several adjacent bits of the hardware signature, i.e., the associated bits of the measured signature will be permuted differently and typically redistributed to potentially very different locations in the transposed version of the signature.

The method then compares the individual chunks (representing a subset of bits of the current hardware signature), with corresponding chunks of attestation data for the corresponding curve (AC1) for the retrieved prior checkpoint to determine whether there is a match. Again assuming the use of the same transposition vector for both the prior checkpoint and the newly-measured hardware signature, each chunk for the newly-measured hardware signature should represent exactly the same subset of bits, in the same bit-order, as was used to create the corresponding attestation curve for the checkpoint under consideration; for example, using the example transposition vector from box 359 of FIG. 3C, the first chunk for the newly-measured signature would be populated with the $8^{th}$, $344^{th}$, $67^{th}$ . . . etc. bits of the newly-measured signature. Again assuming a chunk size of 42 bits and an allocation the first third of these bits to SMB1, the first fourteen of the 42 transposed bits would be loaded into SMB1 and the lower 28 of the transposed bits would be loaded into SMB2. However, in the operation called for by FIG. 3C, these 14 bits are then used to derive the reverse of the encryption algorithm of FIG. 3C, e.g., a reverse nonlinear substitution table, a reverse bit flipping vector and a reverse transposition vector, and the 28 encrypted bits for the corresponding chunk from the checkpoint curve (AC1) are fed in reverse order through these processes. Because the encryption process of FIG. 3C is reversible, if the transposition vectors are the same and the hardware signatures are the same, this process should produce a decrypted 28 bit output that exactly matches the contents of SMB2. If these two values (i.e., y matches y'=$H^{-1}(x,c)$, where y is the data in SMB2, c is the encrypted data and y' is the decrypted data), the bit values for the corresponding chunks of the current signature and the checkpointed signature are identified as matching, and the process proceeds to compare the next pair of corresponding chunks, as collectively represented by numerals 384 and 385 of FIG. 3D. If the comparison reveals that y and $H^{-1}(x,c)$ are not the same, the method then proceeds in a deterministic manner to try to identify the bits of SMB1 and/or SMB2 which are the cause of the mismatch, generally following a process represented by numerals 386-388. That is, per numeral 386, the method queries whether there are more than j bits of mismatch amongst the 28 bit values being compared. It should be recalled that the transposition/encryption process uses the contents of SMB1 as an encryption key which acts upon an operand of SMB2, with the encryption key being processed using a CRC32 division, AES or SHA-256 process to create bit diffusion (and resulting avalanche effect), and a resultant transposition vector (and/or bit flipping algorithm and/or nonlinear substitution table). This structure is leveraged in trying to identify where the error is, i.e., if many bits of difference exist between the two 28-bit values, the method first presumes that the error might be 1-2 or another small number of bits in SMB1 (i.e., the x bits used as the encryption key), with bit diffusion being the cause of the much larger disparity in the two values being compared. The method then, on an iterative basis, toggles the bits of SMB1 one at a time, each time computing a new encryption key and/or bit flipping key and/or nonlinear substitution table, and each time then comparing $H^{-1}(x,c)$ to the contents of SMB2 and determining whether the values match (or are close to matching). If no adequate solution is found (i.e., >j bits of mismatch still remain), the method then toggles different combinations of two bits, similarly trying each solution, then three bits, and so on. This process is generally represented by function block 387. Conversely, if only a few of the 28 bit values do not match, the method presumes that the error is in SMB2 and, as indicated by function block 388, the method can accept y' as the low-order bits of a viable candidate point, (x,y') for the current chunk, retained on the record for further full-length AC scrutiny. For each chunk compared in this manner, the method will identify only one candidate, or a small number of candidates, which can potentially provide the correct and full solution. For example, dashed-line box 389 shows the 18-tuple value {1,1,2,1,1,3,1,1,1,1,1,2,2,1,1,1,1,1} representing that, in a hypothetical comparison, nearly all chunk-wise comparisons of 18 chunks produced an exact match, but chunk #3 yielded two candidates, chunk #6 yielded three candidates, and chunks #11 and #12 each yielded two candidates. Because the logic possesses the sort vectors used to create AC 1, if the system detects more than one candidate (i.e., process 390), it can reverse-map each candidate in turn back to the current (e.g., newly-measured) hardware signature under analysis, and use that reverse mapping to build a full version the modified signature (e.g., including any altered bits needed to produce a candidate; for example, if chunk 1 included the $344^{th}$ bit of the signature, and that bit was modified to produce the candidate in question, the $344^{th}$ bit of the current hardware signature would be correspondingly modified (i.e., as indicated by the dashed-line box containing "h-sign'" (h-sign. prime) seen in the FIG. Permutations of that signature for AC2-AC5 would then be computed, based on the full (candidate) signature, per block 391, and these 768-bit values would then be similarly compared against similar curves for the stored checkpoint, i.e., as presented by function block 392. This is to say, these values would be divided into SMB1 and SMB2, and SMB1 would be used to decrypt the encrypted data for the corresponding curve of the checkpoint, and once again, y (i.e., the contents of SMB2) would be compared to $H^{-1}(x,y')$ for the corresponding curve (e.g., AC2, AC3, AC4 and AC5). Since the chunks are 'orthogonal' to one another because they operate on mutually-exclusive sets of bits from the hardware signature in this embodiment, all candidate choices from a chunk if there are more than 1 choice for the chunk have to participate 'combinatorically' with all other chunks' candidate-set to revert to a full-length signature candidate to be checked for final acceptance. For the 18-tuple example just provided, this means that all 2*3*2*2=24 possible combinations may have to be fully enumerated, each being potentially used to reconstruct a full-length signature candidate for further AC checks. This aliasing-discrimination process drives the need for the design choice of AC1, such as SMB1 and SMB2 bit-sizes, to nominally produce very few viable candidates per chunk, preferably only one per chunk, such that when it comes to the time for full-length attestation a very low number of combinations need to be enumerated. As noted earlier, because of the different curve parameters for curves AC2-AC5 generated as a function of the different transposition vectors, and because of the relatively large signature size (768-bits), it is computationally unlikely (i.e., all but impossible) that there will exist more than one solution that produces validation across all five curves—when an exact match is determined, that can be taken to be the correct prior checkpointed signature (i.e., as indicated by process block 394).

It was earlier mentioned that in an optional embodiment, attestation curve checkpoint data, prior to being stored, can have a small number of random bits masked or inverted, e.g., see optional process block 374 in FIG. 3C. In such an embodiment, it can be expected that one or more of curves AC2-AC5 when compared will not produce an exact match (i.e., due to the deliberately induced error). However the process is optionally designed to detect a match providing that the comparison process yields less than a predetermined number of bits d in error, where the value of d is an implementation choice. This value d represents a programmable Hamming distance. Even for a relatively large value of d (e.g., 36 bits), the design of the specific technique described above is robust enough given the signature size that it is still statistically improbably (i.e., impossible) that there will be two or more candidate solutions which match a given checkpoint across all five attestation curves, conjunctively. To process candidates, the logic ranks the candidates from most likely to least likely and it attempts to match all five attestation curves, identifying whether the decrypted data for individual curve is within the Hamming distance d of the value in SMB2 (i.e., per numeral 393). As there can be only solution, if any mismatch is encountered, the system proceeds to the next candidate; if a result does match by falling within the Hamming distance for all five curves (i.e., per numeral 394), the correct, prior checkpointed signature has been found, and the system can then proceed to the next checkpoint (i.e., as indicated by process block 395, it decrements k and loops back, as indicated by the FIG.) If the current checkpoint under consideration is the first checkpoint (i.e., corresponding to the root key), then the root key has been recovered, as denoted by process termination block 396. This value is then returned so that it can be applied and/or otherwise applied in cryptographic operations, as alluded to earlier. In another embodiment, as implied by block 395, a checkpointed signature can be used to directly encrypt (for external storage) the original root key, such that the when the checkpointed signature is discovered, it can be used to retrieve and directly decrypt the root key (e.g., from secure NVM storage, using a single checkpoint only); as recited earlier, in some implementations, it may be desired to not externally store any version of the root key (encrypted or otherwise), instead relying on 512-bit curve data (akin to a hashed representation of the 768-bit signature) to provide 'clues' that permit chip hardware to guess the root key, via an iterative roll-pack process, checkpoint-by-checkpoint.

Note that many variations exist to the above that will readily occur to those having an ordinary level of skill in the art. To provide one limiting example of this, in one embodiment, the fuzzy compare step can be omitted, i.e., the Hamming distance d is programmed to be zero and no random error is introduced into attestation curve data when storing checkpoints. In another embodiment, all bits of the measured hardware signature are compared as part of the first, chunk-based comparison—for example, where a 768 bit signature is used, it is possible to divide that signature up into twenty for chunks of 32 bits, thirty-two chunks of 24 bits and so on (i.e., each collectively accounting for all 768 bits); it is also possible to use a design like that above but to process nineteen chunks of 42 bits (e.g., for the last chunk, the last twelve bits of the signature can be padded). In another embodiment, bits from chunks can overlap with each other and/or be combined. Again, many variations will occur to those having an ordinary level of skill in the art and the techniques just discussed should be viewed as exemplary only.

Figure 3E:
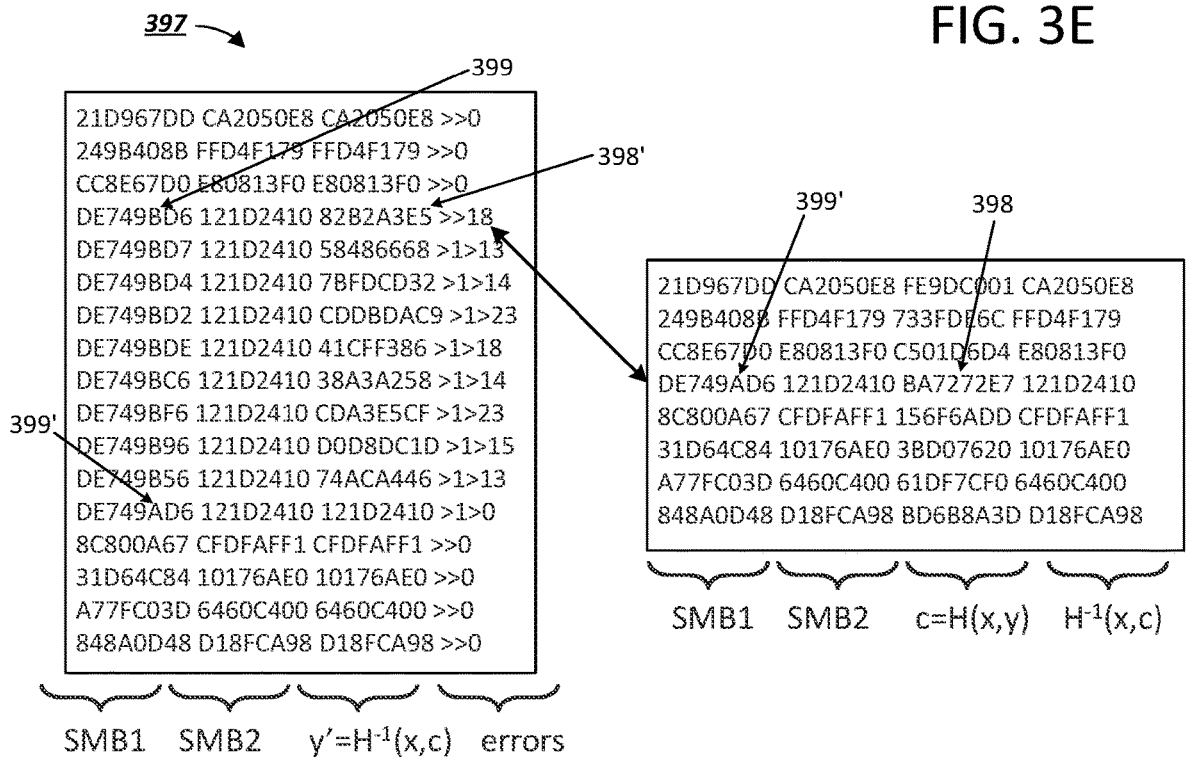
FIG. 3E shows an example of a process for using a prior, stored checkpoint to identify drift in a newly-measured hardware signature relative to a state of the prior, stored checkpoint.

FIG. 3E shows two text boxes that can be used to better explain these processes, using exemplary data. This data is generally denoted by the numeral 397. A text box at the left side of the FIG. shows attestation curve data for a hypothetical current hardware signature, with data corresponding to a different chunk presented on each line, and associated measurements and comparisons to try to match this data to stored checkpoint data, chunk-by-chunk. Attention is directed to the fourth row, which lists the values DE749BD6 121D2410 82B2A3E5>1>18. As indicated at the bottom of this text box, the first field DE749BD6 corresponds to bits of SMB1 in this example (e.g., applied as a key to generate transposition and/or bit flipping vector and/or nonlinear substitution table) while the second field 121D2410 corresponds to SMB2. The third field 82B2A3E5 corresponds to the value $H^{-1}(x,c)$, i.e., which will be explained in the next paragraph, while the fourth field (i.e., >>18) indicates that there are eighteen bits of error (i.e., $\Sigma[y=SMB2\oplus H^{-1}(x,c)]$).

A text box at the right side of this FIG. shows the correct attestation curve data corresponding to a prior checkpoint for the same hypothetical signature, along with resultant, stored attestation data (c) for each chunk, and the value $H^{-1}(x,c)$, for purposes of comparison. As illustrated for the fourth chunk (fourth row) of this text box, the correct data for SMB1 SMB2 should be DE749AD6 12D2410 (hex), with an encrypted output c (or H(x,y)) of BA7272E7. Note that, of the information illustrated in the right-hand text box for this row, only this latter value (i.e., c, designated using reference numeral 398) would be stored in external memory, i.e., BA727E7. The value in the fourth column, i.e., 121D2410, exactly matches the second column, and if subtracted from the second column (or exclusive-ORed with the second column), would produce a zero result.

In performing attestation curve comparison for the fourth chunk (AC1) for the newly measured hardware signature, seen in the left-hand text box, the method retrieves (loads) the corresponding attestation curve value from external memory (i.e., BA7272E7) and it performs a reverse transposition (and/or bit flipping and/or nonlinear substitution operation) and it exclusive-ORs of the resultant value with the quantity in SMB2. However, the reverse transposition y' does not match this value and as seen, it is identified that there are eighteen bits of difference between the two. That is, the value DE749BA6 is used as the key and leads to an erroneous reverse transposition vector, which produces a value (398') that does not match the contents of SMB2, and therefore leads to an exclusive-or result which is nonzero. The system flags this error; note that in fact, as is observed by comparing data referenced by numerals 399 and 399', there is in truth only a single bit of error (i.e., corresponding to drift), but the system has not yet identified this. The checkpoint rollback logic proceeds deterministically, i.e., it identifies that 18 bits of difference is a large difference given 32 bits overall, and it therefore presumes that the error is somewhere in SMB1. The logic therefore iteratively proceeds to try to guess what the error is, once again proceeding by guessing values that might produce the correct result, one modification at a time. It takes as at its starting value the current contents of SMB1 (DE749BD6), at first, modifying one bit at a time and analyzing the results. For example, as represented in the ensuing row of the next text box, the logic tries the possible value of DE749BD7 (i.e., modifying the least significant bit) to determine if this is the source of the error—the result of the reverse transposition is 58486668, which still does not match the contents of SMB2 (121D2410), i.e., there is now 13 bits of error. The logic therefore tries a second possible value, this time modifying the second to least significant bit, and this yields an inverse transposition result of 78FDCD32 with fourteen resultant bits of error. The logic then continues iteratively, modifying the third least significant bit (SMB1=DE749BD2) and determines that this leads to 23 bits of error. As seen by the $23^{rd}$ row of the left-hand text box, at some point the system tries the correct SMB1 value of DE749AD6 and this produces a result that matches the current SMB2 contents (i.e., the result is 121D2410), and the result of the exclusive-OR operation is zero (i.e., zero bits of error). The system therefore identifies SMB1 SMB2 as corresponding to the correct bits of the associated chunk of data, and it substitutes the correct bits back into the original signature (i.e., to produce a candidate) and it then proceeds to analyze the next chunk of data.

Several points should be noted in connection with this discussion. First, there is an increased possibility of aliasing (i.e., of more than one correct solution), given that only 64 bits (|SMB1|=32 and |SMB2|=32) are analyzed in each chunk in this example. Second, to minimize run time, the checkpoint rollback logic can be designed so as skip to the next chunk (i.e., for AC1) when and as each candidate is identified. As a consequence, if, when each secondary attestation curve (i.e., AC2-5) is compared for each identified candidate, there is even a single mismatch, the correct signature has not been found, and the logic must then return to evaluate other possible signature candidates (e.g., it must attempt to determine whether other chunk-wise modifications to SMB1 and/or SMB2 would yield other candidate solutions, if this has not been done already). This amounts to a 'lazy-and-optimistic' candidate-set 'search-and-nominate' strategy that defers bringing on new candidates for final-attestation until called for by worst-case mismatches in the current candidate-set, that could perform very fast nominally as it only needs to go deeper in exceptional cases of drift. Note that this strategy is optional, i.e., it is not required for all embodiments.

Reflecting on the operations discussed above in connection with FIGS. 3A-3E, attestation curve data representing a stored checkpoint may be retrieved and used to modify a current hardware signature until it matches the hardware signature corresponding to the stored checkpoint. The stored attestation data cannot be, by itself, intercepted and used to identify the hardware signature, but it can be used by the IC in question to identify or guess the correct, prior, hardware signature state. The described principles can be performed on-board an IC, are fast, and will yield the correct solution even if random noise (up to a certain amount), i.e., deliberately induced bit error, is injected to mask the correct solution from an attacker (i.e., thereby potentially providing resilience to quantum computing attacks). The described processes permit rollback, iteratively or otherwise, of any measured hardware signature and modification until that measured hardware signature matches an original root key (e.g., a volatile or nonvolatile key). It is noted that many variations in these described processes will occur to those of ordinary skill in the art which may provide efficiencies given a specific application or implementation.

Figure 4A:
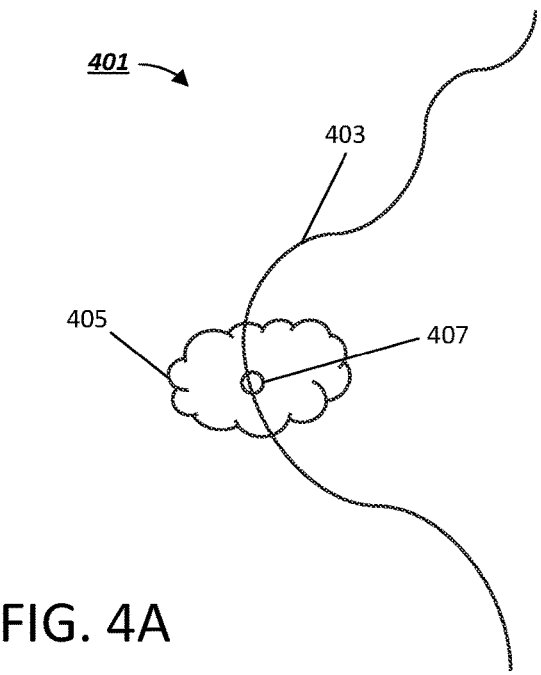
FIG. 4A is a diagram used to explain an attestation curve.
Figure 4B:
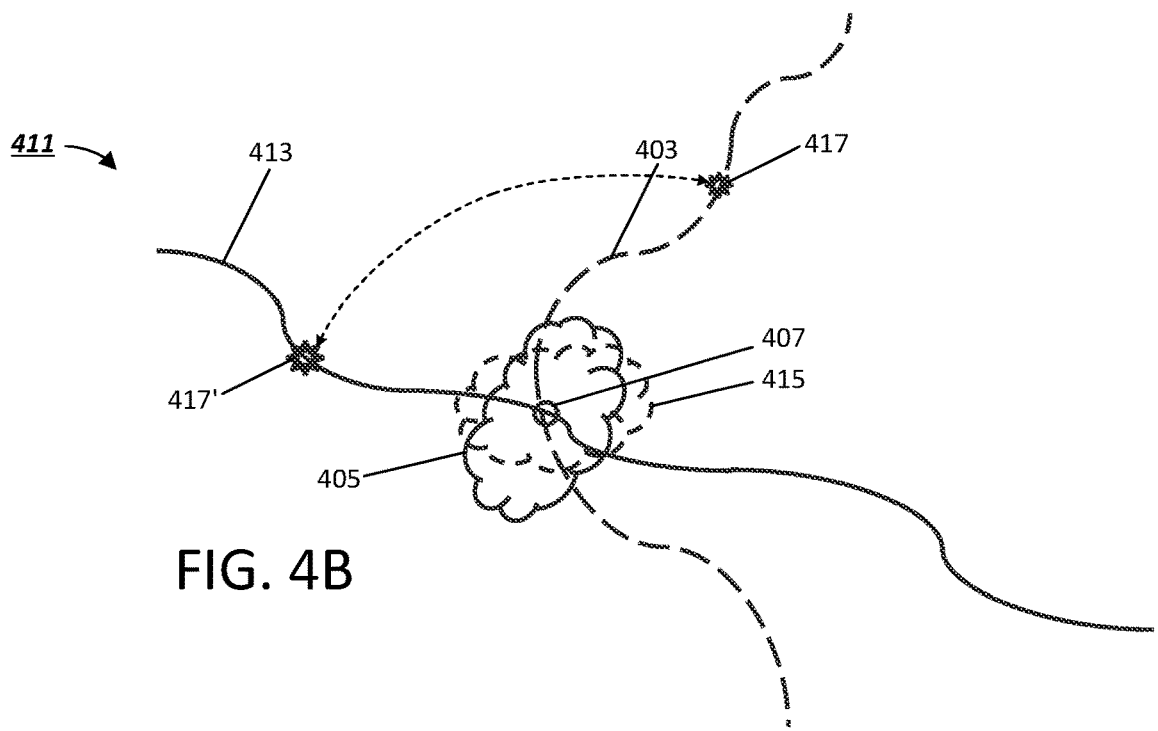
FIG. 4B is a diagram used to explain aliasing and how the use of multiple attestation curves can be used to securely identify a prior checkpoint.
Figure 4C:
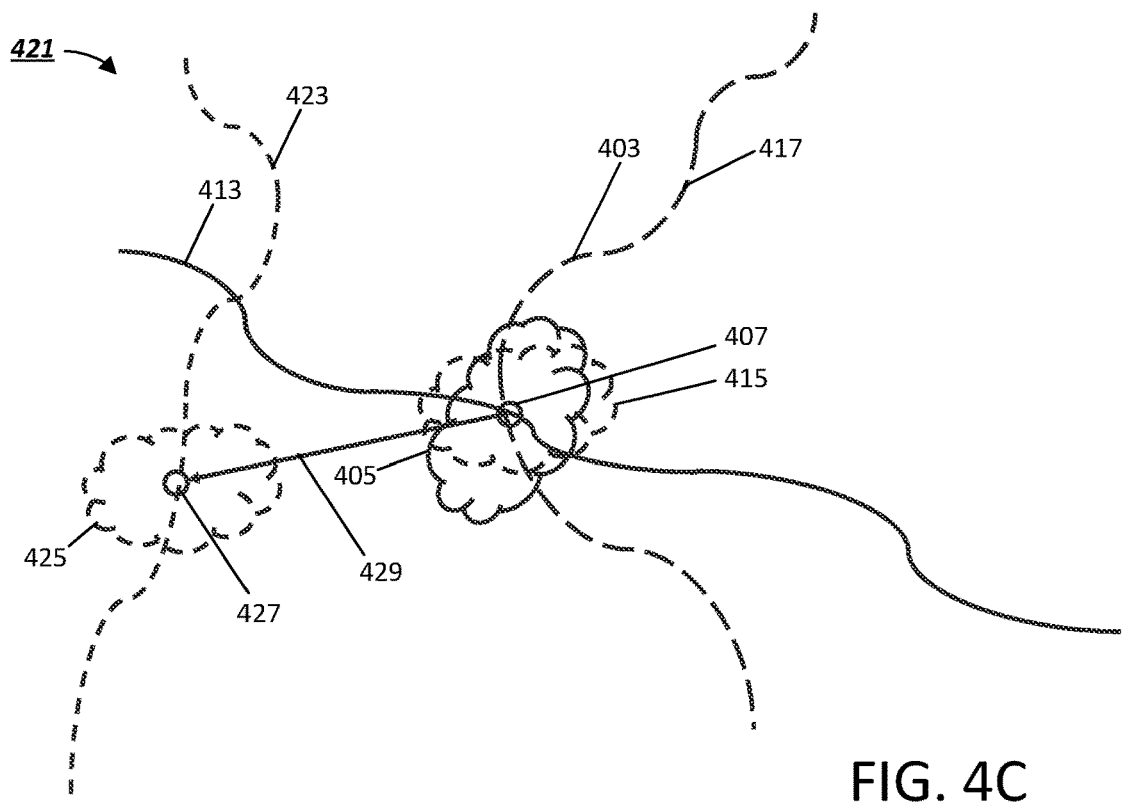
FIG. 4C is an illustrative diagram, used to explain hardware signature drift and how attestation curves and checkpoint recovery are used to progressively track and permit cancellation of drift.

FIGS. 4A-4C provide conceptual drawings used to illustrate some of the principles associated with the use of attestation curves.

FIG. 4A in particular shows a graph 401 of an attestation curve 403, a Hamming neighborhood 405, and a point 407 on the attestation curve. As noted earlier, the encryption provided by the attestation curve process discussed above is analogous to a non-polynomial curve encryption process. For example, an elliptic curve encryption process would be generally of the form $y^2=x^3+ax+b$, over a finite field F, where a and b are constants. In the case of attestation curves, however, rather than being defined by a polynomial form and constants such as a and b as with elliptic curves, the curvilinear form of the attestation curve process is effectively defined by the specific permutation of bits of a signature value into SMB1 and encryption of SMB2 using bits of SMB1 that can be effected in a finite field. In the case of FIG. 4A, however, the point 407 may be thought of as the un-permuted bits of the hardware signature, and the various curve permutations are effectively presented by the different possible permutations of SMB1 and its use as an encryption key. The attestation curve encryption function defined above generally corresponds to the form $c=H(x,y)$, where c is treated as a constant, and where the encryption is reversible such that $y=H^{-1}(x,c)$. In general, it is desired to provide a process where an approximately correct derivation of a point in the Hamming neighborhood permits precise derivation of the correct key (i.e. hardware signature, and associated x,y coordinates), represented by point 407.

FIG. 4B provides another graph 403, this time showing two attestation curves 403 and 413. In this case, the two curves 403 and 413 may be analogized to two of the curves AC1-AC5 referenced earlier; in the depicted coordinate space, both curves should intersect at a common point 407 if the same hardware signature was used to generate both curves. That is, there should only be one unique solution which satisfies the constraints of both curves (note that there remains probability that the two curves have other intersection points than just point 407, as referenced earlier, but that possibility is statistically miniscule; and for the immediate Hamming neighborhood around point 407, that probability is even smaller). For example, referring to the previous discussion of multiple candidate evaluation, if multiple candidate solutions for one curve exist such as a point 417 on first curve 403 and a different point 417' on second curve 413, such do not lie commonly on all curves and do not represent the unique solution used to form both curves, in this case, the point 407. Note again that it is theoretically possible for curves to have more than one point of intersection—the use of more than two attestation curves helps inhibit this possibility, i.e., the likelihood that three, four, five, or more curves all intersect at the same point (especially given that points are resolved by a long signature length, e.g., 768 bits or more) is so remote that in practice it will never occur. In one embodiment, as noted earlier, four or more curves are used to address this possibility (five curves, considering that at least one curve is used principally for partitioning as described above). In fact, as more such curves are used to resolve a unique intersection point, the probabilities are such that it becomes increasingly feasible to permit a larger acceptable deliberately induced bit error (e.g., a Hamming distance error, 405/415') for the respective curves and still recover exactly the correct intersection point. An attacker having no knowledge of the encryption parameters (i.e., values in SMB1) will be unable to identify any curve with precision, and the use of a small amount of deliberately-induced random bit error in the encrypted attestation data means that the curves' common intersection point can be identified by a checkpoint recovery process even though the attestation data (alone) does not itself suggest or mandate the correct common intersection point. Perhaps otherwise stated, in the described checkpoint recovery process, where bits of SMB1 are not stored externally, an attacker cannot identify any curve, and each encrypted attestation code stored externally does not provide information about the curve it represents or indeed, any specific point in the coordinate space represented by the FIG. As implied by FIG. 4B, it is possible to define many attestation curves that all intersect at point 407, i.e., as a function of the signature definition process described above. Any curve defined using the same hardware signature (SMB1 SMB2=some function of the bits of that signature) will effectively pass through point 407, and this property can be used to provide robustness and precisely mark any hardware signature checkpoint and/or root key value.

FIG. 4C illustrates yet another graph, indicated by reference numeral 421. In this graph, a third curve 423 has been added, premised on a new point, 427, with an associated Hamming neighborhood 425. The depicted point is used to represent drift relative to a prior signature value (i.e., drift away from point 407 which is represented by the point 427). Because the drift results in a different signature, the point 427 which should in theory match point 407 is instead at some different point in the depicted space. The difference between these points is represented as a drift vector 429. By identifying and tracking this vector between checkpoints, and by identifying and tracking multiple such vectors through multiple checkpoints, this process effectively permits linking of later-checkpointed attestation curves (which mark a unique point such as point 427) and iterative rollback, such as depicted for example from point 427 to point 407, notwithstanding progressive drift. This rollback can be repeated recursively, on a linked basis, to track any measured hardware signature back to an original root key notwithstanding the amount of aggregate drift. By marking the new points such as point 427 with multiple attestation curves (e.g., AC1-5 as exemplified above, to ensure a unique solution), and by checkpointing frequently enough so as to provide for a quick run-time solution for isolating and addressing each instance of marginal drift, one can provide an effective, fast solution for addressing any conceivable amount of drift, even potentially up to and including corruption of all bits of the root key.

Figure 5:
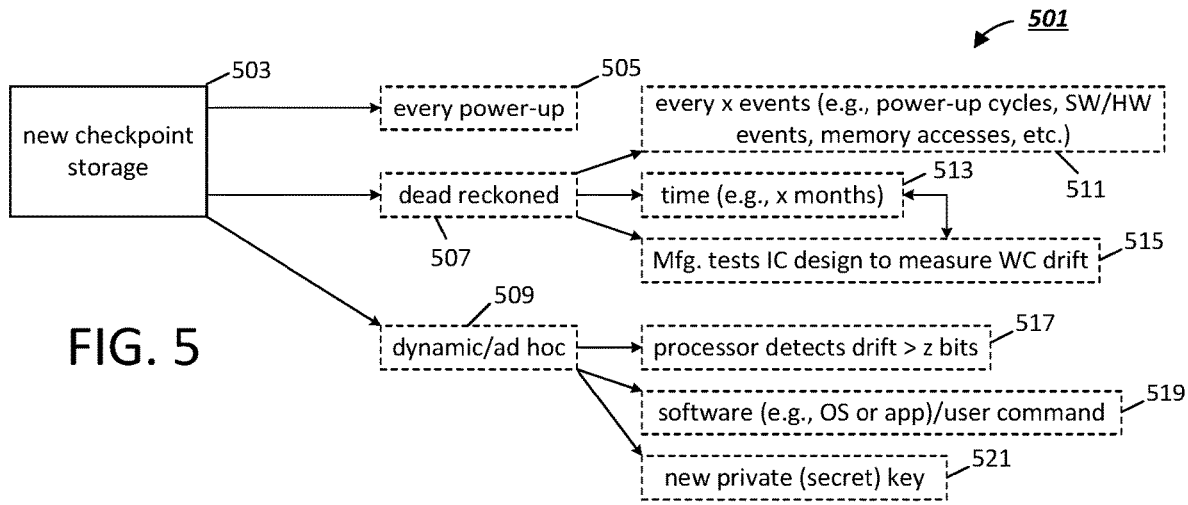
FIG. 5 is a flow chart used to explain different options for checkpoint management.

In this light, FIG. 5 is used to discuss some options associated with checkpoint storage and generation, and associated techniques 501. As denoted by numeral 503, depending on embodiment and application, it is desired that at least one of an integrated circuit ("IC") manufacturer, BIOS, software application or user should be able to effectively identify when (e.g., at what times, or how frequently) new hardware signature measurements should be checkpointed, so as to provide for a fast run time solution. As noted earlier, in some embodiments, it is generally desired that checkpoints be generated frequently enough such that firmware (operating with assistance of hardware logic) should be able to process checkpoints representing no more than small drift (e.g., less than or equal to about 3 bits) from checkpoint-to-checkpoint, helping provide a microsecond-order solution. Note that even absent this objective, the techniques described herein will still operate, albeit with possibly a longer run-time solution. As this discussion implies, checkpointing can be performed at different times depending on implementation, application, the requirement for fast transparent processing, and the rate of drift. In one application, for example, it might be that a designer decides that a new checkpoint should be established at every power-up, as represented by numeral 505. In another embodiment, represented by numeral 507, the generation of new checkpoints and associated storage of data (e.g., attestation curve data) can be performed on a scheduled basis, with scheduling being dead-reckoned. For example, per numeral 511, it is possible for logic on-board the IC to detect occurrence of a predetermined number of events, for example, passage of a predetermined number of power on/off cycles, or specific software or hardware events (e.g., firmware/software upgrade, performance of maintenance, device aging signified by memory wear, duration of system usage, and so forth). In another embodiment as represented by numeral 513, the designer can statically or dynamically program a set schedule for new checkpoint generation (e.g., January 1 of each year, or on some other basis, and this can be programmatically changed if desired, dependent on need). Per numeral 515, in one embodiment, a manufacturer of the particular IC design can test or qualify its product, to detect (i.e., measure) expected drift rate and responsively configure checkpointing (e.g., by programming new checkpoint frequency such that no more than a few bits of drift occur in between checkpoints given empirically measured drift rates); citing again to the example introduced earlier, a particular manufacturer determining that up to 3 bits of drift per year is expected in the measured hardware signature might provide firmware (or hardware logic) that causes new checkpoints generation in dependence on this rate, e.g., such that checkpointing performed every quarter can be expected to encounter a worst case of 0-2 bits of drift. Note that such collection or statistical characterization of drift behavior should not reveal any specific hardware signature value to the manufacturer, i.e., ideally, such statistical characterization is performed for a given general design only, with chip-to-chip key particulars for a given design being kept secret. As generally encompassed by this process block 515, other particulars can also be set or programmably defined, e.g., the number of AC curves in any set, the number of sets of AC curves used to provide robustness, the specific encryption algorithm (e.g., sizes of SMB1/SMB2) and so on. As a further example, a particular systems integrator purchasing an IC for use in assembling its systems might decide that only three attestation curves are needed (instead of five) or that chunk-wise processing of 32-bit chunks provides for faster run-time recovery, given intended applications and required security, than 42-bit chunks. As a further example, a manufacturer can decide to commit and lock the root key from further re-generation once the IC is shipped to first customer, by writing a succinct checksum verification signature of a 'frozen' checkpoint data set into OTP memory elements, such as for example, using eFuses, onto the IC. The size of such checksum can be small, such as 128-bits or 64-bits. The checksum is not alterable and is firmly locked to the internal of the IC, such that it can be validated against the initial group of checkpoint data retrieved for attestation, before root key retrieval is being attempted. Alternatively, the manufacturer can decide to defer such locking to the OEM or even to the end customer. These and other parameters can all be measured and programmably defined by the IC manufacturer, systems integrator, OS or application provider or user, depending on implementation. In yet other alternative implementations, checkpointing can be made to be dynamic or ad-hoc, i.e., as denoted by process block 509. To cite a few examples, a processor IC might be configured to dynamically trigger new checkpoint generation if an error is discovered in the attempted application of a recovered hardware signature to decryption of an external operand (i.e. per function block 517). In another implementation, new checkpoints, per function 519, might be triggered by a software operating system, software application or a user command; in still another implementation, 521, new checkpoints might be called for any time certain operands change (for example, a new private key is installed, or a PKI certificate expires). Naturally, these various techniques may be mixed and matched in any desired combination; for example, it is possible to define checkpointing such that it occurs no less frequently than every quarter, as well as any time a drift error is encountered. Many examples and variations in implementation will occur to those having ordinary skill in the art, and to a large extent will be an implementation decision that takes into account quality of the design and security requirements. Note that in a typical application, these parameters can be hardwired into the design (e.g., such that the logic, e.g., key recovery logic, is inherently designed to apply them). In other embodiments, including those which support on-board NVM, these parameters can be stored internally such as in a register, or they can otherwise be encrypted and/or stored off-chip.

Figure 6:
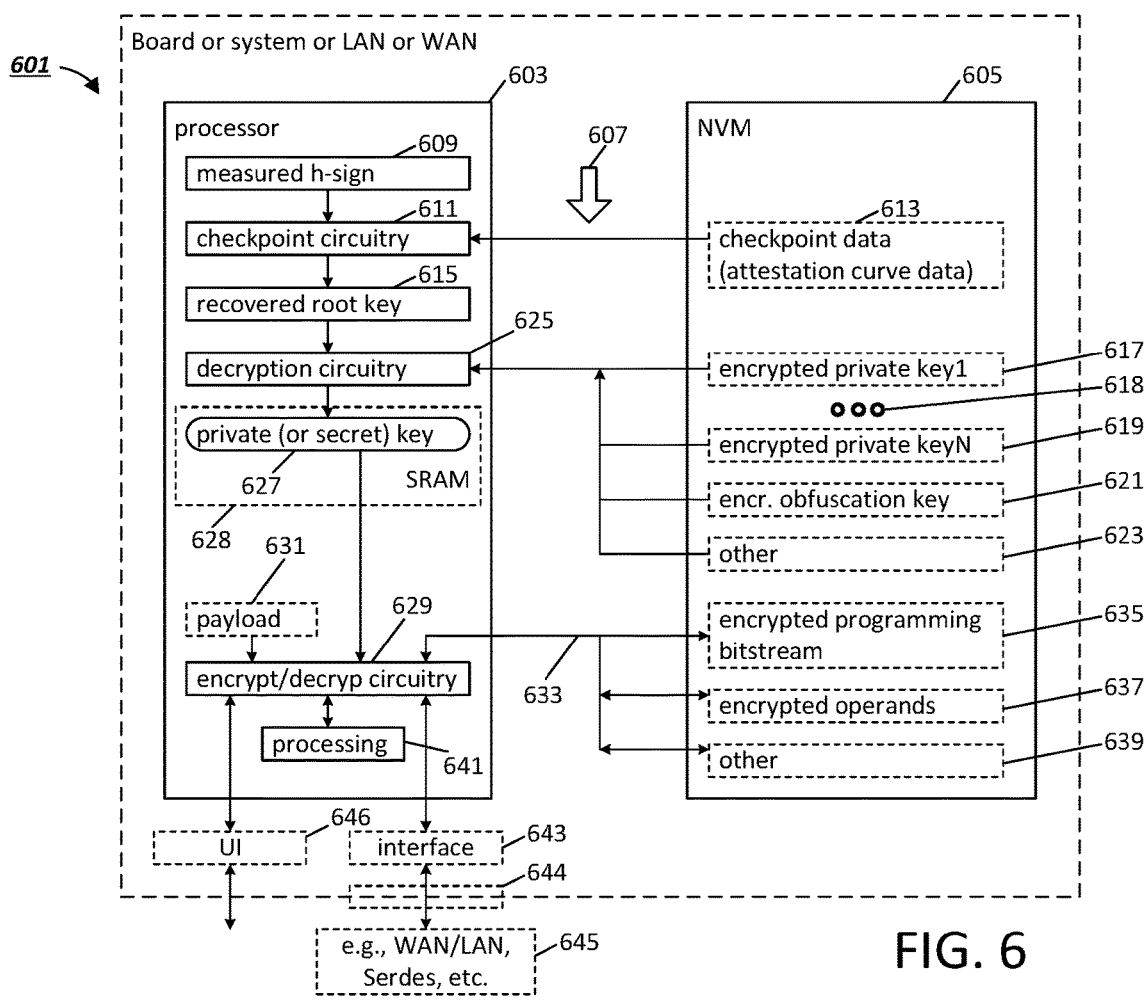
FIG. 6 is a hardware diagram used to explain one or more embodiments for private key (identity) storage, recovery and application.

FIG. 6 shows yet another embodiment of a system 601, this time showing both a processor IC 603 and a NVM IC 605; FIG. 6 is used to provide an introductory example of applications based on the root key (a volatile or nonvolatile key) recovery processes described above. Both of the depicted ICs 603 and 605 can optionally be mounted to a common-board or module (e.g., a CPU module) or otherwise made part of the same system. If implemented in the form of an electronic board, the electronic board will have external electrical connections, or pins or pads for input/output connection, as represented by numeral 644, with an interface 643 being used to receive and transmit signals. As noted previously, these pins or pads can connect to one or more external conductive paths, optionally configured as a separated command/address bus and data bus 317, using parallel or serial communications (e.g., compliant with ATA, SATA, USB, SPI, Display Port, PCIE and/or other published standards and their various versions). The depicted system 601 also has internal conductive paths 607 which are used for communication between processor IC 603 and memory IC 605, and which can similarly be parallel or serial paths compatible with any of these standards. In situations where this system is a distributed system, such as represented by a local or wide area network (LAN or WAN), these paths can be combined for packetized communications and can include a wireless link.

FIG. 6 is used to narrate a process or recovering a hardware root key and using that hardware root key to then encrypt a private or secret key for secure external storage, e.g., notwithstanding that the processor IC in one embodiment is fabricated using one of the newer fabrication process technologies and might be incapable of internally retaining a private key on a nonvolatile basis. In this regard, the processor IC can be a CPU, FPGA, microcontroller, graphics controller, cell phone processor, multicore device, multiprocessor chip or another form of processor. As indicated by numerals 609 and 611, a processor or processor core measures or reads a hardware signature using measurement circuitry. The measured hardware signature 609 may be encumbered by drift or error, and to mitigate this drift or error, the processor retrieves externally-stored checkpoint data 613. This permits error correction of the measured hardware signature, such as direct or iterative rollback as described previously, to recover the original root key 615 that was fixed on initial device configuration. By way of non-limiting example, the hardware signature can be optionally obtained by measuring a PUF, and rollback can be optionally performed using an attestation curve process, such as the one just described, with their associated benefits. The root key is never shared outside of the processor or processor core, and that data that is stored outside the processor or processor core (i.e., the checkpoint data) advantageously does not permit derivation of the root key or anything closely related to the root key (such as a hardware signature). As noted earlier, in one embodiment, the checkpoint data (or at least part of it) can be remotely stored by an IC manufacturer or systems integrator, such that at a later additional configuration time, the published checkpoint data can be retrieved (e.g., via WAN), used to securely identify a manufactured device based on a device ID, and used to configure that device for initial use or software upgrade.

In the context of the embodiment of FIG. 6, it should be assumed that as part of this initial configuration, a distributor or user will configure the processor IC 603 and/or system 601 (or part of it) for cryptographic operations, and will install a secret key (or private key component of a public-private key pair) for use by a processor core or processor on the IC 603. The described techniques permit the root key to be always recovered, and this then permits secret key encryption and external storage of the encrypted secret key notwithstanding the potentially volatile nature of the processor or processor core. Thus, one or more keys can be stored securely in the external NVM and can be retrieved, decrypted and managed as necessary. Notwithstanding that the processor on IC 603 might not have internal volatile storage, it can externally encrypt private or secret keys and when it is repowered, it can recover its volatile (or nonvolatile) root key, use this to decrypt externally stored cryptographic tools, and then use those cryptographic tools in internal RAM. FIG. 6 shows the presence of at least two such keys (617/619) and the presence of ellipses 618 denoting that there can be any desired number of such keys. Each of these keys can be encrypted using the root key and are then externally stored, and can be retrieved and decrypted as desired (e.g., when power is applied to the system or processor IC). Note that in an optional embodiment (e.g., described below with reference to FIG. 10), a fast encryption and decryption engine will be described which provides for nearly instantaneous encryption and decryption of these keys (as well as any desired data, e.g., data that is selectively encrypted) using hardware only. In the event of dictionary attacks based on cryptographic communications of the system (e.g., based on the use of private keys 1-N, corresponding to numerals 617-619), such does not reveal the root key in this application, as the root key is simply used for encryption of the private key for nonvolatile storage, and since a secondary key(s) (e.g., keys 617-619) are used for external communications and potentially more extensive encryption (e.g., of potentially a large data set stored in memory). That is, in the event of compromise, the compromised private or secret key can be revoked or discarded and new keys and/or credentials can be installed on the system 601 and protected once again by encryption based on the root key. To this effect, on power-up or at a later dynamic time, the processor or processor core retrieves any keys it needs from the NVM IC 605, and it then decrypts those keys using decryption circuitry 625. Once decrypted, the obtained cryptographic keys (627) can be retained internally in volatile memory (e.g., SRAM, 628) in a manner were these keys are never shared or used outside the processor or processor core in unencrypted form. Furthermore, to deter dictionary attack attempts on the high-value secret assets that are protected by the root key, indeterministic encryption techniques can be deployed whereby a small overhead space in the ciphertext size is allocated for housing embedded random padding bits. For example, if it is assumed that a secret key of 256-bits (32-bytes) size is being encrypted by the root key for external storage, the IC can allocate an enlarged ciphertext size of 288-bits (36-bytes), thereby allowing an extra 32-bits (4-bytes) space for padding overhead. During encryption, a random pad of 32-bits (e.g., from an on-chip random number generator) is concatenated or prepended to the 256-bit plaintext payload to make up a 288-bit operand, which is then encrypted using the root key as the encryption key, resulting in a 288-bit ciphertext (FPE) output. Such an embedded padding scheme permits indeterministic encryption to provide a result such that even for the same exact payload value, the output ciphertext is rarely repeated in a new encryption, if ever, making dictionary attack impractical.

As noted by numerals 621, other data and or information used for encryption/decryption can also be stored externally in the NVM IC 605. For example, in one embodiment, an encrypted mask key or obfuscation key 621 is also stored in this memory. This optional mask key is used to flip bits of one or more of the private keys 603/605 before or after encryption, and conversely to again flip data (e.g., private keys) retrieved from memory before or after decryption. For example, in one embodiment, a mask key and/or key used for bit flipping and/or transposition is derived from the measured hardware signature or from a separate PUF array. As an example, a separate PUF, used for 256-bit random number generation (i.e., and associated key expansion, hashing, and processing, as described earlier) can be used to derive a first number which is applied as a secret key and a vector that determines whether bits of that secret key (or derived from that secret key) are to be flipped. The recovered root key can be applied to encrypt the private or secret key for external storage, while the secondary PUF (or random number generate) then provides an independent key that can be used to further disguise values and provide yet another layer of encryption. An example of this, one or more transposition vectors used for bit reordering and/or random bit flipping can be generated using the same basic process described above, i.e., by obtaining a 256-bit random number, concatenating it with itself and using key expansion techniques and bit diffusion (e.g., via CRC division, AES or a SHA-256 process) to obtain integers as described before, with an ensuing modulo operation applied; in the case of a vector used for bit flipping, instead of sorting the resultant integer values, these values can instead be converted to even or odd (i.e., logic "1" or logic "0") and used to determine whether corresponding symbol positions an encrypted or unencrypted private/secret key should be flipped. In addition, the root key can encrypt the private key using a FPE process as described in U.S. Pat. No. 9,635,011, with reference to the transposition, selective bit flipping and non-linear substitution discussed earlier in connection with the encryption of SMB2 content (e.g., optionally combined with an embedded-random-padding scheme as referenced just above). When combined with the capability of also optionally using random number generation to generate a secret key on-board the processor or processor core, i.e., for temporary or long-term use, these tools provide a ready means of supporting a wide variety of cryptographic processes, including new key generation as needed and secure storage of those keys. In one embodiment, this mask key or obfuscation key can also be applied to the root key itself. For example, numeral 621 denotes that it is possible to apply the mask key/obfuscation key to the original root key so as to obtain a secret private key that is unrelated to the original root key (other than as a function of encryption provided by the mask/obfuscation key). Thus, when the root key is recovered, it can be used to retrieve and decrypt the mask/obfuscation key, and thereby recover a private key that is derived from the root key; because the derivation may involve (e.g., as described below) bit transposition, flipping and non-linear substitution, such a process can render the private key absolutely unrecognizable from the root key. With full-confidence that a checkpoint data set consisting of such ACs can enable the chip to recover the hardware root key, the encrypted versions of the original root key (i.e., as checkpointed) and obfuscation data for the root key (or the obfuscated root key, as encrypted) can be stored along with the checkpoint data set storage, at that same moment. Then, in a subsequent successful attempt to recover the checkpointed root key, the original root key and/or its obfuscated version can be competently recovered, simply by retrieving the stored encrypted original secrets and decrypting them with the retrieved checkpoint root key. All of this is represented by the presence of mask/obfuscation key 621 in FIG. 6, as is the use of more than one such key, as desired.

As denoted by numeral 623, other information (other than a mask/obfuscation key or bit flipping key) can be stored in the NVM IC 605 to assist with cryptographic operations by the processor IC 603. As a non-limiting example of this, it is possible for a user to store other credentials (e.g., passwords for files, websites, applications and so on) in NVM chip 605 in encrypted form, with the processor IC 603 automatically retrieving, decrypting and applying the decrypted credentials as necessary. The permutation, bit flipping and/or nonlinear substitution principles discussed above can also be optionally used to protect this data, and once again, the root key is used only for (in this example), local or in-system encryption, while the decrypted data (which in this example is not related to the root key) is used for external cryptographic and other secure interactions.

The processor can use decrypted private keys in SRAM 630 as an input to primary encryption decryption circuit 629, to permit the encryption of an internal payload 631 (i.e., data that is to be communicated externally, for example, stored in NVM IC 605 or transmitted externally via interface 643 and WAN 645), or alternatively, to permit receipt of encrypted data via the NVM IC 605 or interface 643/WAN 645 for internal use/consumption. To provide some non-limiting examples of this, in one embodiment, the processor IC 603 is a FPGA that receives an encrypted programming bitstream 643 from the NVM chip 605, which is decrypted and used to configure the FPGA for proprietary operations. The processor or processor core can also store its operands (e.g., operating parameters, status, maintenance information and other operands) externally in encrypted form, by encrypting such information using decrypted secret keys—in this manner, even if power is removed from the volatile processor IC 603, these operands continue to persist in external NVM in a manner that is protected against interception and decryption by an attacker. Other data 639 can also be stored in this manner. For example, it is possible to maintain all system files in NVM in a secure, encrypted form, with the processor IC using a retrieved, decrypted private/secret key to safeguard these files. In yet another application, the processor IC 603 can participate in transactions and other communications using an external network (WAN or LAN 645), for example, using a processing block 641 to encrypt credit card numbers, perform secure transactions and the like, using a locally-generated payload (e.g., obtained by user input to the system, e.g., obtained via an optional user interface 646).

Once again, various modifications, substitutions and options will occur to those having ordinary skill in the art, and the specific features described earlier (including the use of a PUF and/or attestation curves) are to be viewed as optional for the embodiment of FIG. 6.

Figure 7:
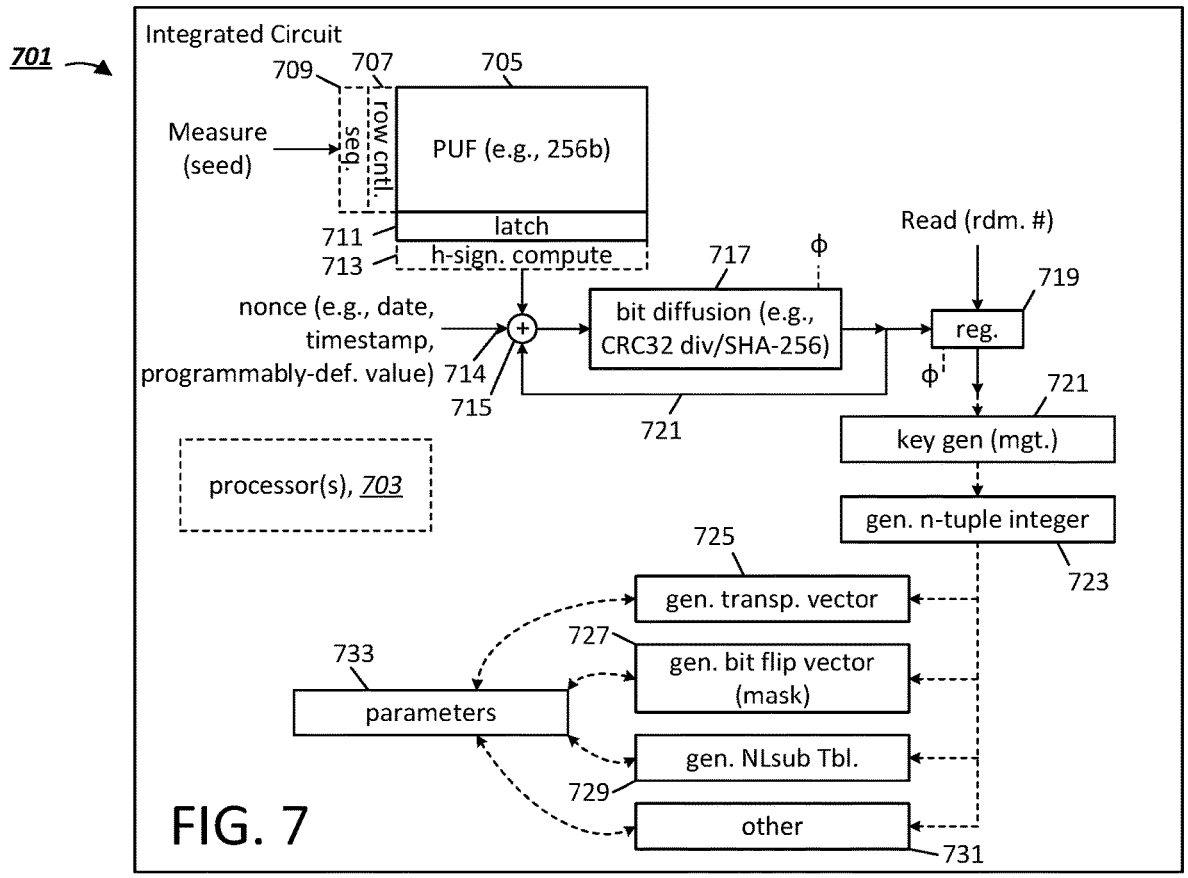
FIG. 7 is a block diagram of an IC that provides for hardware-based random number generation.

FIG. 7 is used to provide additional detail regarding hardware random number generation. More particularly, FIG. 7 shows an integrated circuit ("IC") 701 which has an array 705 of metastable circuits. As noted above, random number generation can be used to create secret encryption keys for transposition generation and bit flipping vectors as described above, and to generate information used to create nonlinear substitution tables and/or for other purposes of a processor or processor core 703. As indicated earlier, such as array can serve double duty, being optionally used for hardware signature generation as well as random number generation; in some embodiments however, the array 705 can optionally be dedicated to random number generation. As seen in the FIG., the depicted array provides a physically unclonable function, this time having 256 cells; the metastable cell design can optionally be based on the structure seen in FIG. 2A. As denoted by reference numerals 707 and 709, the use of sequencing and row control circuitry in this embodiment is optional; that is, in one embodiment, all 256 metastable cells are sensed at once using a common excite signal, with the states of these cells being sensed and held by latch circuitry 711. Similarly, hardware signature computation circuitry 713 is also optional for this embodiment, i.e., in one optional case, the frame-based repeated measurement and use of histograms as described earlier is also used here; however, in another case, only one measurement is used, producing a 256-bit string of logic "1"s and logic "0"s. Alternatively, a 256-word string with each word's content in a range 0-120 obtained from the 'counting' circuit can be used, as referenced earlier. This measurement is then used as a random number seed. As a consequence, any time a new seed is needed by the processor or its subcomponents, a measure signal is provided to the array 705, which the provides a fresh seed to circuitry 717.

Note that, as described earlier, due to process corners, each cell of the array 705 although designed to be as identical as possible, will typically have many cells which repeatably produce the same value, and therefore multiple values of the array 705 will be generally correlated. Because of this correlation in output values, the 256-bit value (or the 256-word value) produced from this array is not directly used as a random number, but it is concatenated with some other information 714 and/or 721 (as will be described below), and this concatenated information is then provided to circuitry 717 which provides bit diffusion, for example, using a CRC32 division, or an AES or SHA256 encryption process. Notwithstanding that only a subset of the metastable cells produce a truly unpredictable state, these processes will provide sufficient entropy that what comes out of circuitry 717 will be a random number. This output is provided to a register 719, where it is held for reading by the pertinent processor or processor core. Note that in one embodiment, the output of circuitry 717 is optionally fed back on itself to a summing junction where it is concatenated or used to deterministically modify the next seed from array 705. An example here would be once again helpful. The IC 701 at some point, e.g., at power-up or on a dynamic or event driven basis (e.g., "every hour") issues a measure signal to the array 705 to produce a fresh seed. The 256-bit (or 256-word) output value is provided to the summing junction 715 where it is prepended with some nonce information 714 (e.g., drafted from a random pool the ASCII equivalent of a clear text value "randomkey1, . . . randomkey9," a timestamp or something supplied by a software provider or system designer) and is combined, e.g., concatenated or XORed with, feedback information arriving via path 221. Circuitry 717 then applies an encryption process which propagates entropy in this input across all 256 bits of the circuitry's output. Circuitry 717 then feeds this output 721 back to the summing junction, such that its input is continually changed and, as a consequence, so that the 256 bits output by the circuitry also continuously change with a high degree of entropy. Note also that circuitry is also clocked (i.e., as indicated by depiction of a clock input φ), i.e., the random numerical output is constantly being produced and is constantly changing. Consequently, the read signal from the processor or processor core or other circuitry can be used to trigger output of a fresh random number any time it is issued. Note that the register 719 is also clocked, such that it is constantly being loaded with a fresh number; the depicted circuitry in this embodiment is very fast once a seed has been generated, such that a different random number is constantly available on demand.

As noted previously, the generated random numbers can be supplied for a variety of purposes. One purpose, discussed above and represented by reference numeral 725, is the generation of random transposition vectors. That is, as described earlier, a random number can be used to generate integer values (e.g., a 768-tuple as described previously), and circuitry then can sort each integer to derive a transposition or sort vector as previously described. In the context of FIG. 7, box 725 denotes hardware and/or instructional logic on-board IC 701 (or supplied from non-transitory storage media) that generates such vectors. Secondly, it was previously noted that some embodiments generate and use a bit-flipping vector, e.g., a 768-bit value can be used to flip corresponding bits of a hardware signature. Box 727 denotes logic, once again, hardware and/or instructional logic, that causes this to happen, for example, by receiving a generated 768-valued transposition vector, converting each value to even or odd (either by a simple modulo 2, or by a modulo 7 or 6 operation ((e.g., followed by a ">3" or a ">=3" branching test, for example) and then performing bit flipping. Thirdly, the random numbers generated can also be used for generation of a nonlinear substitution table ("NLS table"). That is, it was described earlier that encryption processes can generate such a table for purposes of encrypting contents of SMB2 (see FIGS. 3A-3E, described above), on a reversible basis. The generated transposition vector, or another random number, can be used to populate such a table. To cite a non-limiting example of how this can be done, a transposition vector can be generated and used to assign a sorting of binary numbers; in the case of twelve bits for example, a table can be populated with 4,096 different binary values indexed according to the 12 bits, where each table entry is populated in dependence on a 4,096-valued transposition vector (e.g., for example, the transposition vector maps the binary value of "9" to position "143" and consequently causes the input bits of "0000 0001 0001" (i.e., "9") to be mapped to an output of "0000 1000 1111" (143) via the table, with the reverse translation being effectuated by content-addressable output or alternatively by allocating another table instance to store the reverse mapping (such that, e.g., the input bits "0000 1000 1111" (143) are reverse-mapped to an output of "0000 0001 0001" (i.e., 9)). For each of the transposition vector generation logic, the bit-flipping logic and the NLS table generation logic, the values generated can be dictated by hardwired, stored or programmed parameters 733. For example, in one embodiment, it might be desired to product 12-bit NLS tables, while in another, a specific finite field operator might be used to apply a certain modulo operation. Many examples will occur to those having ordinary skill in the art and, depending on design, generated random numbers can be used in a variety of manners. In one embodiment, a common transposition vector is used by each of logic 725, 727 and 729 to seed encryption/decryption (e.g., for attestation data), but this is not required for all embodiments. As denoted by numeral 731, a random number can also be applied for other purposes.

Figure 8A:
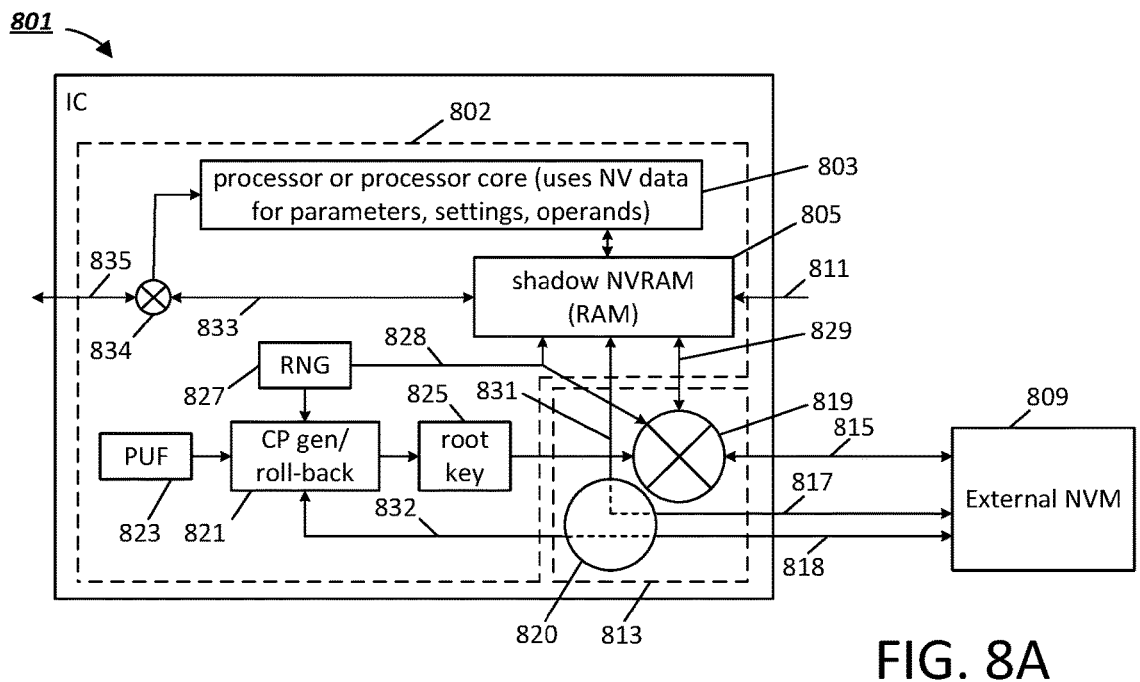
FIG. 8A is a block diagram of an IC that provides for storage of encrypted data on external nonvolatile memory ("NVM").
Figure 8B:
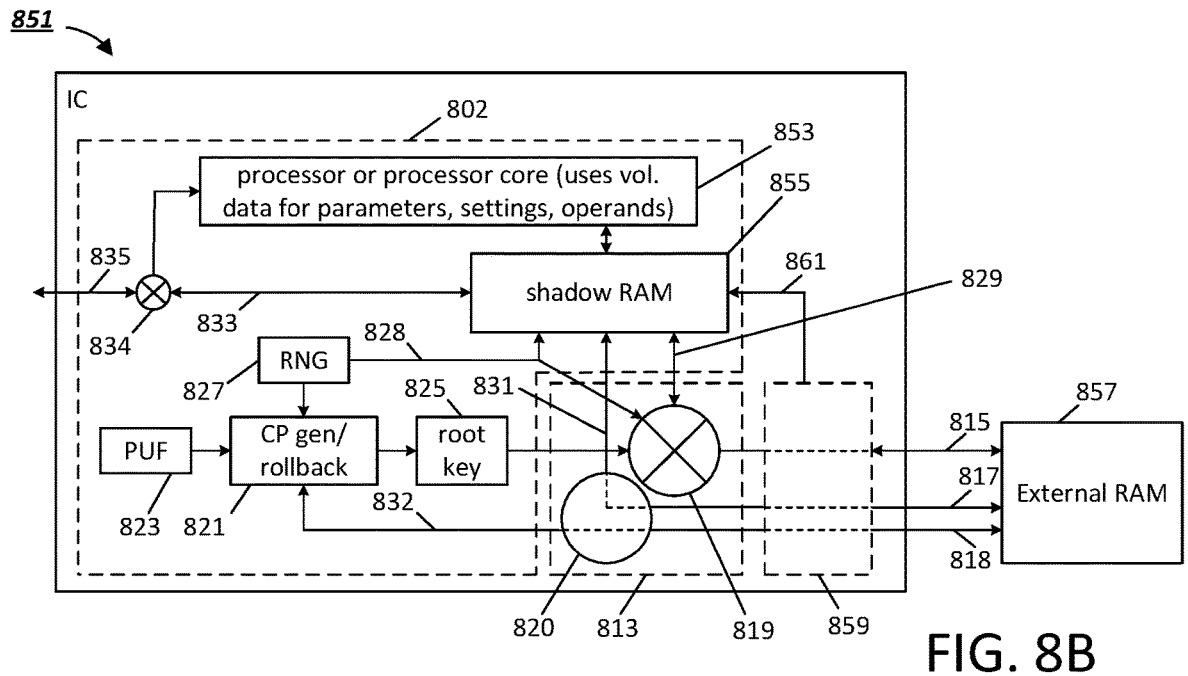
FIG. 8B is a block diagram of an IC that provides for storage of encrypted data on external volatile memory.

It was noted earlier that in one optional embodiment a recovered root key is not directly used for cryptographic operations of the IC (other than for secure storage of private/secret keys). Rather, in such an embodiment, one or more secret or private keys can be encrypted using the root key with the encrypted key(s) being retrieved and decrypted from NVM (i.e., after the root key is recovered and then used to recover these private/secret keys). Further, such other, private/secret keys in one embodiment can be generated on-chip and, in other embodiments, they can be externally supplied (e.g., via a Diffie-Hellman key exchange process). One motivation for an architecture that relies on these separated processes might be that the IC in question does not have internal nonvolatile memory and, as a consequence, when power is removed, all internal content is lost. As a consequence, data stored on-board might need to be moved off-chip, and this may be problematic where security is an issue. While it is believed that many designs will have some limited on-board volatile storage for internal processing, in truth, it might also be desired to always provide resources for external storage of encrypted RAM contents. One ample example is the cache-centered memory management system ("MMS") employed by many modern-day processors, whereby a small capacity chip-resident L1 cache can serve a 'virtual' memory space of multi-terabytes size, by timely swapping in and out the memory portions that are active at any moment from/to the external DRAM storage or even hard-drive. FIGS. 8A and 8B are used to describe embodiments which assist with these functions. This is to say, FIG. 8A describes an embodiment where content can be encrypted and stored off-chip in NVM and FIG. 8B describes an embodiment where content can be encrypted and stored off-chip in RAM. In one embodiment, FIG. 8A shows a strategy for implementing a shadow nonvolatile memory and FIG. 8B shows an architecture for a shadow volatile memory. The mechanisms depicted by FIG. 8A and FIG. 8B also optionally enable a controlled two-way exchange of contents to/from shadow nonvolatile memory from/to shadow volatile memory.

FIG. 8A shows an IC 801 that selectively encrypts data for external storage in an external nonvolatile memory (NVM) 809. The NVM 809 might reside in a second integrated circuit in a common-board or system, or it might be remotely located, for example, being located at the other end of a LAN or WAN. In general, wired (or "conductive") links (such as designated by numerals 815, 817 and 818) are used to communicate with the NVM 809, at least partially, but the paths connecting these elements may also in some embodiments include a wireless link component. As before, the connecting links can be compliant with communication standards such as ATA, SATA, USB, SPI, Display Port, PCIE and/or other published standards and their various versions (e.g., SATA, USB, PCIE versions 2.0, 3.0, etc.).

It is assumed that the IC 801 has at least one processor or processor core 802 and that this processor or processor core is to engage in operations that require storage of parameters, settings or operations in some form of NVM; this is represented by function block 803 in FIG. 8A. In a conventional device, such NVM might be on-board the chip, but in the case of the embodiment of FIG. 8A, it is to be assumed that this memory is off-chip (e.g., as described above, it may be that the IC 801 only has volatile storage). It is therefore desired to have a local memory (a shadow NVRAM) 805 that is to look to the processor or processor core as though it is nonvolatile memory, even though it is in fact volatile. When power is being lost or eviction (or updating to commit to NVM for data retention over power cycles) of data is otherwise desired or needed, a write signal 811 is provided to the shadow NVRAM to cause it to write data from the internal local memory to the NVM 809, located off-chip. To assist with this task, the processor or processor core directs the data to an encryption/decryption circuit 813 which in this embodiment is seen to be optionally external to the processor or processor core (but on the IC 801). In one embodiment, described below, there may be many processor cores on IC 801, where those processor cores time-multiplex use of the encryption/decryption circuit 813. In one implementation, the encryption/decryption circuit 813 is a fast circuit, being implemented as a set of unclocked logic gates and look-up tables that provide nanosecond order encryption/decryption response; an example of such circuitry will be described below in connection with FIGS. 9A and 9B.

Note, however, that storage of encrypted data might not be required for all applications and needs of the processor or processor core 802. That is to say, in some embodiments, there may be some data which the processor or processor core wishes to encrypt (e.g., a private/secret key as discussed above and other data relating to cryptographic and other credentials, e.g., credit card number, passwords and the like)—this is represented by data flow path 815—and other data which is not to be encrypted (or further encrypted), represented by flow paths 817 and 818. Examples of data which does not require (further) encryption includes attestation data and transposition vectors T1-T5 (represented by flow path 818, i.e., which are either already encrypted using specific processor or are stored as clear text) and data which is not considered sensitive or secret (i.e., represented by flow path 817) or data for external transmission that is already encrypted by the communications protocol per se. To meet these varying needs, the encryption/decryption circuit 813 can implement a multiplexing capability, where it either performs a reversible encryption function using encryption circuitry 819 or passes data straight through to the off-chip NVM 809 or wherever the destination may be, via bypass circuitry 820.

The performance of encryption can optionally be based on a recovered volatile (or nonvolatile) root key 825, as discussed earlier. Circuitry on-board the IC 801 measures a PUF array 823 and processes a measured hardware signature using circuitry to perform checkpoint ("CP") generation to mark progressive drift in the hardware signature, and using rollback circuitry to revert the measured hardware signature back to the state of the root key 825. As noted earlier, a random number generator ("RNG") 827 can be used to assist with these operations and to generate transposition vectors, bit flip vectors and nonlinear substitution tables. Such a RNG circuit can optionally be based on the design discussed above in connection with FIG. 7 and, as noted, the RNG can also on-demand supply a random number which will be used as a secret/private key 828 (e.g., for purposes of either encrypting outbound data/decrypting inbound data, for purposes of Diffie-Hellman-based exchange of a to-be-shared symmetric session key or a private key portion of an asymmetric key pair, or for other purposes). As noted earlier, whether generated random numbers are used as a secret key or not, it may be desired to encrypt this key for external storage e.g., if power is removed, this secret key may be needed to recover NVM memory content. The root key 825 is therefore selectively used as an encryption key for this very purpose, and is therefore seen to be one input to encryption/decryption circuit 813. The root key is effectively used to encrypt the secret key, which is selectively loaded into the local memory 805; the decrypted secret key may then be used as the encryption/decryption key for other data, and can be similarly provided as an input to the encryption/decryption circuit 813 for this purpose. As will be described further below, data stored in the NVM can have a clear text bit or small amount of information added to indicate whether the particular data is stored in clear text or in encrypted form. As a consequence, when encrypted data is retrieved from NVM 809, e.g., via path 815, it can be provided to encryption circuitry 819 and converted to decrypted data 829, which is then provided to the local memory 805. Conversely, when unencrypted data is retrieved from NVM 809, e.g., via path 817), it can be routed to bypass circuitry 820 and stored directly in the local memory 805, i.e., as represented by path 831. If desired, as denoted by path 818, a similar, additional bit can optionally be used to distinguish attestation data such that it also is directed to the bypass circuitry 820, in this case, being directly provided to CP generation and rollback logic 821.

Figure 9A:
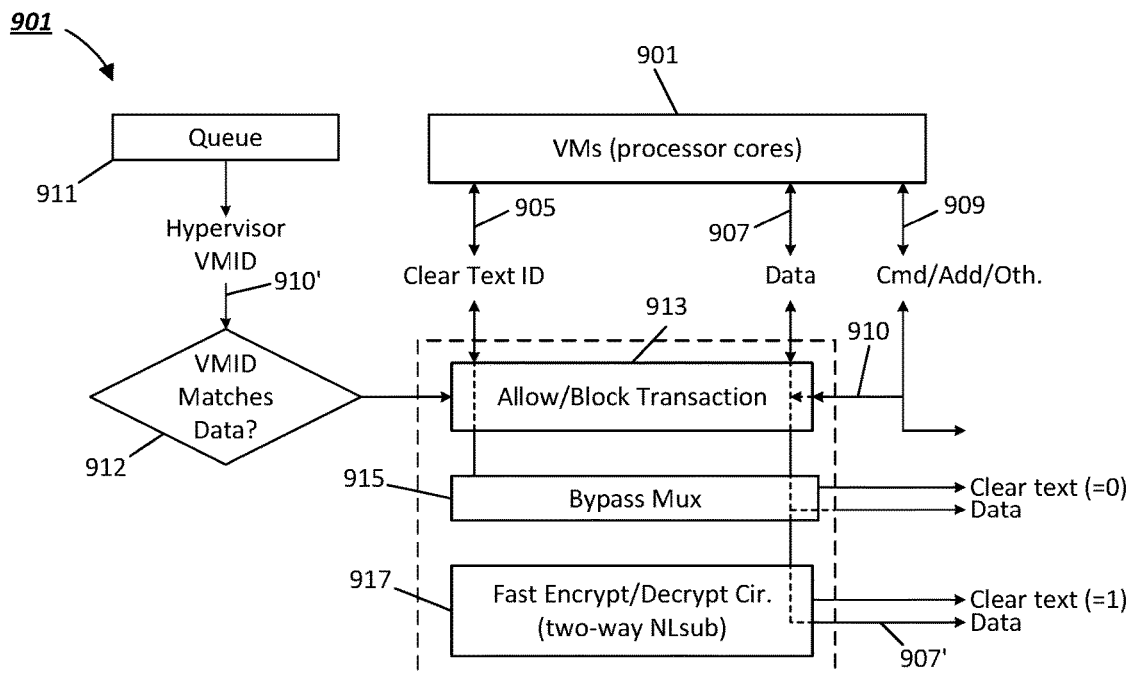
FIG. 9A is an illustrative diagram showing one embodiment of a circuit that selectively provides for encryption and decryption.

A few points should be noted about FIG. 8A. First, although paths 815, 817 and 818 are represented by separate lines, they may in some embodiments be implemented as one common connection, e.g., as a single communications link or bus. Second, while the FIG. separately shows logic elements for checkpoint ("CP") generation and rollback, in some cases, these elements may be integrated with the processor or processor core 802 (e.g., instructional logic may load all such parameters, including measured signatures, attestation values, and other operands, data or parameters, into buffers or memory 805 and operate on those values upon using general purpose circuitry. Finally, although FIG. 9A depicts an IC where a given processor core has its own dedicated circuit elements, e.g., hardware and/or instructional logic for root key generation and checkpointing, for local memory and for other functions, in other embodiments these circuits/functions can be shared across processors or processor cores, either a subset of those present on the IC, or shared by all processors or processor cores on-board the IC. As noted by reference numeral 833, some or all of these functions may be used in support of cryptographic operations and, for this purpose, fed to CRC32 division, SHA256 or AES encryption circuitry; such is represented by convolution block 834, or off-processor/processor core by numeral 835.

FIG. 8B shows another block diagram, in this case, showing an IC 851 that selectively encrypts data for external storage in an external volatile memory 857. Such a volatile memory can optionally be, by way of nonlimiting example, a dynamic random access memory ("DRAM") chip or module. There may be many reasons to encrypt data for external DRAM storage, including by way of nonlimiting example, that IC 851 has insufficient volatile memory and/or it is necessary to evict data from a local shadow RAM 855 either to general cache for the IC 851 or to the external DRAM storage. Once again, it is assumed that a processor or processor core uses memory, this time volatile memory, for purposes of storing various parameters, settings or operands, as all indicated by numeral 853. In the architecture represented by FIG. 8B, many of the same elements as described above are also used, to the same or similar effect and purpose; such elements are generally represented by the same reference numerals that were used in connection with FIG. 8A. For example, there is once again an encryption/decryption circuit 813 that has encryption and bypass circuitry 819 and 820; once again, this circuitry can provide for bypass of attestation curve recovery data 832, used to derive a recovered root key 825.

FIG. 8B also represents a few differences however. Note first of all that it typically is unnecessary to encrypt a shared secret key and store a shared secret key in external RAM, i.e., because data stored in the RAM is volatile, in the event of power loss, it is expected that the pertinent processor or processor core 852 will regenerate the pertinent parameters, settings and operands. Second, note that the FIG. also depicts presence of cache and memory management unit ("MMU") circuitry 859. That is, in the depicted embodiment, this circuitry effectuates an optional intermediate cache that might be shared by multiple processors and processor cores or multiple virtual machines or running-processes, and it may be desired that one processor/processor core or virtual machine/process not have access to encrypted operands of another—to this effect, the circuitry 859 can provide cache storage of data in the same format as would be used off-chip, that is, in encrypted form, with the use of conventional caching and cache eviction protocols. As will be discussed below, if and when data is moved into shadow RAM 855 for a given processor or processor core, circuitry in the encryption/decryption circuit 813 can provide for pertinent locks and permissions access control, e.g., only the correct (owner) processor/processor core and/or virtual machine/process is provided access to its decrypted data. The circuitry 859 also performs conventional memory management functions, including virtual-to-physical address translation, cache management (i.e., coherence control and eviction processes), and conversions in page and record sizes between those used by the shadow RAM 855, those used by the cache/MMU circuitry 859 and those used off-chip in memory 857. As represented by signal 861, a decision to evict data from the shadow RAM 855 typically comes from the processor/processor core 852 or the cache/MMU circuitry, triggered when a condition indicates that insufficient space exists in shadow RAM 855 and some bit of data must be evicted in order to make room for a needed operand. Consistent with the discussion earlier, such evicted data is selectively encrypted (i.e., depending on whether or not the data is sensitive and requires encryption, or a legacy factor that the data source/destination is not capable of encryption/decryption) and such data is either then stored in the cache/MMU circuitry 859 or it is evicted completely off-chip and stored in external RAM 857. Once again, as was the case above, for data that is to be encrypted, such can be performed by one or more private/secret keys such as obtained from the random number generator (827) or from an external or other source. In an optional embodiment, the root key itself can be used for some encryption, though as mentioned previously, in many embodiments, the root key is used just for purposes of recovery of externally stored, encrypted cryptographic keys and IDs.

Reflecting on the structures presented by FIGS. 8A and 8B, a chip might lack nonvolatile memory (or sufficient volatile memory), e.g., such a chip might have been made according to a newer fabrication process technology that is not compatible with embedded nonvolatile memory technology requirements. A volatile (or nonvolatile) root key is recovered using on-chip circuitry, facilitating recovery of decryption parameters. As a non-limiting example of this, cryptographic keys which might be lost if stored on-board when power is lost can be encrypted using the root key and externally stored in a secure manner, safe from interception by attacker. The structures presented by FIGS. 8A and 8B permit storage or nearly any data off-chip in volatile or nonvolatile memory in a similarly secure fashion that can be recovered, once again, directly or indirectly as a function of volatile (or nonvolatile) root key recovery. In some embodiments, the circuitry can be optionally designed so as to accommodate multiple processors or processor cores such that data is encrypted even relative to other processors or processor cores operating on the same IC. Other features, benefits, applications and extensions of the described principles will occur to those having ordinary skill in the art.

Figure 9B:
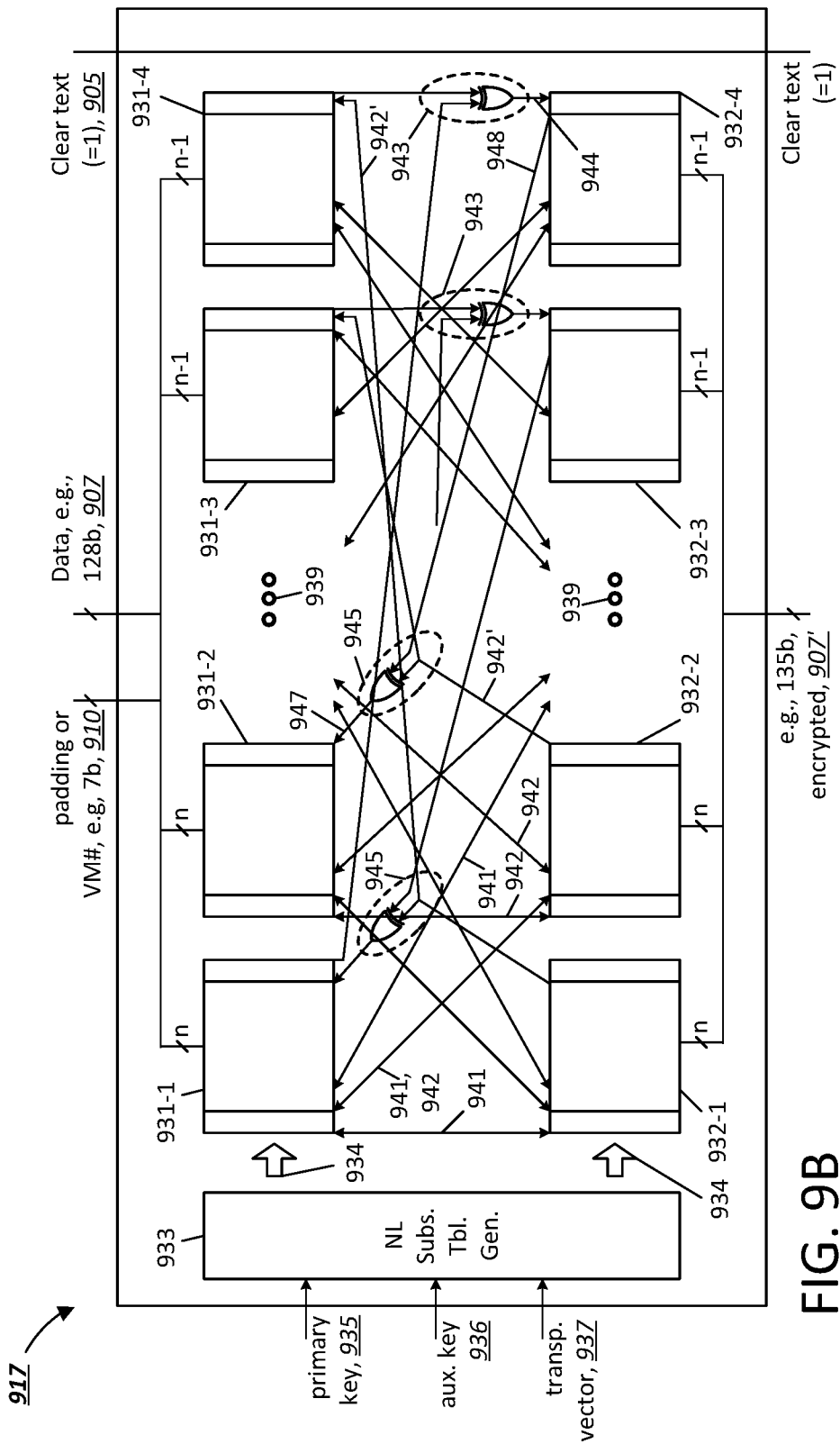
FIG. 9B is a diagram showing encryption/decryption circuitry based on the use of nonlinear substitution tables and logic gates.

It was earlier mentioned that one embodiment uses fast circuitry to provide for encryption/decryption of select data. FIGS. 9A and 9B illustrate one embodiment for how such fast circuitry can be designed/implemented.

More particularly, FIG. 9A shows an illustration of one optional design for such a circuit, referenced using numeral 901. The circuit is based on one or more virtual machines, processors or processor cores 903. These various devices produce data 907 which is accompanied by respective command-and-address information 909. This latter information will typically include identification of an owning virtual machine, processor or processor core, represented by numerals 910 and 910' in FIG. 9A. Typically, a hypervisor assigns a thread ID (or virtual machine ID) which is used to link data associated with processes running on the virtual machine ("VM") with the particular machine. In some embodiments, this information is used to prevent access of information belonging to a first VM by a second VM. To this effect, the depicted circuit 901 includes circuitry 913 that selectively allows or blocks read data from reaching processors or machines which do not "own" that data, as revealed by a comparison between a VMID retrieved with read data and the VMID of the requesting machine. In some embodiments, this process is also used in connection with write commands, e.g., a write can be effectuated by a read-modify-write operation in which a write is effectuated within circuitry 913 only if a VMID corresponding to a write corresponds to the VMID for information that is to be overwritten. To this effect, as commands are issued from a first IC, the circuit 901 stores these commands in a queue 911; as associated data is retrieved from memory (e.g., read data or read data that is to be modified by write), a decision block 912 checks the VMID of a queued, in progress-transaction against the VMID of the retrieved data to ensure a match before the operation continues. In some embodiments, this feature/check is performed for all data (whether encrypted or otherwise) and in other embodiments, it is performed only for a subset of the data, such as for encrypted data only. Optionally, for a streamlined protected-write operation, the VMID of the writing VM/process could simply be 'padded' to a cleartext operand to be encrypted to ciphertext before the actual write-out without checking if the particular VMID can rightfully perform such write operation onto the RAM address in the virtual memory space, providing that the operating system already has an over-write protection mechanism (such as provided by a segment-fault event) in place.

As noted earlier, not all data need be encrypted, and a given VM/processor/processor core may store both encrypted data (e.g., sensitive data such as credit card information) and unencrypted data. In the depicted embodiment, all data is therefore accompanied by a clear text ID 905 that indicates whether or not data is to be encrypted. In some cases, a single bit can be used for this purpose, e.g., a logic "1" means the data is to be encrypted, and logic "0" means that the data is not to be encrypted. In a typical embodiment, this clear text ID is stored in clear text format, i.e., such that when any given quantum of data may be retrieved, fast encryption/decryption circuitry 917 can immediately recognize whether data requires decryption or not. As noted previously, and as represented by numeral 915, bypass circuitry (i.e., labeled "bypass mux") in the FIG. intercepts both read and write data and invokes the encryption processing hardware 917 when encryption/decryption is required. Thus, as indicated by the FIG. when encrypted data 907' is read from memory with a clear text ID value of "1," the bypass mux circuitry 915 directs the encrypted data 907' to the encryption processing hardware 917, which decrypts data (both including stored operands and the VMID). If the VMID of read data does not correspond to the VMID of the requestor, the operation is halted (i.e., the data can be discarded). If the VMID does correspond to the requestor, then the requested operation can be allowed. In one embodiment, to prevent a potential vulnerability to chosen plaintext attack ("CPA"), the circuit can be optionally designed to prevent a process that changes plaintext data to encrypted form (or vice versa). That is, the circuit can be designed so as to prevent a mode switch unless the payload content has been modified since the last inbound-load occurrence.

FIG. 9B provides additional detail regarding one embodiment of the encryption processing hardware 917 of FIG. 9A. More specifically, FIG. 9B shows components which include a first set of lookup tables 931-1, 931-2, 931-3, and 931-4, a second set of lookup tables 932-1, 932-2, 932-3 and 932-4, a nonlinear substitution table generator ("NLSubs. Tbl. Gen") 933, and first and second sets of exclusive-or ("XOR") gates 943 and 944. The nonlinear substitution table generator optionally uses firmware to assist with nonlinear substitution table generation, but in the depicted embodiment, all other elements of the FIG. are instantiated as unclocked hardware—this depicted structure thus optionally provides for nanosecond response for both encryption and decryption functions. The nonlinear substitution table generator receives one or more of a primary key 935, an auxiliary key 936 and a transposition vector 937; in some embodiments, all three of these parameters are used to build one or more nonlinear substitution tables. Note that in contradistinction with nonlinear substitution generation table generation for recovery of checkpoints (i.e., for decryption of attestation data), such is typically predicated on externally-stored clear text information (e.g., one or more transposition vectors), as decryption of externally stored data cannot occur until the volatile (or nonvolatile) root key has been recovered. For the circuit depicted in FIG. 9B, by contrast, it is assumed that such circuitry forms a part of an encryption/decryption circuit used for encryption of text, parameters, secret keys and other information (e.g., as part of the encryption/decryption circuit 813 from FIG. 8A); as a consequence, the root key may already be decrypted, and the information used to build nonlinear substitution tables can optionally be predicated on independent keys, RNG-generated keys, or other information. Whether inputs 935, 936 and/or 937 are based on the root key or otherwise, the nonlinear substitution table generator uses the pertinent input values to develop a nonlinear mapping between a set of input bits and a set of output bits, and it separately populates each table (i.e., as indicated by arrows 934). Taking a very simplified example, a two bit input (00, 01, 10 and 11) might be mapped on a random basis to a permutation of these bits (e.g., to 10, 11, 00 and 01, respectively); when the input is "00" for example, a substitution table in this simplified example outputs the bits "10," and conversely, when the value "10" is read from externally, the table either uses content addressable mapping or a reverse table to output the reciprocal value "00." In the depicted embodiment, the nonlinear substitution table generator populates many tables, i.e., 931-1, 931-2, 931-3, 931-4, 932-1, 932-2, 932-3, 932-4 and so on, as a function of the input information 935, 936 and/or 937; this table construction is advantageously designed to be deterministic, i.e., such that the same tables will be generated based on reapplication of the same inputs 935, 936 and 937. In this manner, even if power is lost, upon resumption of operation, circuitry 917 rebuilds the same substitution tables and is able to completely and rapidly decode any encrypted information stored in external NVM using the proper decryption parameters. If the circuit is being used to protect volatile RAM, then an assumption can be made that power had not been lost in the passage of time during the encrypt-and-decrypt cycle. Note again this determinism and recovery of encryption parameters is not required in the case where encrypted data represents contents of a shadow RAM, e.g., in the case of a shadow RAM, a random key or other random information (e.g., a nonce) may be used to generate the nonlinear substitution tables.

The depicted circuitry 917 receives the clear text ID value 905 (from FIG. 9A), which in this case is assumed to be a logic "1" (i.e., since the assumption is that the accompanying data 907 is being routed to the encryption circuitry). The accompanying data 907 is typically provided in parallel form and includes the pertinent VMID 910 (or conversely, logic "0"s or some other random padding if VMIDs are not used). Note once again that the random-padding can be optionally used to provide for indeterministic encryption to deter dictionary attacks, and that the VMID can be deployed to block memory leaking through cross-reading among VMs. In the case of the depicted FIG., it is assumed that 128 bits of data payload and 7 bits of concatenated (VMID and/or random padding bits) are to be received, though any other number or relative number of bits can be received (e.g., 144 bits with 132 bits of data and 12 bits of VMID/padding, and so forth). Each of the nonlinear substitution tables 931-1, 931-2, 931-3, 931-4, 932-1, 932-2, 932-3, 932-4 are seen to receive these bits in one form or another, and each of these tables will have been populated to replace some quantum of input bits with a paired replacement set of bits according to how the particular table has been populated. In one example implementation, there are three nonlinear substitution tables that provide 12-bit-to-12-bit mapping (i.e., n=12) and nine nonlinear substitution tables that provide 11-bit-to-11-bit mapping, for each tier of two tiers of the design, for a total of 135 bits. As denoted by ellipses 939, any number of tables can be used as pertinent to the design, and the mapping provided by each table can be the same or different, and can be performed for any number of bits, as pertinent to the design, i.e., these parameters represent an implementation choice. Table 931-1 for example receives the highest 12 bits of the 135 bits of combined VMID and/or padding/data, and generates a replacement set of 12 bits. These bits are output via individual bit lines 941 to respective ones of tables 932-1 . . . 932-4 (note that there would be twelve tables at this tier 932, and thus, each one of these tables receives one bit of input from nonlinear substitution table 931-1). Each table at the second tier (seen at the bottom of the FIG.) similarly substitutes a replacement set of bits for its input, and provides these bits as n or n−1 bits, which collectively form 135 bits of encrypted data (i.e., both the data and the corresponding VMID/padding are encrypted together in a full-convolution manner). Again, because there are no clocked elements in this design, the encryption is extremely fast, of nanosecond order, determined mostly by two times of memory-lookup delays. The resultant 135 bit value is stored with the clear text ID bit in external NVM or DRAM as indicated in connection with FIGS. 8A and 8B, in association with address information provided to the memory (this information, representing a host's logical address, is not shown in FIG. 9B and is passed directly to memory). When it is desired to read data, the reverse transformation is performed, namely, the highest n (e.g., 12) of the encrypted bits is passed to a first nonlinear substitution table 932-1 (at the second tier 932 depicted at the bottom of the FIG.) and corresponding bits are read out of this table (i.e., once again, using content lookup to trigger output of an address, or conversely, a separate-instance of a reverse table). Each bit line emanating from the table is then passed to tables at the first tier, 931, near the top of the FIG. For example, table 932-2 depicts individual bitlines 942 which are seen as directed to different tables at the first tier. A similar content-addressable or reverse lookup substitution operation is performed there, resulting in the recovery of the original VMID which was stored with the data in question, the padding bits, as well as the data payload.

Note that the FIG. also includes two different sets of exclusive-OR ("XOR") gates 943 and 945. In this regard, where there are 135 bits of information as presented by this example, not every table at the first tier can pass a bitline to every table at the second tier. For example, in the depicted FIG., nonlinear substitution tables 931-3 and 931-4 only output eleven bits, whereas there are twelve tables at the second tier to be fed at least one bit of input from the outputs in the first tier. Similarly, nonlinear substitution tables 932-3 and 932-4 only output eleven bits upward whereas there are twelve tables at the higher tier. To resolve this issue and provide for full-convolution entropy in the encryption process, one bit line from each of the first tier (931) n−1 tables in this example in the encryption direction is XORed (i.e., via a circuit 943) with one bit line from one of the n tables from the first tier (931), to generate an output 944; conversely, in the decryption direction, one bit line from each of the n tables (e.g., signal 942' from table 932-2) is fed as an input to one of the n−1 tables at the higher tier (e.g., to table 931-4), while the same bitline is also XORed (i.e., via circuit 945, with signal line 948) to provide an output 947. This configuration permits all replacement bits coded at the first tier (931) of tables to be propagated to different tables at the second tier (932) and provides for a full recovery of the original values during decryption. Fundamentally this bitline merge using the depicted XOR circuits, applied in both the forward direction from tier one to tier two and in the reverse direction from tier two up to tier one, permits accommodating differences in the varying number of bitlines produced versus the bitlines consumed across the n-wide and (n−1)_wide lookup-tables, so as to compose many different and desirable total bit-widths of the datapath, such as 135 or 143. With such adjustments, every lookup-table in tier one supplies at least one bitline to each lookup-table in tier two, and vice versa. Again, as noted above, because the depicted tables provide simple lookups, and are not clocked elements, encryption and decryption using the circuitry of FIG. 9B is extremely fast, of nanosecond order. Note again that n can be any desired value, and therefore that the depicted structure provides a fast, high entropy mechanism for encrypting and decrypting any set of bits. An outside consideration in the design regards the resulting size of the lookup memory array. For example, for n=12, a 4096 word array is used with each word of size 12-bits, totaling 49,152 bits (6,144 bytes). For n−1 being 11, the bit size total is 2,048*11=22,528 bits=2,816 bytes. The total byte count of all lookup arrays will take around 87 kbytes of memory. If a reverse lookup table is deployed as a separate instance array then the total memory size is doubled to 175 kbytes. A clever dual-use scheme can be deployed to only require a grand total of 87 kbytes of memory usage, by making each tier-two corresponding lookup table to be the reverse array of its tier one peer. It is also feasible to compose a three-tier or four-tier structured solution, considering tradeoffs on memory usage, datapath width, and delay/latency that is proportional to the tier depth.

Once again reviewing some of the principles associated with the structure just described, an IC can provide for a number of embedded encryption and/or cryptography functions. An IC having one or more processors or processor cores can be fabricated using any desired process technology, with a PUF being used to mark a fully recoverable root key, recoverable for the life of an associated device or product. Even if cryptographic parameters cannot be internally stored, the described mechanisms permit secure recovery of the root key by re-measuring the PUF and by using checkpointing features to recover the root key in a manner that, practically speaking, cannot be deciphered by an attacker. The root key therefore remains completely secure at all times, decodable and understandable only by the IC in question. Optionally, each processor or processor core can have circuitry dedicated to these tasks (e.g., with a separate root key and volatile/nonvolatile cryptographic key per core or processor). On-board random number generation can be used to assist with root key encryption and to provide for cryptographic keys that can be securely stored (e.g., these secondary keys can be encrypted by the root key and decrypted by the same root key, i.e., recovered after power loss, as necessary). The IC in question provides a fast encryption/decryption mechanism that permits content destined for volatile or nonvolatile memory to be instantly encrypted and stored externally and, conversely, instantly decrypted when retrieved, optionally on a basis that is secure for each virtual machine/process or processor and optionally on a basis that is undecipherable by any other virtual machine/process, processor or processor core. The described architecture also provides for novel PUF designs and for secure instantiation of a shadow RAM and shadow NVM.

As should be understood from the foregoing, the described techniques and structures therefore provide for a wide variety of improvements in IC architecture and particularly processor architecture, in terms of facilitating excellent security usable with any process technology, and in terms of providing cryptographic processes that can be readily implemented in any device, e.g., including newer smart devices and smart phones. Many applications and implementation variations will occur to those having ordinary skill in the art in view of the description above.

In one set of embodiments, as noted earlier, checkpointing function permits recovery of a volatile or nonvolatile root key, while rolling back a measured hardware signature through one or more stored checkpoints until that measured hardware signature is confirmed as matching the original root key. In one optional case, an attestation curve process can be used. These embodiments may optionally be used with or without the other functions and structures described by this application.

Another set of embodiments provides a novel array of metastable circuits that may be dynamically measured at any time, without removing power from or contents from, for example, a set of memory cells. Such an array can optionally be based on cross-coupled NAND gates, as illustrated, or other circuits such as by way of nonlimiting example, cross-coupled NOR gates, latches and so forth. Once again, these embodiments may optionally be used with or without the other functions and structures described by this application.

Yet another set of embodiments provide for a checkpointing function where different encryption processes are used to mark a particular point (e.g., root key or hardware signature). Whether or not attestation curve cryptography is used, using different functions to mark the same point permits identification of a unique intersection point, mandated by all processes, and thus identification of a specific signature or key. In one embodiment, for example, hash data can be externally stored in a manner which permits a device or program recovering an earlier checkpoint to guess a desired result, and confirm via secondary encryption processes whether it has the right result, with only one solution matching all of the different encryption processes. In one nonlimiting embodiment, the different encryption processes can be provided by different attestation curves based on the same signature data, though this is not required for all embodiments; the use of attestation curves in particular should be viewed as optional for these embodiments. Once again, these embodiments may optionally be used with or without the other functions and structures described by this application.

Still another set of embodiments provides for a general cryptographic function that makes use of attestation curves, e.g., where data is divided into first and second sets, and where the first set is used as a key to encrypt the second set, and where the encrypted second set is stored externally and is used for authentication and/or encryption. Such techniques are optionally applied to root key recovery, i.e., it is contemplated specifically that they may be applied to other operands as well, whether or not such relates to PUF measurement or volatile key recovery, i.e., they may be applied to cryptographic operations generally, such as for example perhaps, applied to a Zero Knowledge Proof system Once again, the PUF, random number generation and other depicted circuitry and applications should be viewed as optional to these attestation curve methods.

Another embodiment provides a method of operating an IC or device so as to track drift. More particularly, an IC manufacturer optionally qualifies the IC or device, measuring worst case or other expected drift, without revealing any hardware signature to itself at all. A checkpointing process is then configured based on this qualification or measurement to periodically or intermittently checkpoint the state of the IC or the device. The frequency or timing of the checkpoint generation is set in a manner so that only low amounts of drift will be encountered from checkpoint-to-checkpoint. Data representing the checkpoints is then stored or marked in a manner that permits roll-back of state based on the checkpoint data. The low checkpoint-to-checkpoint drift helps minimize processing time and helps ensure a deterministic rollback of drift to an original device state or checkpoint. In one embodiment, the rolled back state in question is used as a device root key, though this is not required for all embodiments. Here also, the various embodiments, techniques and features set forth in the rest of this disclosure may be optionally used but are not required. Furthermore, a technique was presented in an embodiment to perform one-step recovery of the root key, without the need to tracing backward along the checkpoint lineage.

In yet another optional implementation, a process is used to mark a checkpoint for a root key using multiple encryption processes. The root key can have a defined length, for example, 768 bits long (or another length). A first one of the encryption processes is broken into chunks, such that the first encryption process permits rapid isolation of error, e.g., instead being required to try to find error which may be reflected in any unknown one of the 768 bits of the signature, the chunk-wise encryption process permits localization of error to one or more specific chunks or partitions. This error can then be processed and corrected. One or more second ones of the encryption processes are based on the entire root key to be recovered (or a representation thereof, such as a hardware signature). The redundant signature processes provide a means of eliminating aliasing (e.g., possible multiple solutions produced from the chunk-wise analysis), once again, permitting recovery of the original root key. The original root key can optionally be measured from a PUF, and others of the techniques and features described above can be optionally further combined with or integrated into this implementation.

Still other embodiments will be immediately apparent based on a review of this disclosure, including the use of non-linear substitution tables to provide for fast encryption and decryption, circuit structures which provide for VM-specific isolating encryption and decryption, and structures which permit an effective, secure implementation of a shadow RAM or shadow NVM implementation. These embodiments, as with those described elsewhere herein, may be optionally mixed and matched with any of the structures and techniques described herein, and none of them are to be deemed "essential" for any implementation or embodiment.

The circuits and techniques described above may be further constructed using automated systems that fabricate integrated circuits, and may be described as instructions on non-transitory media that are adapted to control the fabrication of such integrated circuits. For example, the components and systems described may be designed as one or more integrated circuits, or a portion(s) of an integrated circuit, based on design control instructions for doing so with circuit-forming apparatus that controls the fabrication of the blocks of the integrated circuits. The instructions may be in the form of data stored in, for example, a computer-readable medium such as a magnetic tape or an optical or magnetic disk or other non-transitory media as described earlier. Such design control instructions typically encode data structures or other information or methods describing the circuitry that can be physically created as the blocks of the integrated circuits. Although any appropriate format may be used for such encoding, such data structures are commonly written in Caltech Intermediate Format (CIF), Calma GDS II Stream Format (GDSII), or Electronic Design Interchange Format (EDIF), as well as high level description languages such as VHDL or Verilog, or another form of register transfer language ("RTL") description. Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order but merely to assist in explaining elements of the technology. In some instances, the terminology and symbols may imply specific details that are not required to practice those embodiments. The terms "exemplary" and "embodiment" are used to express an example, not a preference or requirement. Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. An integrated circuit, comprising:
   a circuit processor;
   circuitry to measure at respective times a performance condition of an array of circuits, and to produce respective sets of bits representing the respective measurements;
   circuitry to create a checkpoint, the checkpoint representing states of the bits in one of the sets at a given time, and to store in encrypted form in storage external to said integrated circuit data representing the checkpoint; and
   circuitry to recover a key, the circuitry to recover the key coupled to the circuitry to measure, to receive therefrom a set of bits representing a new measurement of the performance condition;
   wherein the circuitry to recover the key is to receive the data from the external storage, and is to iteratively modify the set of bits representing the new measurement until comparison with the data representing the checkpoint indicates that the modified set of bits corresponds to the states of the bits at the given time.

2. The integrated circuit of claim 1, wherein the integrated circuit further comprises circuitry to perform encryption and decryption of an operand as a function of the key once the key is recovered.

3. The integrated circuit of claim 1, wherein the circuit processor is a first processor, wherein the integrated circuit comprises multiple processors including the first processor, and wherein the key is for the use of the first processor to the exclusion of each other one of the multiple processors.

4. The integrated circuit of claim 1, wherein:
the bits in each of the respective sets are at least 512 in number;
the array of circuits comprises a quantity of metastable circuits equal to the number;
the performance condition comprises a physically unclonable function; and
the circuitry to measure is to dynamically measure the physically unclonable function during a normal operating mode of the integrated circuit in response to a signal selectively issued by the circuit processor.

5. The integrated circuit of claim 4, wherein each of the metastable circuits comprises a pair of cross-coupled NAND gates and is unclocked.

6. The integrated circuit of claim 1, wherein:
the checkpoint is a first checkpoint;
the circuitry to create the checkpoint is to create multiple checkpoints, including the first checkpoint and a root key checkpoint, each of the multiple checkpoints representing states of the bits in one of the sets at a respective one of the respective times;
the circuitry to create is to store in encrypted form in storage external to said integrated circuit respective data representing each of the multiple checkpoints; and
the circuitry to recover the key is to receive on an iterative basis the data from the external storage representing each of the multiple checkpoints, is to iteratively modify the set of bits representing the new measurement until comparison with the data representing each of the multiple checkpoints, in succession, indicates that the modified set of bits corresponds to the states of the bits representing the root key checkpoint.

7. The integrated circuit of claim 6, wherein the integrated circuit further comprises circuitry to perform encryption and decryption of an operand as a function of the key.

8. The integrated circuit of claim 7, wherein the key is a root key, wherein the operand is a secret cryptographic key, and wherein the circuitry to perform encryption and decryption of the operand is to encrypt the secret cryptographic key for external storage using the root key, is to retrieve from external storage an encrypted version of the secret cryptographic key, and is to decrypt the encrypted version of the secret cryptographic key using the root key.

9. The integrated circuit of claim 6, wherein the circuitry to create the multiple checkpoints is to create checkpoints according to a predetermined frequency.

10. The integrated circuit of claim 6, wherein the circuitry to create the multiple checkpoints is to create checkpoints in response to a detected condition.

11. The integrated circuit of claim 1, wherein the encrypted form corresponds to an attestation curve.

12. The integrated circuit of claim 1, wherein the encrypted form is a hash of the key.

13. The integrated circuit of claim 1, wherein the circuitry to create the checkpoint representing the states of the bits in the one of the sets at the given time is to sort the bits of the one of the sets at the given time into a first set and a second set, and wherein the circuitry to create the checkpoint is to generate the encrypted form by using the bits in the first set as an encryption key to encrypt the bits in the second set.

14. The integrated circuit of claim 13, wherein the circuitry to recover is to receive the data in the encrypted form from the external storage, is to sort the bits in the set of bits representing the new measurement into third set and a fourth set, and is to perform the comparison by decrypting the bits of the second set using the bits of the third set as a decryption key and comparing the decrypted bits with the bits in the second set.

15. The integrated circuit of claim 13, wherein:
the circuitry to create the checkpoint representing the states of the bits in the one of the sets at the given time is to use multiple different encryption processes to generate the data in the encrypted form, including
a first process in which the circuitry to create the checkpoint sorts the bits in the one of the sets into the first set and the second set, wherein the circuitry to create is to apply a first sorting order to sort the bits in the one of the sets into the first set and the second set, and
a second process in which the circuitry to create the checkpoint sorts the bits in the one of the sets into a third set and the fourth set, wherein the circuitry to create is to apply a second sorting order to sort the bits in the one of the sets into the third set and the fourth set; and
the circuitry to create the checkpoint is to use the bits in the third set as an encryption key to encrypt the bits in the fourth set.

16. The integrated circuit of claim 15, wherein the circuitry to create the checkpoint is to mask at least one bit of encrypted data, to create masked data, and wherein the integrated circuit is to store the masked data in a nonvolatile memory that is external to the integrated circuit.

17. The integrated circuit of claim 13, wherein the circuitry to create the checkpoint is to generate the encrypted form by using the bits in the first set to generate at least one of a transposition vector, a bit flipping vector and a nonlinear substitution table, and is to modify the bits in the second set by applying the at least one of the transposition vector, the bit flipping vector and the nonlinear substitution table to the bits in the second set.

18. The integrated circuit of claim 13, wherein the circuitry to create the checkpoint is to generate the encrypted form by using the bits in the first set to generate each of a transposition vector, a bit flipping vector and a nonlinear substitution table, and is to modify the bits in the second set by applying each of the transposition vector, the bit flipping vector and the nonlinear substitution table to the bits in the second set.

19. An integrated circuit, comprising:
a circuit processor;
circuitry to measure at respective times a performance condition of an array of circuits, and to produce respective sets of bits representing the respective measurements;
circuitry to create checkpoints, each checkpoint representing states of the bits in one of the sets at the corresponding respective time, and to store in encrypted form in storage external to said integrated circuit data representing the checkpoint; and
circuitry to recover a root key, the circuitry to recover the root key coupled to the circuitry to measure, to receive therefrom a set of bits representing a new measurement of the performance condition;

wherein a first one of the checkpoints represents a checkpoint that identifies the root key; and wherein the circuitry to recover the root key is to receive the data from the external storage for each one of checkpoints, and is to iteratively modify the set of bits representing the new measurement until comparison with the data representing the one of the multiple checkpoints indicates that the modified set of bits corresponds to the one of the multiple checkpoints, and is to repeat the iterative modification for respective ones of the multiple checkpoints in turn until the comparison indicates that the modified set of bits corresponds to the root key.

* * * * *